United States Patent
Agiwal

(10) Patent No.: US 11,849,425 B2
(45) Date of Patent: *Dec. 19, 2023

(54) SYSTEM AND METHOD OF TRANSMITTING AND RECEIVING PAGING AND SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,168

(22) Filed: Oct. 7, 2022

(65) Prior Publication Data
US 2023/0033126 A1 Feb. 2, 2023

Related U.S. Application Data

(63) Continuation of application No. 17/052,987, filed as application No. PCT/KR2019/011728 on Sep. 10, 2019.
(Continued)

(30) Foreign Application Priority Data

Dec. 3, 2018 (KR) .................. 10-2018-0153929

(51) Int. Cl.
*H04W 68/02* (2009.01)
*H04W 72/23* (2023.01)
*H04L 5/14* (2006.01)

(52) U.S. Cl.
CPC .............. *H04W 68/02* (2013.01); *H04L 5/14* (2013.01); *H04W 72/23* (2023.01)

(58) Field of Classification Search
CPC ... H04L 5/0048; H04L 5/1469; H04L 5/0053; H04L 5/14; H04W 28/14; H04W 72/042;
(Continued)

(56) References Cited

U.S. PATENT DOCUMENTS 9,408,096 B2 * 8/2016 Kim ...................... H04L 5/0048
9,924,505 B2 * 3/2018 Moulsley .............. H04L 5/0053
(Continued)

FOREIGN PATENT DOCUMENTS

CN 107852634 A 3/2018
RU 2 608 575 C1 1/2017
(Continued)

OTHER PUBLICATIONS

ZTE, 'Maintenance for Downlink signals and channels', R1-1808163, 3GPP, TSG RAN WG1 Meeting #94, Aug. 10, 2018.
(Continued)

*Primary Examiner* — Man U Phan
(74) *Attorney, Agent, or Firm* — Jefferson IP Law, LLP

(57) ABSTRACT

The present disclosure relates to a communication method and system for converging a 5$^{th}$-Generation (5G) communication system for supporting higher data rates beyond a 4$^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. In accordance with an aspect of the present disclosure, a method and an apparatus for preventing loss of data existing in Msg3 buffer and a method and an apparatus for determining a paging frame and/or a paging occasion are provided.

24 Claims, 46 Drawing Sheets

Related U.S. Application Data

(60) Provisional application No. 62/782,774, filed on Dec. 20, 2018, provisional application No. 62/730,846, filed on Sep. 13, 2018.

(58) Field of Classification Search
CPC . H04W 68/005; H04W 68/02; H04W 52/245; H04W 52/365; H04W 72/04; H04W 28/0278; H04B 17/318
USPC .......................................................... 370/329
See application file for complete search history.

(56) References Cited

U.S. PATENT DOCUMENTS

| | | | |
|---|---|---|---|
| 10,517,083 B2* | 12/2019 | You | H04L 5/0053 |
| 10,736,116 B2* | 8/2020 | Park | H04L 5/0064 |
| 10,785,804 B2* | 9/2020 | Park | H04L 5/0048 |
| 10,904,874 B2* | 1/2021 | Kim | H04L 5/0048 |
| 11,064,534 B2* | 7/2021 | Agiwal | H04W 52/365 |
| 2015/0358998 A1 | 12/2015 | Golitschek Edler Von Elbwart et al. | |
| 2015/0373675 A1 | 12/2015 | Seo et al. | |
| 2017/0347335 A1* | 11/2017 | Yi | H04W 76/10 |
| 2018/0124687 A1 | 5/2018 | Park et al. | |
| 2018/0192436 A1 | 7/2018 | Yi et al. | |
| 2018/0199225 A1 | 7/2018 | Kim et al. | |
| 2019/0373577 A1 | 12/2019 | Agiwal | |
| 2020/0396654 A1* | 12/2020 | Freda | H04W 36/08 |
| 2021/0204308 A1* | 7/2021 | Takeda | H04W 72/1273 |
| 2022/0030548 A1* | 1/2022 | Chun | H04W 60/005 |

FOREIGN PATENT DOCUMENTS

| | | |
|---|---|---|
| RU | 2 636 129 C2 | 11/2017 |
| WO | 2017/052199 A1 | 3/2017 |

OTHER PUBLICATIONS

Huawei et al., 'Offline summary for AI 7.1.1.1 on Paging', R1-1809899, 3GPP TSG RAN WG1 Meeting #94, Aug. 23, 2018.
3GPP TS 38.304 V15.0.0, '3GPP; TSG RAN; NR; UE procedures in idle mode and RRC inactive state (Release 15)', Jun. 20, 2018.
Russian Office Action dated Aug. 13, 2021, issued in Russian Patent Application No. 2020137260.
LG Electronics: "Maintenance for Downlink signals and channels", 3GPP TSG RAN WG1 Meeting #94, Gothenburg, Sweden, R1-1808482, Aug. 11, 2018.
Qualcomm Incorporated: "Further discussion on PO configuration", 3GPPTSG-RAN2#103, Gothenburg, Sweden, R2-1812891, Aug. 10, 2018.
European Search Report dated May 18, 2021, issued in European Patent Application No. 19859356.8.
Indian Office Action Notice of Hearing dated Apr. 10, 2023, issued in Indian Application No. 202037048285.
Chinese Office Action dated Jul. 13, 2023, issued in Chinese Application No. 201980032038.8.

* cited by examiner

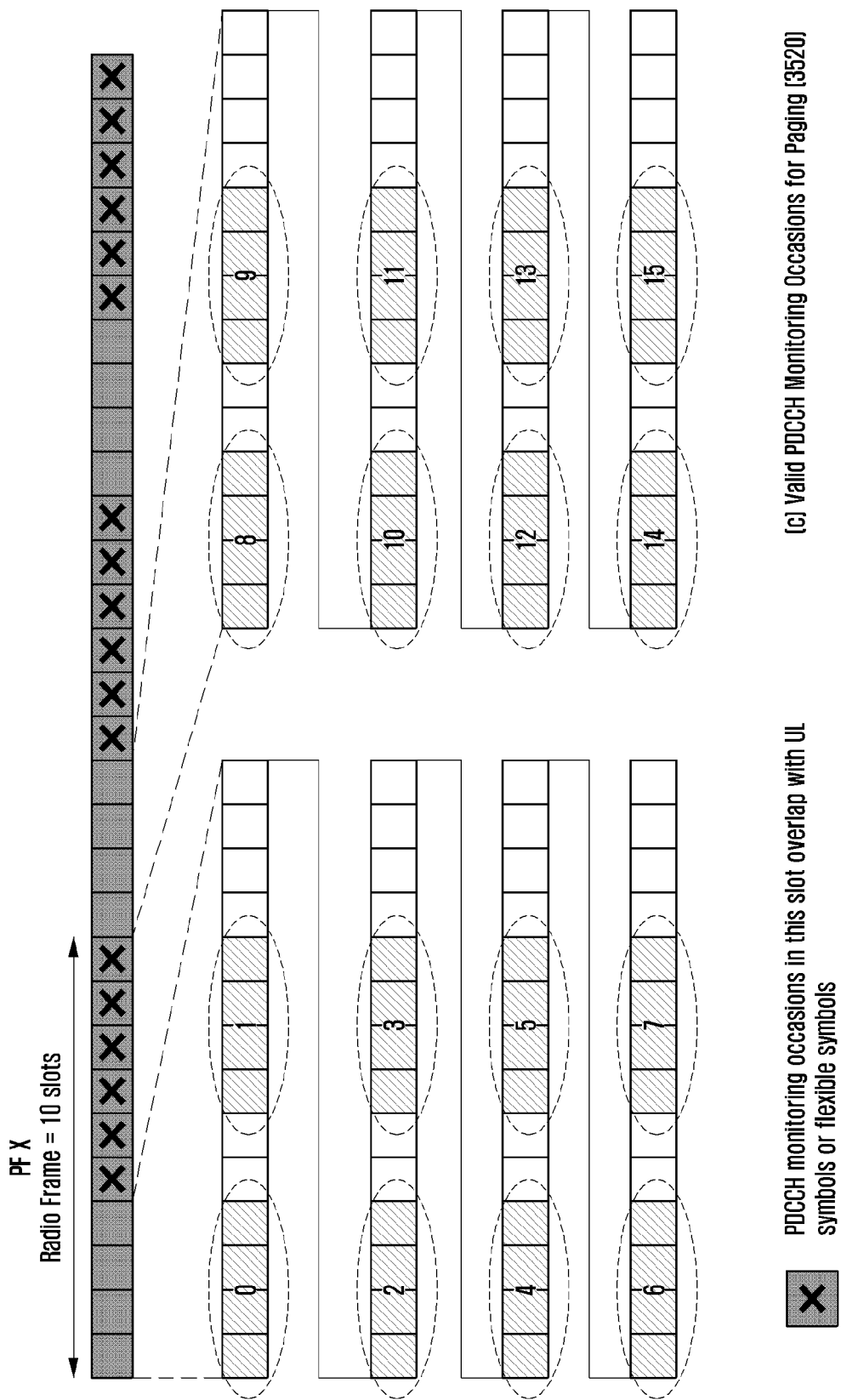

SYSTEM AND METHOD OF TRANSMITTING AND RECEIVING PAGING AND SYSTEM

CROSS-REFERENCE TO RELATED APPLICATION(S)

This application is a continuation application of prior application Ser. No. 17/052,987, filed on Nov. 4, 2020, which has issued as U.S. Pat. No. 11,470,575 on Oct. 11, 2022 and is a U.S. National Stage application under 35 U.S.C. § 371 of an International application number PCT/KR2019/011728, filed on Sep. 10, 2019, which application is based on and claims priority under 35 U.S.C. § 119(e) of a U.S. Provisional application Ser. No. 62/730,846, filed on Sep. 13, 2018, in the U.S. Patent and Trademark Office, and of a U.S. Provisional application Ser. No. 62/782,774, filed on Dec. 20, 2018, in the U.S. Patent and Trademark Office, and which is based on and claims priority under 35 U.S.C § 119(a) of a Korean patent application number 10-2018-0153929, filed on Dec. 3, 2018, in the Korean Intellectual Property Office, the disclosure of each of which is incorporated by reference herein in its entirety.

TECHNICAL FIELD

The disclosure relates generally to a user equipment (UE) and a base station (BS), and more particularly, to a method and an apparatus for of preventing loss of the data existing in the Msg3 buffer and determining paging occasions in a next-generation mobile communication system.

BACKGROUND ART

To meet the demand for wireless data traffic having increased since deployment of 4G communication systems, efforts have been made to develop an improved 5G or pre-5G communication system, also referred to as a 'beyond 4G network' or a 'post LTE system'. The 5G communication system is considered to be implemented in higher frequency (mmWave) bands, such as 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is being made based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and frequency quadrature amplitude modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been required for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

Accordingly, research has been conducted to apply 5G communication systems to IoT networks. For example, technologies such as a sensor network, MTC, and M2M communication may be implemented by beamforming, MIMO, and array antennas. Application of a cloud radio access network (RAN) as the above-described big data processing technology may also be considered to be as an example of convergence between the 5G and IoT technologies.

DISCLOSURE OF INVENTION

Technical Problem

Meanwhile, if the UE uses the contention-based random access mixed with the non-contention-based random access in a beam failure recovery condition, data existing in an Msg3 buffer may be lost due to deletion of the Msg3 buffer. Accordingly, a method of preventing loss of the data existing in the Msg3 buffer is required.

In addition, if the carrier used for downlink transmission is unlicensed carrier, gNB needs to perform channel sensing to determine whether the channel is free or not before transmitting paging message in the downlink. It is possible that gNB has paging message to transmit but is not able to transmit it in a paging occasion as channel is not free. This will delay the paging transmission to next DRX cycle unless the paging transmission opportunities in the DRX cycle is increased for UE. An enhanced method of determining a paging frame and/or a paging occasion is needed.

In current design, PDCCH monitoring occasions for a paging determined by idle/inactive UEs and PDCCH monitoring occasions determined by connected UEs can be different because TDD configurations applied to the idle/inactive UEs and the connected UEs are different. As a result, there will be mismatch between paging occasions determined by idle/inactive UEs and connected UEs. An enhanced method of determining valid PDCCH monitoring occasions is needed.

Solution to Problem

Aspects of the disclosure are to address at least the above-mentioned problems and/or disadvantages and to provide at least the advantages described below.

In accordance with an aspect of the present disclosure, a method of a terminal in a wireless communication system is provided. The method includes receiving, from a base station, time division duplex (TDD) configuration information included in a system information block 1 (SIB 1); receiving, from the base station, paging search space configuration information; identifying a paging frame and index of a paging occasion for monitoring a paging; identifying physical downlink control channel (PDCCH) monitoring occasions for the paging based on the TDD configuration information and the paging search space configuration information, the identified PDCCH monitoring occasions being the PDCCH monitoring occasions, configured by the paging search space configuration information, which are not overlapped with one or more UL symbols determined by the TDD configuration information; and monitoring a PDCCH addressed to paging radio network temporary identifier (P-RNTI) in at least one PDCCH monitoring occasion for the paging in the paging occasion corresponding to the identified paging occasion index.

In accordance with another aspect of the present disclosure, a method of a base station in a wireless communication system is provided, the method includes transmitting time division duplex (TDD) configuration information included in a system information block 1 (SIB 1); transmitting paging search space configuration information; identifying a paging frame and index of a paging occasion for transmitting a paging; identifying physical downlink control channel (PDCCH) monitoring occasions based on the TDD configuration information and the paging search space configuration information, the identified PDCCH monitoring occasions being the PDCCH monitoring occasions, configured by the paging search space configuration information, which are not overlapped with one or more UL symbols determined by the TDD configuration information; and transmitting a PDCCH for the paging using a paging radio network temporary identifier (P-RNTI) in at least one PDCCH monitoring occasion for the paging in the identified PDCCH monitoring occasions corresponding to the identified paging occasion index.

In accordance with another aspect of the present disclosure, a terminal in a wireless communication system is provided. The terminal includes a transceiver and a controller coupled with the transceiver and configured to receive, from a base station, time division duplex (TDD) configuration information included in a system information block 1 (SIB 1), receive, from the base station, paging search space configuration information, identify a paging frame and index of a paging occasion for monitoring a paging, identify physical downlink control channel (PDCCH) monitoring occasions for the paging based on the TDD configuration information and the paging search space configuration information, the identified PDCCH monitoring occasions being the PDCCH monitoring occasions, configured by the paging search space configuration information, which are not overlapped with one or more UL symbols determined by the TDD configuration information, and performing monitoring a PDCCH addressed to paging radio network temporary identifier (P-RNTI) in at least one PDCCH monitoring occasion for the paging in the paging occasion corresponding to the identified paging occasion index.

In accordance with another aspect of the present disclosure, a base station in a wireless communication system is provided. The base station includes a transceiver and a controller coupled with the transceiver and configured to transmit time division duplex (TDD) configuration information included in a system information block 1 (SIB 1), transmit paging search space configuration information, identify a paging frame and index of a paging occasion for transmitting a paging, identify physical downlink control channel (PDCCH) monitoring occasions based on the TDD configuration information and the paging search space configuration information, the identified PDCCH monitoring occasions being the PDCCH monitoring occasions, configured by the paging search space configuration information, which are not overlapped with one or more UL symbols determined by the TDD configuration information, and transmit a PDCCH for the paging using a paging radio network temporary identifier (P-RNTI) in at least one PDCCH monitoring occasion for the paging in the identified PDCCH monitoring occasions corresponding to the identified paging occasion index.

Advantageous Effects of Invention

According to the embodiments of the present disclosure, when performing random access in order to recover beam failure in a wireless communication system, a UE can transmit data in the Msg3 buffer after completing random access and prevent data loss. According to the embodiments, a base station can transmit a paging message in a DRX cycle without delay and uncertainty of PDCCH monitoring occasions between idle/inactive UEs and connected UE can be resolved.

BRIEF DESCRIPTION OF DRAWINGS

The above and other aspects, features, and advantages of certain embodiments of the disclosure will be more apparent from the following description taken in conjunction with the accompanying drawings, in which:

FIG. 35B illustrates an example of valid PDCCH monitoring occasions for paging according to method 1.

MODE FOR THE INVENTION

Hereinafter, embodiments of the disclosure will be described with reference to accompanying drawings, in which a size of each component may be exaggerated for convenience. Detailed descriptions of known functions and configurations incorporated herein will be omitted for the sake of clarity and conciseness.

The terms which will be described below are defined in consideration of the functions in the disclosure, and may be different according to users, intentions of the users, or customs. Therefore, the definitions of the terms, such as for identifying an access node, referring to network entities, referring to messages, referring to an interface between network objects, and referring to various identification information, should be made based on the contents throughout the specification. The disclosure is not limited by the following terms, and other terms referring to objects having equivalent technical meanings may be used.

For convenience of explanation, embodiments herein use terms and words defined in the third generation partnership project long term evolution (3GPP LTE) standard. However, the disclosure is not limited by these terms and words and may be equally applied to systems in accordance with other standards. In embodiments, the term evolved Node B (eNB) may be used interchangeably with gNB (5G base station or next generation node B) for convenience of explanation. That is, an eNB illustrated as a base station may refer to a gNB. The term "terminal" or "UE" may refer to a mobile phone, narrow band-Internet of things (NB-IoT) devices, sensors, and other wireless communication devices.

Embodiment 1

Figure 1:
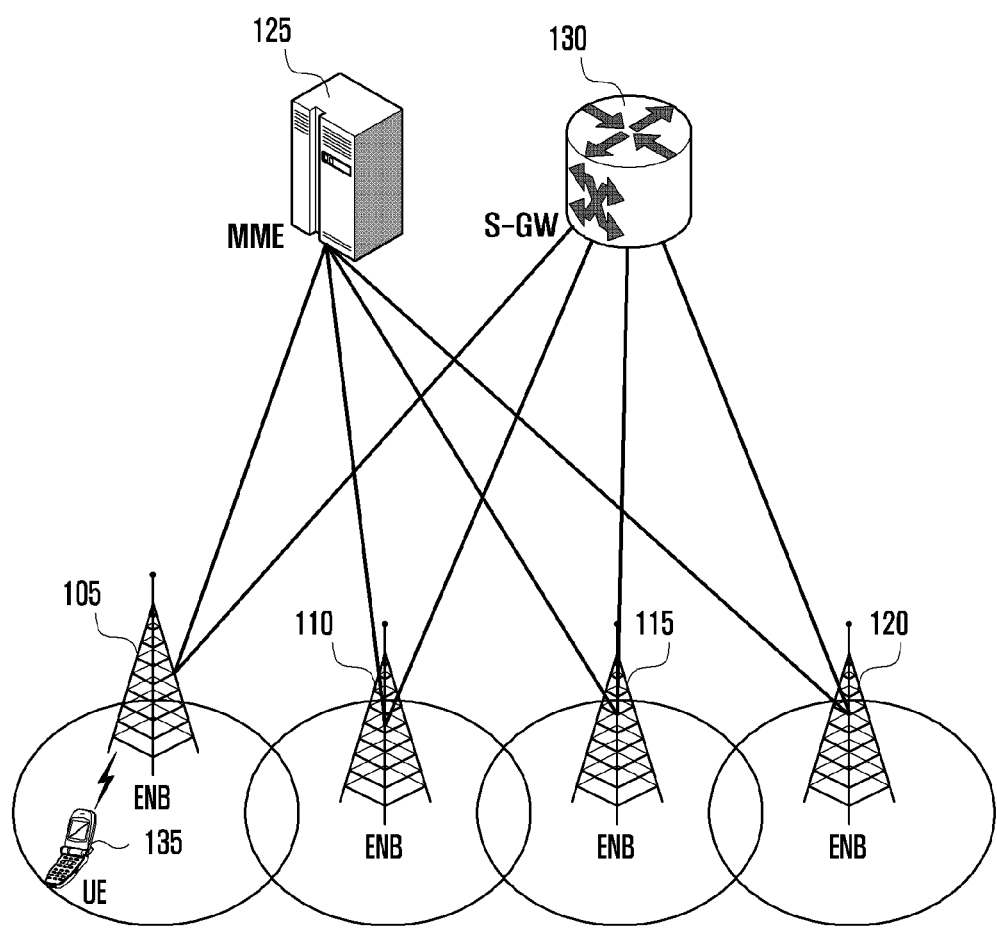
FIG. 1 illustrates the structure of an LTE system according to some embodiments of the disclosure.

FIG. 1 illustrates the structure of an LTE system according to some embodiments of the disclosure. An NR system also has practically the same structure.

Referring to FIG. 1, an LTE wireless communication system may include a plurality of ENBs 105, 110, 115, and 120, a mobility management entity (MME) 120, and a serving gateway (S-GW) 130. A User Equipment (hereinafter, referred to as a UE or a terminal) (135) may access an external network through the ENBs 105, 110, 115, and 120 and the S-GW 130.

The ENBs 105, 110, 115, and 120 may provide wireless access to the UE 135 accessing a network, which is an access node of a cellular network. That is, in order to serve traffic of users, the ENBs 105, 110, 115, and 120 perform scheduling on the basis of collected status information such as buffer statuses, available transmission power statuses, and channel statuses of UEs and support connection between the UE 135 and a core network (CN).

The MME 125 may be a device performing a function of managing the mobility of the UE 135 and various control functions and is connected to a plurality of ENBs, and the S-GW (130) may be a device providing a data bearer. The MME 125 and the S-GW 130 further perform authentication for the UE 135 accessing the network and bearer management, and process packets received from the ENBs 105, 110, 115, and 120 or packets to be transferred to the ENBs 105, 110, 115, and 120.

Figure 2:
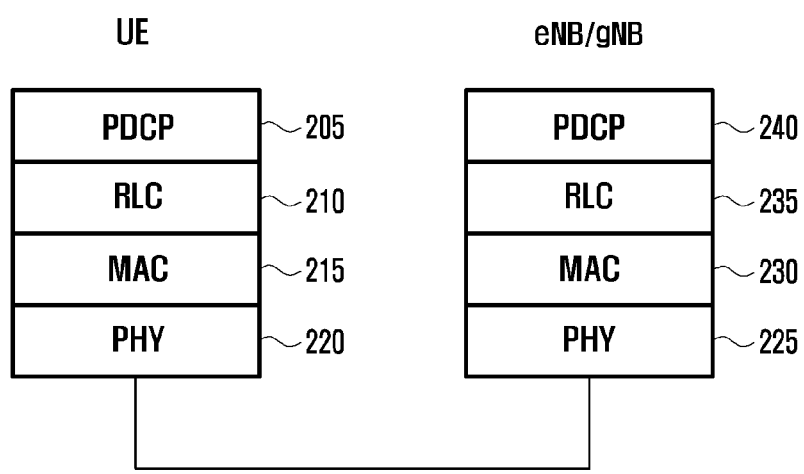
FIG. 2 illustrates radio protocol structures in LTE and NR systems according to some embodiments of the disclosure.

FIG. 2 illustrates wireless protocol structures in LTE and NR systems according to some embodiments of the disclosure.

Referring to FIG. 2, the UE and the ENB may include packet data convergence protocols (PDCPs) 205 and 240, radio link controls (RLCs) 210 and 235, and medium access controls (MACs) 215 and 230, respectively, in the wireless protocol of the LTE system.

The packet data convergence protocols (PDCPs) 205 and 240 perform an operation of compressing/reconstructing an IP header, and the radio link controls (RLCs) 210 and 235 reconfigure a PDCP Packet data unit (PDU) to have a proper size. The MACs 215 and 230 are connected with various RLC layer devices included in one UE, and perform an operation of multiplexing RLC PDUs to the MAC PDU and de-multiplexing the RLC PDUs from the MAC PDU. The PHY layers 220 and 225 perform an operation of channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

Further, the physical layer may use hybrid ARQ (HARQ) to correct an additional error, and a receiving side may transmit 1-bit information to indicate whether a packet transmitted by a transmitting side is received. The 1-bit information indicating whether the packet transmitted by the transmitting side is received is HARQ ACK/NACK information.

Downlink HARQ ACK/NACK information for uplink data transmission may be transmitted through a physical channel such as a physical hybrid-ARQ indicator channel (PHICH) in LTE. Since asynchronous HARQ is applied in NR, it may be determined whether retransmission is required or new transmission is required through scheduling information of the corresponding UE in a physical dedicated control channel (PDCCH) which is a channel in which downlink/uplink resource allocation is performed in NR.

Uplink HARQ ACK/HARQ information for downlink transmission may be transmitted through a physical channel such as a physical uplink control channel (PUCCH) or a physical uplink shared channel (PUSCH). The PUCCH is generally transmitted in uplink of a primary cell (PCell) described below, but is sometimes additionally transmitted in a secondary cell (SCell). At this time, the PUCCH transmitted in the SCell is referred to as a PUCCH SCell.

Although not illustrated, there may be a radio resource control (RRC) layer above the PDCP layer of each of the UE and the ENB, and the RRC layer may exchange an access- and measurement-related configuration control message to control radio resources.

Meanwhile, the PHY layer may include one or a plurality of frequencies/subcarriers, and a technology for simultaneously configuring and using a plurality of frequencies is referred to as carrier aggregation (CA). CA may significantly increase the amount of transmission by the number of subcarriers additionally using a primary carrier and one or a plurality of subcarriers, which is beyond the conventional technology, in which only one subcarrier is used for communication between the UE and the ENB (E-UTRAN NodeB, eNB). Meanwhile, in LTE, a cell within the ENB using a primary carrier is referred to as a primary cell (PCell) and a cell within the eNB using a secondary carrier is referred to as a secondary cell (SCell).

Figure 3:
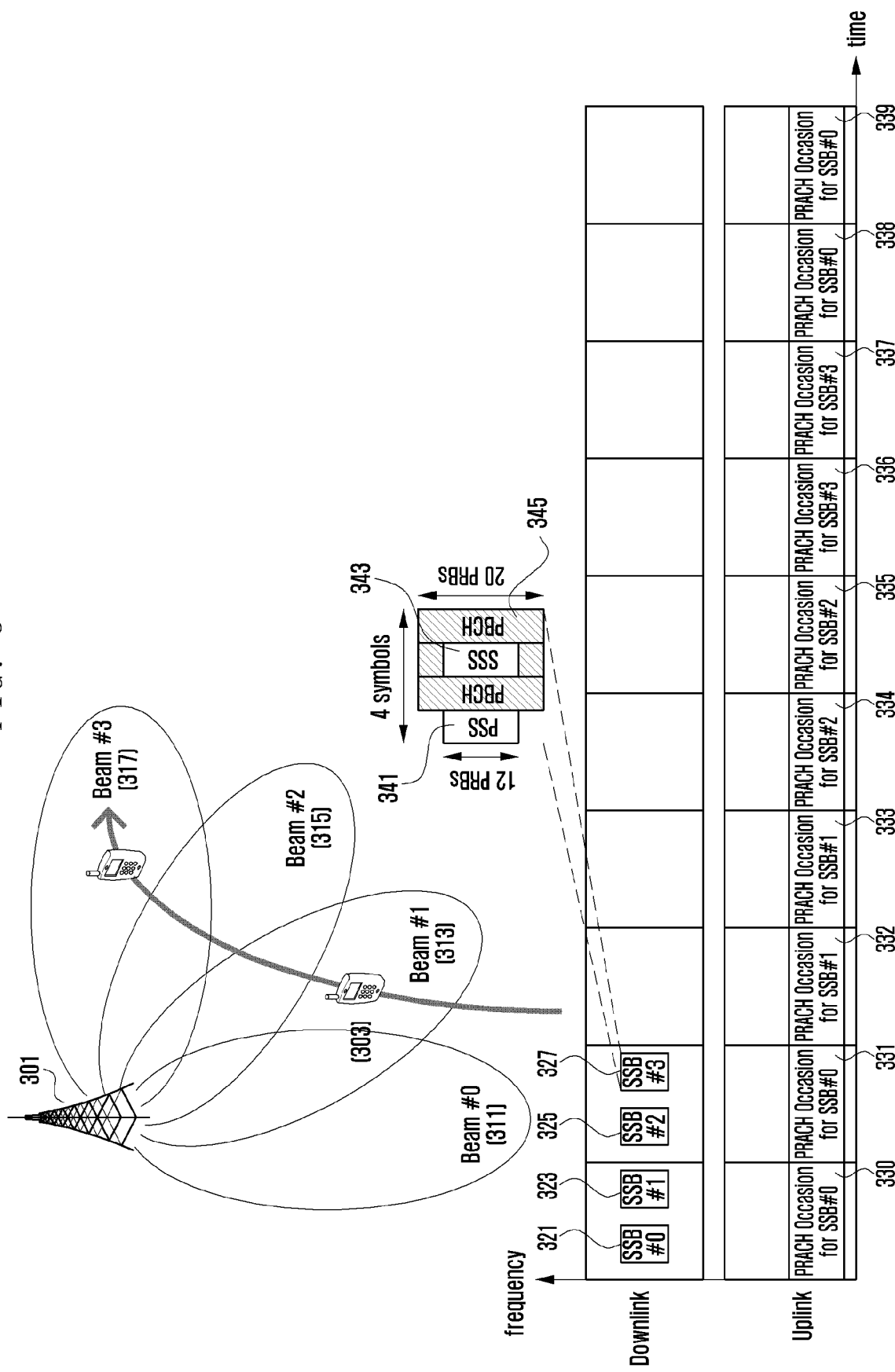
FIG. 3 illustrates downlink and uplink channel frame structures when communication is performed on the basis of beams in an NR system according to some embodiments of the disclosure.

FIG. 3 illustrates downlink and uplink channel frame structures when communication is performed on the basis of beams in an NR system according to some embodiments of the disclosure.

Referring to FIG. 3, the ENB 301 may transmit signals in the form of beams in order to secure wider coverage or transmit stronger signals as indicated by reference numerals 311, 313, 315, and 317. Accordingly, the UE 303 within the cell should transmit and receive data using a specific beam (beam #1 313 in FIG. 3) transmitted by the ENB.

Meanwhile, a state of the UE may be divided into an idle mode (RRC_IDLE) state and a connected mode (RRC_CONNECTED) state according to whether the UE is connected to the ENB. Accordingly, the ENB cannot know the location of the UE in the idle mode state.

When the UE in the idle mode state switches to the connected mode state, the UE may receive synchronization signal blocks (SSBs) 321, 323, 325, and 327 transmitted by the ENB. The SSBs are SSB signals transmitted periodically according to a period configured by the eNB, and each SSB may be divided into a primary synchronization signal (PSS) 341, a secondary synchronization signal (SSS) 343, and a physical broadcast channel (PBCH) 345.

FIG. 3 assumes a scenario in which the SSB is transmitted for each beam. For example, it is assumed that SSB #0 321 is transmitted using beam #0 311, SSB #1 323 is transmitted using beam #1 313, SSB #2 325 is transmitted using beam #2 315, and SSB #3 327 is transmitted using beam #3 317. Although FIG. 3 assumes that the UE in the idle mode is located in beam #1, even when the UE in the connected mode performs the random access, the UE may select an SSB received at a time point at which random access.

According to the assumption that the UE is located in beam #1, the UE receives SSB #1 transmitted through beam #1 in FIG. 3. Upon receiving SSB #1, the UE may acquire a physical cell identifier (PCI) of the ENB through a PSS and an SSS and receive a PBCH and thus identify an identifier (that is, #1) of a currently received SSB, the location at which the current SSB is received within a frame of 10 ms, and a System Frame Number (SFN) of the SSB within an SFN having a period of 10.24 seconds.

The PBCH may include a master information block (MIB) and provide information indicating the location at which system information block type 1 (SIB 1) for broadcasting more detailed cell configuration information is received through the MIB. Upon receiving SIB1, the UE may know the total number of SSBs transmitted by the ENB and detect the location of physical random access channel (PRACH) occasion for performing random access (more specifically, transmitting a preamble which is a physical signal specially designed to perform uplink synchronization) in order to switch to the connected mode state (FIG. 3 assumes a scenario of allocation every 1 ms: from 330 to 339).

Further, the UE may know the mapped PRACH occasion among the PRACH occasions and the SSB index to which the PRACH occasion is mapped on the basis of the information. For example, FIG. 3 assumes a scenario in which the PRACH occasion is allocated every 1 ms and a scenario in which ½ SSBs are allocated per PRACH occasion (that is, 2 PRACH occasions per SSB). Accordingly, FIG. 3 illustrates the scenario in which 2 RPACH occasions are allocated per SSB from the beginning of the PRACH occasion starting according to the SFN. That is, in the scenario, the PRACH occasions are allocated for SSB #0 as indicated by reference numerals 330 and 331 and the PRACH occasions are allocated for SSB #1 as indicated by reference numerals 332 and 333. After the PRACH occasions are configured for all SSBs, the PRACH occasion may be allocated for the first SSB again as indicated by reference numerals 338 and 339.

Accordingly, the UE may recognize the PRACH occasions 332 and 333 for SSB #1 and transmit a random access preamble to currently the earliest PRACH occasion among the PRACH occasions 332 and 333 corresponding to SSB #1 (for example, 332). Since the ENB receives the preamble in the PRACH occasion 332, the ENB may know that the corresponding UE selected SSB #1 and transmitted the preamble and thus transmit and receive data through the corresponding beam in the following random access.

Meanwhile, even when the UE in the connected state moves from a current (source) ENB to a destination (target) ENB for the reason of handover, the UE may perform random access for the target ENB and perform an operation of selecting the SSB and transmitting the random access preamble or data as described with reference to FIG. 3.

Further, in the handover, a command for handover from the source ENB to the target ENB may be transmitted to the UE, and a corresponding UE-dedicated random access preamble identifier may be allocated to the handover command message for each SSB of the target ENB to be used when random access to target ENB is performed.

At this time, the ENB may not allocate the dedicated random access preamble identifiers to all beams (according to the current location of the UE) and accordingly, the dedicated random access preambles may not be allocated some SSBs (for example, the dedicated random access preambles are allocated only to beams #2 and #3). If the dedicated random access preamble is not allocated to the SSB which the UE selects for preamble transmission, the UE randomly selects a contention-based random access preamble and performs random access.

For example, FIG. 3 may use a scenario in which the UE is initially located in beam #1 and performs random access but fails in the random access and then the UE is located in beam #3 and transmits a dedicated preamble when transmitting the random access preamble again. That is, when retransmission of the preamble is performed, a contention-based random access procedure and a non-contention-based random access procedure may coexist within one random access procedure according to whether a dedicated random access preamble is allocated to a selected SSB in every preamble transmission.

Figure 4:
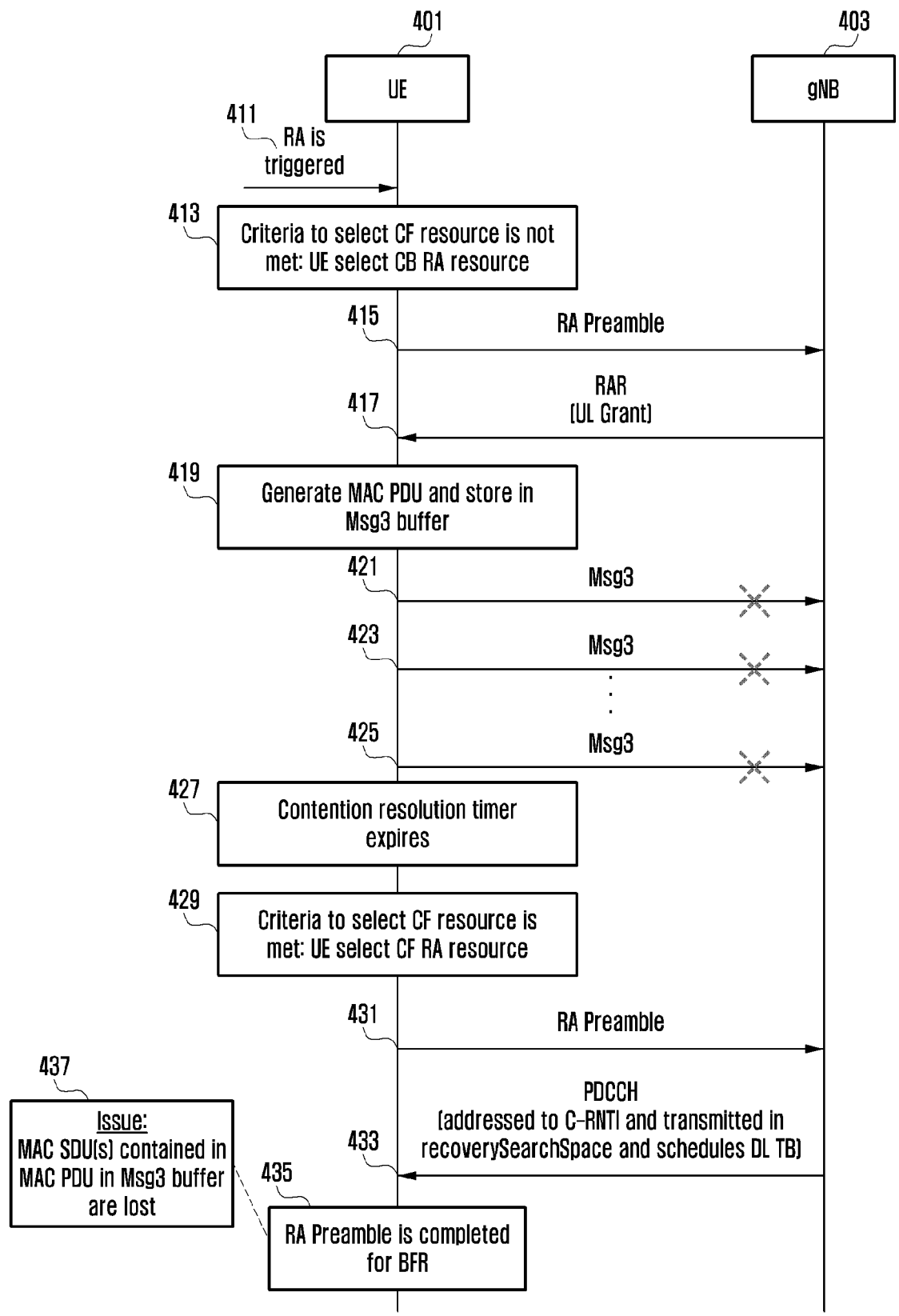
FIG. 4 illustrates contention-based and non-contention-based random access procedures performed by the UE in a condition such as beam failure recovery according to some embodiments of the disclosure.

FIG. 4 illustrates contention-based and non-contention-based random access procedures performed by the UE in a condition such as recovery of beam failure according to some embodiments of the disclosure.

The random access procedure may include a contention-based random access procedure and a non-contention-based random access procedure, and the non-contention-based random access procedure may have a procedure in which the gNB allocates dedicated random access resources to allow the UE to perform non-contention-based random access.

The aforementioned dedicated random access resources may be a specific preamble index and/or PRACH resources on a specific time/frequency. Information for allocating dedicated random access resources may be allocated through a PDCCH or transmitted through a message in an RRC layer. The message in the RRC layer may include a message such as RRCReconfiguration (for example, in the case of handover). If there are dedicated random access resources allocated by the gNB in an SSB/CSI-RS selected for the random access procedure currently performed by the UE, the UE transmits a random access preamble through the allocated dedicated random access resources.

In the non-contention-based random access, when there is a preamble transmitted by the UE in an RAR message described below, the UE determines that the random access is successfully completed and ends the random access procedure.

Meanwhile, as illustrated in FIG. 3, the scenario in which the UE transmits and receives a signal in a specific beam but fails in using the currently used beam for the reason of movement of the UE and thus recovers beam use failure within one ENB may be considered, and this is referred to as a beam failure recovery procedure. The random access procedure may be used for the beam failure recovery procedure. In the beam failure recovery procedure, the gNB may allocate dedicated random access resources corresponding to the recovered beam, and the UE receiving the dedicated random access resources corresponding to the recovered beam may perform non-contention-based random access. If the gNB does not allocate dedicated resources, the UE may perform contention-based random access.

FIG. 4 assumes a scenario in which the UE performs random access for beam failure recovery.

That is, a scenario in which random access is triggered to recover beam failure since a signal strength of the beam currently transmitted and received by the UE 401 is lowered may be assumed in step 411. The UE determines which beam is used to transmit and receive data including random access and selects an SSB in step 413.

A method by which the UE selects the SSB is described below. The gNB 403 configures a threshold to be used for beam failure recovery and configures dedicated random access resources for each SSB. If an SSB for which dedicated random access resources are configured exists in SSBs of which the signal strength is higher than the threshold among the received SSBs, the UE selects the SSB for which the dedicated random access resources are configured.

For example, if the UE receives all of SSB #0, SSB #1, and SSB #2 but the gNB configures dedicated random access resources only for SSB #1 and SSB #2 and only signal strengths of SSB #0 and SSB #1 are higher than the threshold, the UE selects SSB #1 and performs non-contention-based random access. If only the signal strength of SSB #0 is higher than the threshold in the above example, the UE selects SSB #0 and performs contention-based random access. In the scenario illustrated in FIG. 4, a procedure in which a beam (for example, SSB #0 in the above example) in which no dedicated resources are configured is selected and contention-based random access is performed since the beam in which dedicated resources are configured cannot satisfy a condition is described in step 413.

As described above, if the UE selects the SSB, the UE may know the PRACH occasion mapped to the selected SSB and accordingly transmit a random access preamble to the gNB through the corresponding PRACH occasion in step 415. Since the dedicated preamble is not allocated to the selected SSB, the UE performs contention-based random access as described above. That is, the UE randomly selects and transmits one of the contention-based preamble identifiers.

Further, one or more UEs may simultaneously transmit the random access preambles through the PRACH occasion (that is, another UE may randomly selects one of the contention-based preamble identifiers and transmit the same to the corresponding resources, and a plurality of UEs may select the same preamble index.

PRACH resources may exist over one subframe, or only some symbols within one subframe may be used. Information on PRACH resources may be included in system information broadcasted by the gNB or configuration information in a handover command, and the UE may know which time and frequency resources are used for transmitting preambles through the information on the PRACH resources. Random access preambles are specific sequences specially designed to be received even though they are transmitted before the UE and the gNB are completely synchronized, and there may be a plurality of preamble identifiers (indices) according to standards. If there are a plurality of preamble identifiers, the preamble transmitted by the UE may be randomly selected by the UE from a plurality of preambles or may be a specific preamble designated by the gNB.

Meanwhile, if the gNB configures a specific signal to be measured when the UE in the connected mode state performs random access, the UE may select the PRACH occasion on the basis of the corresponding specific signal to be measured. The corresponding specific signal to be measured may be an SSB or a channel state information reference signal (CSI-RS). For example, if handover is performed due to movement of the UE, the gNB may configure the PRACH occasion mapped to the SSB or the CSI-RS of the target gNB in the handover command, and accordingly the UE measures the configured signal and determine which PRACH occasion is used for transmitting the random access preamble.

If the gNB receives the preamble (or a preamble transmitted by another UE), the gNB transmits a random access response (hereinafter, referred to as an RAR) to the preamble to the UE in step 417. The RAR message includes preamble identifier information used in step 415, uplink transmission timing correction information, and uplink resource allocation information and temporary UE identifier information to be used in the following step (that is, step 421). For example, if a plurality of UEs transmit different preambles and attempt random access in step 415, the preamble identifier information is transmitted to inform of the preamble to which the RAR message responds. The uplink resource allocation information is detailed information on resources to be used by the UE in step 421 and includes the physical location and size of resources, a decoding and a coding scheme (modulation and coding scheme (MCS)), and transmission power control information. If the UE transmitting the preamble initially accesses the gNB, the UE does not have an identifier allocated by the gNB for communication with the gNB, so that the temporary UE identifier information is a value transmitted for initial access of the UE.

The RAR message should be transmitted within a predetermined period after a predetermined time from transmission of the preamble, and the predetermined period is referred to as an "RAR window". The RAR window starts at a time point after a predetermined time from transmission of the first preamble. The predetermined time may have a value in units of subframes (4 ms) or a smaller value. The length of the RAR window is configured within a system information message broadcasted by the gNB or within a handover command message.

Meanwhile, when the RAR message is transmitted, the gNB schedules the corresponding RAR message through a PDCCH, and the corresponding scheduling information is scrambled using a random access-radio network temporary identifier (RA-RNTI). The RA-RNTI is mapped to PRACH resources used to transmit the message in step 415, and the UE transmitting the preamble to specific PRACH resources may attempt PDCCH reception on the basis of the RA-RNTI and determine whether there is an RAR message corresponding to the preamble transmitted by the UE. That is, if the RAR message is a response to the preamble transmitted by the UE in step 415 as illustrated in the drawing (FIG. 14), the RA-RANTI used for scheduling information of the RAR message include information on the corresponding transmission in step 415. To this end, the RA-RANTI may be calculated by the following equation.

$$\text{RA-RNTI}=1+s\_id+14\times t\_id+14\times 80\times f\_id+14\times 80\times 8\times \text{ul\_carrier\_id} \quad \text{Equation 1}$$

In Equation 1, s_id denotes an index corresponding to a first OFDM symbol at which transmission of preamble in step 415 starts and has a value of $0 \leq s\_id < 14$ (that is, smaller than a maximum number of OFDMs within one slot). t_id denotes an index corresponding to a first slot at which transmission of the preamble in step 415 starts and has a value of $0 \leq t\_id < 80$ (that is, a maximum number of slots within one system frame (40 ms)). f_id denotes PRACH resources on the frequency through which the preamble transmitted in step 415 is transmitted and has a value of $0 \leq f\_id < 8$ (that is, smaller than a maximum number of PRACHs on the frequency within the same time). ul_carrier_id denotes a factor for identifying whether a preamble is transmitted in normal uplink (NUL) (in this case, 0) or a preamble is transmitted in supplementary uplink (SUL) (in this case, 1) if two subcarriers are used for uplink in one cell.

In the FIG. 4, a scenario in which the UE receives the RAR message using the RA-RANTI corresponding to transmission of the preamble 415 and a response to the preamble identifier transmitted by the UE is included in the RAR message is assumed. Accordingly, the UE inserts a message to be transmitted into an Msg3 buffer within the UE to fit the size of uplink resources for Msg 3 allocated to the RAR message in step 419. In the random access procedure, the preamble is referred to as Msg1, the RAR is referred to as Msg2, a message transmitted by the UE in uplink is referred to as Msg3, a message received by the UE in downlink is referred to as Msg4, and a buffer for storing data to be transmitted through Msg3 is referred to as Msg3.

In the scenario of the FIG. 4, it is assumed that beam failure recovery is performed in the connected mode of the UE. Accordingly, the UE may generate data to be transmitted by the UE along with uplink data according to the size of allocated uplink resources received in the RAR, the generated data including a C-RNTI MAC control element (CE) (MAC CE is a control message in the MAC layer) including C-RNTI information indicating that the UE currently performing random access is the UE, and transmit the generated data in step 421.

However, the FIG. 4 assumes a scenario in which the UE fails in transmitting Msg3 in steps 421, 423, and 425. The UE transmits Msg3, starts ra-ContentionResolutionTimer (random access-contention resolution timer), when a response to Msg3 does not arrive until the corresponding timer expires in step 427, determines that Msg3 has not been normally transmitted, and starts a procedure of transmitting again the random access preamble.

If ra-ContentionResolutionTimer expires, the UE selects an SSB again at the time point at which the timer expires in order to retransmit the preamble. In steps 429 to 437 of FIG. 4, a scenario in which the SSB which the UE selects again is an SSB to which dedicated random access resources area is allocated like SSB #1 in the above example in step 429. The UE transmits a dedicated preamble through the PRACH occasion corresponding to the selected SSB in step 431. If non-contention-based random access is performed in beam failure recovery as in the scenario of step 429, the UE receives a PDCCH for downlink or uplink resource allocation instead of the RAR as a message corresponding to the transmitted preamble in step 433. More specifically, when the UE receives the beam failure recovery-related configuration from the gNB, the UE separately receives the resource location (recoverySearchSpace) at which the PDCCH for downlink or uplink resource allocation is received. Upon receiving the PDCCH scrambled with a C-RNTI which is a unique identifier within the cell of the UE for downlink or uplink resource allocation at the corresponding resource location in step 433, the UE determines that random access ends in step 435.

Meanwhile, when the UE performs contention-based random access (procedure in steps 411 to 427), not only the C-RNTI MAC CE but also uplink data is included in the Msg3 buffer. If the UE receives a PDCCH for downlink as Msg2 in the non-contention-based random access procedure (procedure in steps 429 to 435), the UE has no resource to be transmitted in uplink and has completed the random access procedure, and thus deletes the Msg3 buffer. As described above, if Msg3 is deleted, the UE loses uplink data which was in the Msg3 buffer in step 437.

Figure 5:
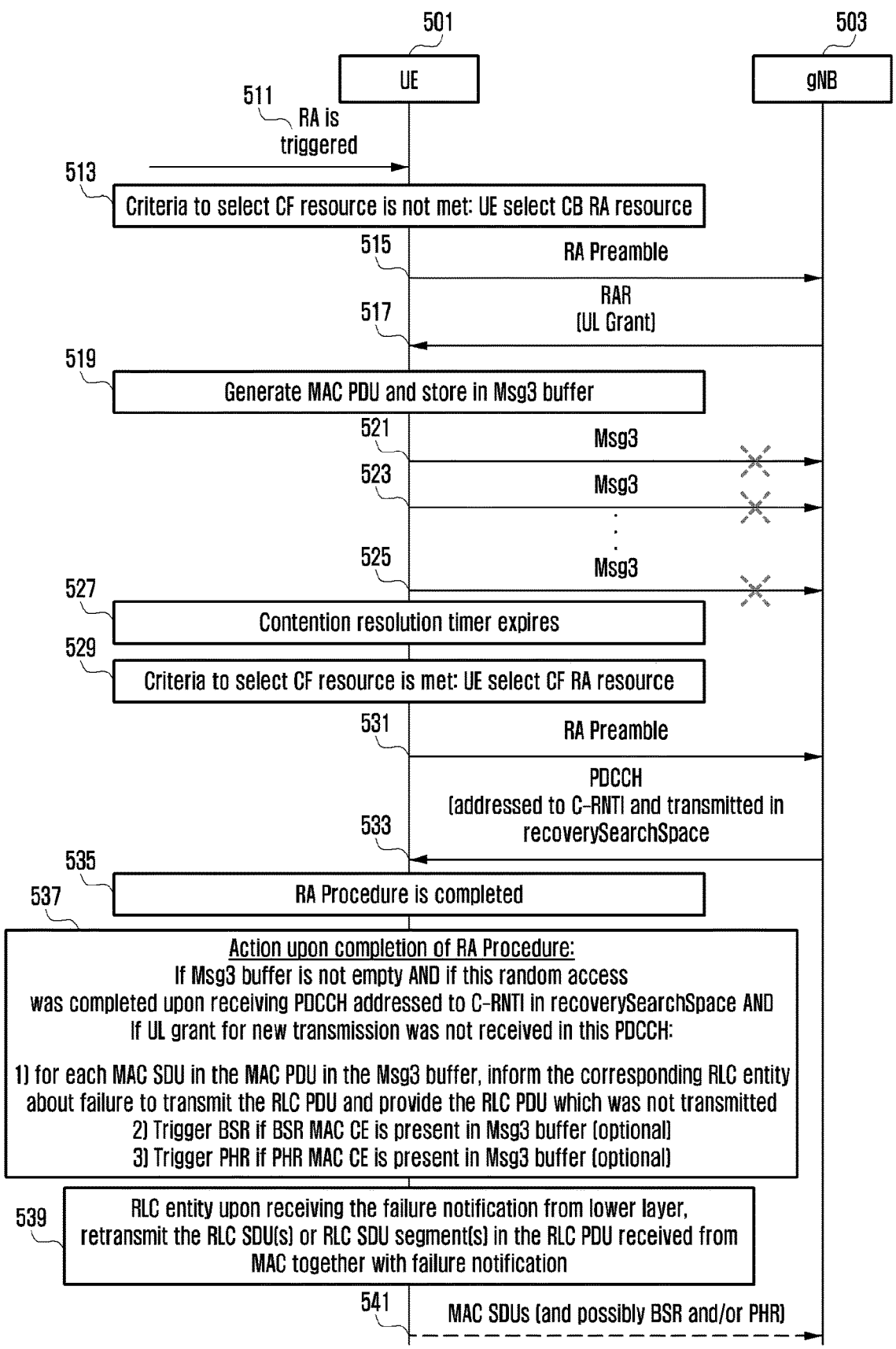
FIG. 5 illustrates data transmission and reception between the UE and the gNB when a method of preventing data loss is applied according to some embodiments of the disclosure.

FIG. 5 illustrates data transmission and reception between the UE and the gNB when a method of preventing data loss is applied according to some embodiments of the disclosure.

In FIG. 5, the description which is the same as that in FIG. 4 will be omitted. Steps 511 to 535 of FIG. 1E are the same as steps 411 to 435 of FIG. 4. That is, FIG. 5 assumes a scenario in which the UE 501 performs contention-based random access in steps 511 to 527, performs non-contention-based random access in steps 529 to 535, receives a PDCCH for downlink resource allocation, and then completes the random access procedure in step 535.

The UE according to some embodiments of the disclosure determines whether there is data in the Msg3 buffer when random access is completed, whether the UE receives a PDCCH indicated by a C-RNTI of the UE in recoverSearchSpace and ends random access (or whether random access starts to recover beam failure and random access is completed on the basis of non-contention), and whether uplink resources are not allocated to the PDCCH indicated by the C-RNTI (or whether downlink resources are allocated).

If the above conditions are satisfied, for each MAC SDU in the MAC PDU in the Msg3 buffer, the UE informs the corresponding RLC layer (entity) that transmission is failed and thus not performed to in order to prevent data in the Msg3 buffer from being lost as described above in step 537.

At this time, the MAC layer may use a logical channel identifier (LCID) in order to identify the RLC layer from where each MAC SDU comes. In addition, there is a PDCP entity and an RLC entity corresponding to a data radio bearer (DRB) above on MAC layer, and the MAC receives data from each RLC entity to transmit uplink data.

The RLC layer receiving notification of the transmission failure from the MAC layer may retransmit the RLC SDU or segments of the RLC SDU included in the RLC PDU through the corresponding failure notification is provided in 539. More specifically, the RLC layer may include RLC-AM and RLC-UM according to the data type. The RLC-AM is an RLC layer capable of transmitting a packet again in order to prevent data loss if transmission acknowledgement is not received from a receiving side, and the RLC-UM is an RLC layer performing only uni-directional transmission without separate transmission acknowledgement. If the MAC SUD in the data of Msg3 is a packet belonging to the RLC-AM, the RLC-AM may perform retransmission after receiving notification of the transmission failure. If the MAC SDU in the data of Msg3 is a packet belonging to the RLC-UM, the RLC-UM may discard the corresponding packet and not perform retransmission or may store the corresponding packet and retransmits the packet even in the case of the RLC-UM after receiving notification of the transmission failure. If the RLC layer retransmits the packet, the UE may transmit the corresponding packet when the UE receives uplink resources from the gNB 503 in step 541.

Meanwhile, the Msg3 buffer may include not only general data but also a relevant MAC CE for a buffer status report (BSR) and/or a relevant MAC CE for a power headroom report (PHR). Accordingly, if there is the MAC CE related to the BSR or the PHR within Msg3, the MAC CE(s) may be lost due to deletion of the Msg3 buffer and thus the buffer status of the UE and remaining uplink power information may not be transmitted to the gNB.

Conditions for triggering the BSR and the PHR, respectively already exist. For example, if data having a high priority is generated, the BSR may be triggered and the UE may transmit the BSR to the gNB and thus the gNB may know that the data having the high priority has arrived.

In some embodiments of the disclosure, in addition to the conventional triggering conditions, a new condition for triggering the BSR or the PHR even when the MAC CE related to the BSR or the PHR exists in the Msg3 buffer and thus is lost. For example, if the MAC CE related to the BSR exists in the Msg3 buffer and is lost due to deletion of the Msg3 buffer, the BSR may be newly triggered. If the MAC CE related to the PHR exists in the Msg3 buffer and is lost due to deletion of the Msg3 buffer, the PHR may be newly triggered.

Through addition of the condition for triggering the BSR or the PHR, the UE may prevent BSR or PHR data from being lost.

Figure 6:
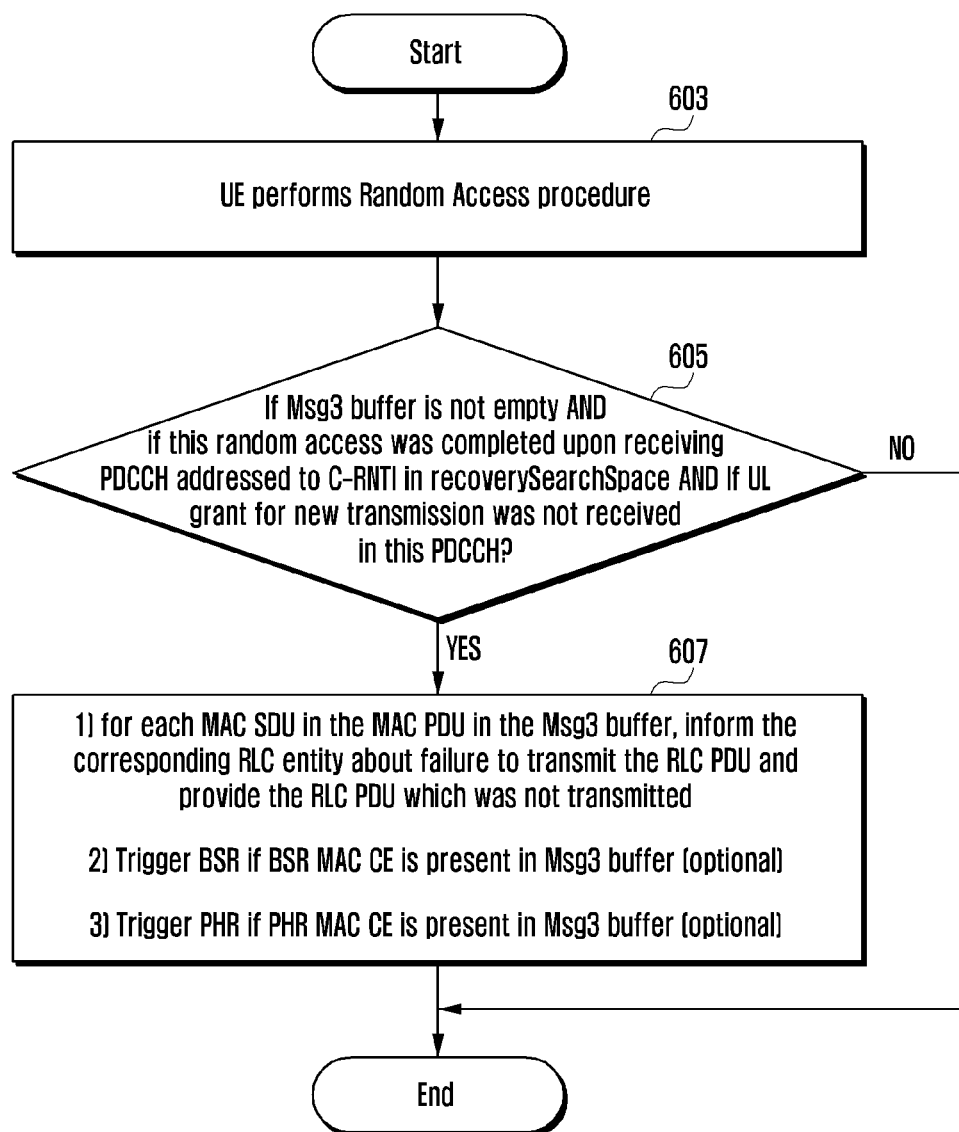
FIG. 6 illustrates a procedure performed within the UE when a method of preventing data loss is applied according to some embodiments of the disclosure.

FIG. 6 illustrates a procedure performed within the UE when a method of preventing data loss is applied according to some embodiments of the disclosure.

In FIG. 6, a scenario in which the UE in the connected state performs random access and completes the random access in order to recover beam failure is assumed in step 603.

When the random access is completed as in step 603, the UE according determines whether there is data in the Msg3 buffer, whether the UE receives a PDCCH indicated by a C-RNTI of the UE in recoverSearchSpace and ends random access (or whether random access starts to recover beam failure and random access is completed on the basis of non-contention), and whether uplink resources are not allocated to the PDCCH indicated by the C-RNTI (or whether downlink resources are allocated) in step 605.

If the above conditions are satisfied, for each MAC SDU in the MAC PDU in the Msg3 buffer, the UE informs the corresponding RLC layer (entity) that transmission is failed and thus not performed in order to prevent data in the Msg3 buffer from being lost as described above in step 607.

At this time, the MAC layer may use a logical channel identifier (LCID) in order to identify the RLC layer from where each MAC SDU comes from. In addition, there is a PDCP entity and an RLC entity corresponding to a data radio bearer (DRB) above on MAC layer, and the MAC receives data from each RLC to transmit uplink data.

The RLC layer receiving notification of the transmission failure from the MAC layer may retransmit the RLC SDU or segments of the RLC SDU included in the RLC PDU through the corresponding failure notification is provided. More specifically, the RLC layer may include RLC-AM and RLC-UM according to the data type. The RLC-AM is an RLC layer capable of transmitting a packet again in order to prevent data loss if transmission acknowledgement is not received from a receiving side, and the RLC-UM is an RLC layer performing only uni-directional transmission without separate transmission acknowledgement. If the MAC SUD in the data of Msg3 is a packet belonging to the RLC-AM, the RLC-AM may perform retransmission after receiving notification of the transmission failure. If the MAC SDU in the data of Msg3 is a packet belonging to the RLC-UM, the RLC-UM may discard the corresponding packet and not perform retransmission or may store the corresponding packet and retransmits the packet even in the case of the RLC-UM after receiving notification of the transmission failure. If the RLC layer retransmits the packet, the UE may transmit the corresponding packet when the UE receives uplink resources from the gNB.

Meanwhile, the Msg3 buffer may include not only general data but also a relevant MAC CE for a buffer status report (BSR) and/or a relevant MAC CE for a power headroom report (PHR). Accordingly, if there is the MAC CE related to the BSR or the PHR within Msg3, the MAC CE(s) may be lost due to deletion of the Msg3 buffer and thus the buffer status of the UE and remaining uplink power information may not be transmitted to the gNB.

Conditions for triggering the BSR and the PHR, respectively already exist. For example, if data having a high priority is generated, the BSR may be triggered and the UE may transmit the BSR to the gNB and thus the gNB may know that the data having the high priority has arrived.

In some embodiments of the disclosure, in addition to the conventional triggering conditions, a new condition for triggering the BSR or the PHR even when the MAC CE related to the BSR or the PHR in the Msg3 buffer is lost. For example, if the MAC CE related to the BSR exists in the Msg3 buffer and is lost due to deletion of the Msg3 buffer, the BSR may be newly triggered. If the MAC CE related to the PHR exists in the Msg3 buffer and is lost due to deletion of the Msg3 buffer, the PHR may be newly triggered in 607.

Through addition of the condition for triggering the BSR or the PHR, the UE may prevent BSR or PHR data from being lost.

Hereinafter, the method of preventing BSR and PHR loss is described with reference to FIGS. 7 to 10.

Figure 7:
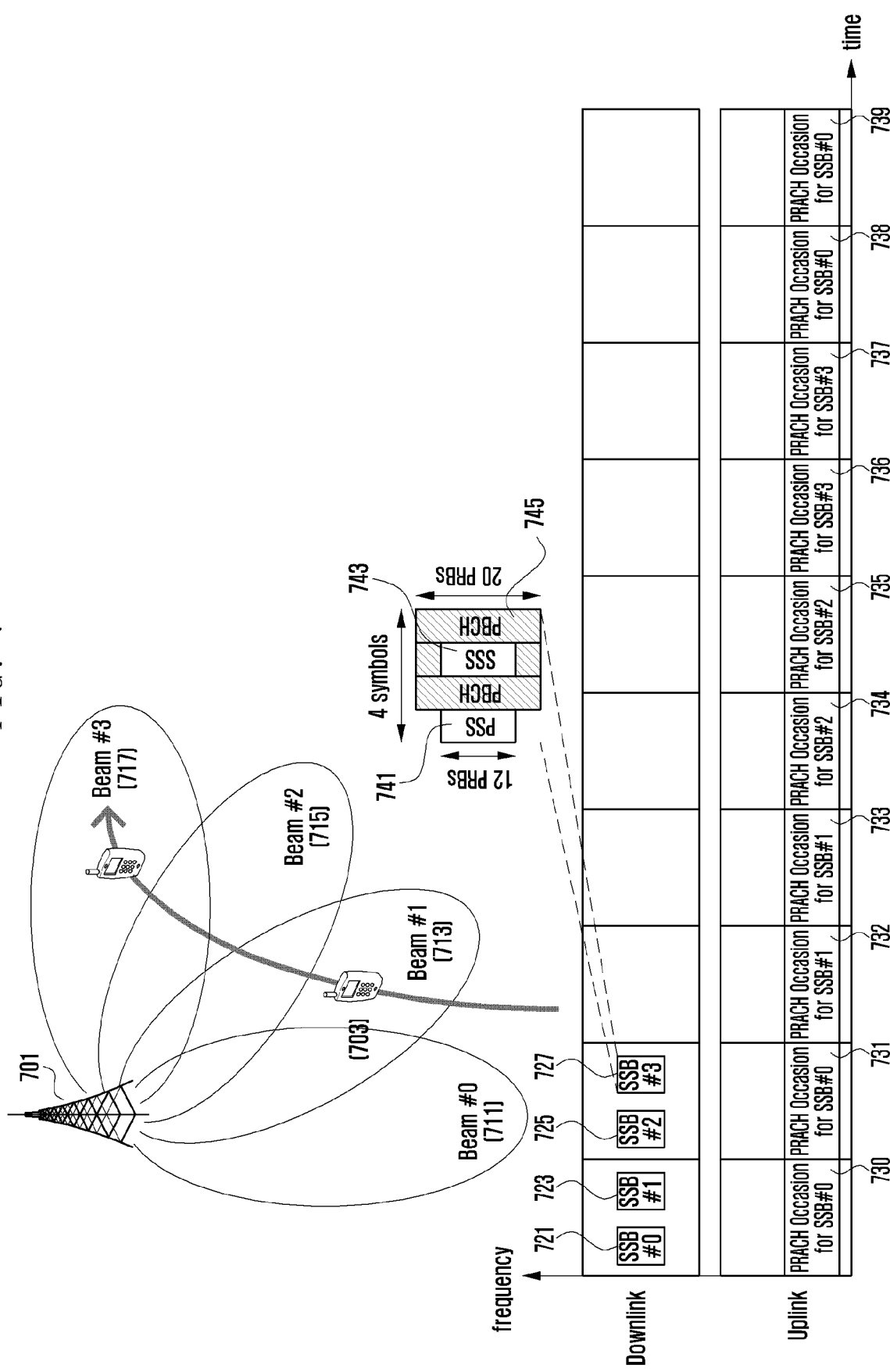
FIG. 7 illustrates downlink and uplink channel frame structures when communication is performed on the basis of beams in an NR system according to some embodiments of the disclosure.

FIG. 7 illustrates downlink and uplink channel frame structures when communication is performed on the basis of beams in an NR system according to some embodiments of the disclosure.

Referring to FIG. 7, the ENB 701 may transmit signals in the form of beams in order to secure wider coverage or transmit stronger signals as indicated by reference numerals 711, 713, 715, and 717. Accordingly, the UE 703 within the cell should transmit and receive data using a specific beam (beam #2 713 in FIG. 7) transmitted by the ENB.

Meanwhile, a state of the UE may be divided into an idle mode (RRC_IDLE) state and a connected mode (RRC_CONNECTED) state according to whether the UE is connected to the ENB. Accordingly, the ENB cannot know the location of the UE in the idle mode state.

If the UE in the idle mode state switches to the connected mode state, the UE may receive synchronization signal blocks (SSBs) 721, 723, 725, and 727 transmitted by the ENB. The SSBs are SSB signals transmitted periodically according to a period configured by the eNB, and each SSB may be divided into a priority synchronization signal (PSS) 741, a secondary synchronization signal (SSS) 743, and a physical broadcast channel (PBCH) 745.

FIG. 7 assumes a scenario in which the SSB is transmitted for each beam. For example, it is assumed that SSB #0 721 is transmitted using beam #0 711, SSB #1 723 is transmitted using beam #1 713, SSB #2 725 is transmitted using beam #2 715, and SSB #3 727 is transmitted using beam #3 717. Although FIG. 7 assumes that the UE in the idle mode is located in beam #1, even when the UE in the connected mode performs the random access, the UE may select an SSB received at a time point at which random access.

According to the assumption that the UE is located in beam #1, the UE receives SSB #1 transmitted through beam #1 in FIG. 7. Upon receiving SSB #1, the UE may acquire a physical cell identifier (PCI) of the ENB through a PSS and an SSS and receive a PBCH and thus identify an identifier (that is, #1) of a currently received SSB, the location at which the current SSB is received within a frame of 10 ms, and a System Frame Number (SFN) of the SSB within an SFN having a period of 10.24 seconds.

The PBCH may include a master information block (MIB) and provide information indicating the location at which system information block type 1 (SIB 1) for broadcasting more detailed cell configuration information is received through the MIB. Upon receiving SIB1, the UE may know the total number of SSBs transmitted by the ENB and detect the location of physical random access channel (PRACH) occasion for performing random access (more specifically, transmitting a preamble which is a physical signal specially designed to perform uplink synchronization) in order to switch to the connected mode state (FIG. 7 assumes a scenario of allocation every 2 ms: from 730 to 739).

Further, the UE may know the mapped PRACH occasion among the PRACH occasions and the SSB index to which the PRACH occasion is mapped on the basis of the information. For example, FIG. 7 assumes a scenario in which the PRACH occasion is allocated every 1 ms and a scenario in which ½ SSBs are allocated per PRACH occasion (that is, 2 PRACH occasions per SSB). Accordingly, FIG. 7 illustrates the scenario in which 2 RPACH occasions are allocated per SSB from the beginning of the PRACH occasion starting according to the SFN. That is, in the scenario, the PRACH occasions are allocated for SSB #0 as indicated by reference numerals 730 and 731 and the PRACH occasions are allocated for SSB #2 as indicated by reference numerals 732 and 733. After the PRACH occasions are configured for all SSBs, the PRACH occasion may be allocated for the first SSB again as indicated by reference numerals 738 and 739.

Accordingly, the UE may recognize the PRACH occasions 732 and 733 for SSB #1 and transmit a random access preamble to currently the earliest PRACH occasion among the PRACH occasions 732 and 733 corresponding to SSB #1 (for example, 732). Since the ENB receives the preamble in the PRACH occasion 332, the ENB may know that the corresponding UE selected SSB #1 and transmitted the preamble and accordingly, transmit and receive data through the corresponding beam in the following random access.

Meanwhile, when moving from a current (source) ENB to a destination (target) ENB for the reason of handover, the UE in the connected state performs random access to the target ENB, and may perform an operation of selecting the SSB and transmitting the random access preamble or data as described with reference to FIG. 7.

If handover is performed, a handover command is transmitted to the UE to instruct the UE to move from the source ENB to the target ENB, and a corresponding UE-dedicated random access preamble identifier may be allocated to the handover command message for each SSB of the target ENB to be used when random access to the target ENB is performed.

At this time, the ENB may not allocate the dedicated random access preamble identifier to all beams (according to the current location of the UE), and accordingly, the dedicated random access preamble may not be allocated some SSBs (for example, allocate dedicated random access preambles only to beams #2 and #3). If the dedicated random access preamble is not allocated to the SSB selected by the UE for preamble transmission, the UE randomly selects the contention-based random access preamble and performs random access.

For example, FIG. 7 may use a scenario in which the UE is initially located in beam #1 and performs random access but fails in the random access and then the UE is located in beam #3 and transmits a dedicated preamble when transmitting the random access preamble again. That is, when retransmission of the preamble is performed, a contention-based random access procedure and a non-contention-based random access procedure may coexist within one random access procedure according to whether a dedicated random access preamble is allocated to a selected SSB in every preamble transmission.

Figure 8:
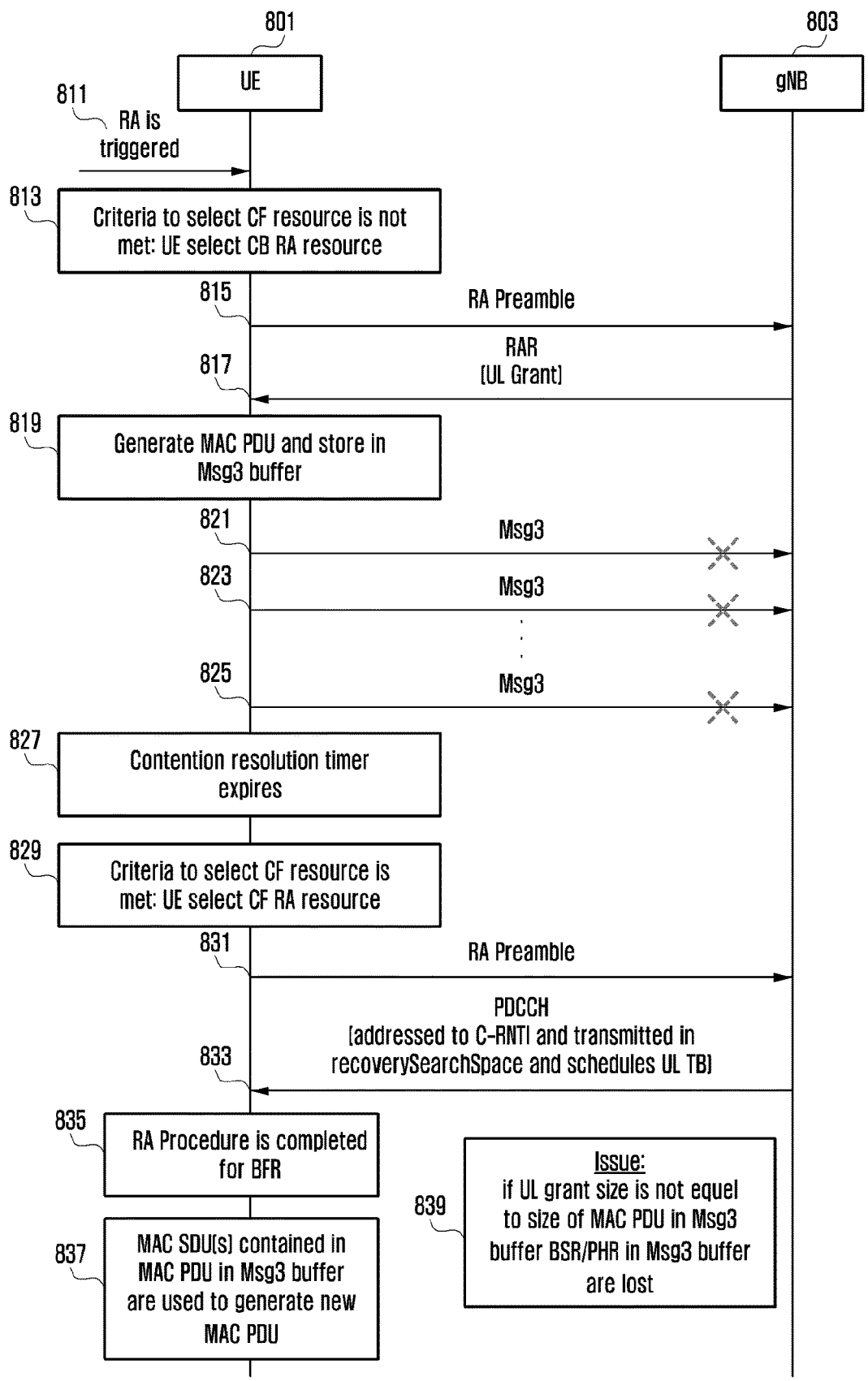
FIG. 8 illustrates contention-based and non-contention-based random access procedures performed by the UE in a condition such as beam failure recovery according to some embodiments of the disclosure.

FIG. 8 illustrates contention-based and non-contention-based random access procedures performed by the UE in a condition such as beam failure recovery.

In FIG. 8, the description which is the same as that in FIG. 1D will be omitted. For example, steps 811 to 835 of FIG. 8 may correspond to steps 411 to 435 of FIG. 4. That is, FIG. 8 assumes a scenario in which the UE performs contention-based random access in steps 811 to 827, performs non-contention-based random access in steps 829 to 835, receives a PDCCH for downlink resource allocation, and then completes the random access procedure in step 835.

The random access procedure may include a contention-based random access procedure and a non-contention-based random access procedure, and the non-contention-based random access procedure may have a procedure in which the gNB allocates dedicated random access resources to allow the UE to perform non-contention-based random access before the random access.

The aforementioned dedicated random access resources may be a specific preamble index and/or PRACH resources on a specific time/frequency. Information for allocating dedicated random access resources may be allocated through a PDCCH or transmitted through a message in an RRC layer. The message in the RRC layer may include a message such as RRCReconfiguration (for example, in the case of handover). If there are dedicated random access resources allocated by the gNB in an SSB/CSI-RS selected for the random access procedure currently performed by the UE, the UE transmits a random access preamble through the allocated dedicated random access resources.

In the non-contention-based random access, when there is a preamble transmitted by the UE in an RAR message described below, the UE determines that the random access is successfully completed and ends the random access procedure.

As illustrated in FIG. 3, the scenario in which the UE transmits and receives a signal in a specific beam but fails in using the currently used beam for the reason of movement of the UE and thus recovers beam use failure within one ENB may be considered, and this is referred to as a beam failure recovery procedure. The random access procedure may be used for the beam failure recovery procedure. In the beam failure recovery procedure, the gNB may allocate dedicated random access resources corresponding to the recovered beam, and the UE receiving the dedicated random access resources corresponding to the recovered beam may perform non-contention-based random access. If the gNB does not allocate dedicated resources, the UE may perform contention-based random access.

FIG. 8 assumes a scenario in which the UE performs random access in beam failure recovery handover.

That is, a scenario in which random access is triggered to recover beam failure since a signal strength of the beam currently transmitted and received by the UE is lowered may be assumed in step 811. The UE determines which beam is used to transmit and receive data including random access and selects an SSB in step 813.

A method by which the UE 801 selects the SSB is described below. The gNB 803 configures a threshold to be used for beam failure recovery and configures dedicated random access resources for each SSB. If an SSB in which dedicated random access resources are configured exists in SSBs of which the signal strength is higher than the threshold among the received SSBs, the UE selects the SSB in which the dedicated random access resources are configured.

For example, if the UE receives all of SSB #0, SSB #1, and SSB #2 but the gNB configures dedicated random access resources only for SSB #1 and SSB #2 and only signal strengths of SSB #0 and SSB #1 are higher than the threshold in FIG. 3, the UE selects SSB #1 and performs non-contention-based random access. If only the signal strength of SSB #0 is higher than the threshold in the above example, the UE selects SSB #0 and performs contention-based random access. In the scenario illustrated in FIG. 8, a procedure in which a beam (for example, SSB #0 in the above example) in which no dedicated resources are configured is selected and contention-based random access is performed since the beam in which dedicated resources are configured cannot satisfy a condition is described in step 813.

As described above, if the UE selects the SSB, the UE may know the PRACH occasion mapped to the selected SSB and accordingly transmit a random access preamble to the gNB through the corresponding PRACH occasion in step 815. Since the dedicated preamble is not allocated to the selected SSB, the UE performs contention-based random access as described above. That is, the UE randomly selects and transmits one of the contention-based preamble identifiers At this time, the gNB may configure preamble groups to allocate uplink resources having different sizes on the basis of the preamble identifier. More specifically, if the gNB configures preamble groups A and B, the UE may select group B when the following condition is satisfied and may select group A and then randomly select a preamble in the selected group when the following condition is not satisfied. If the gNB does not configure group B, the UE randomly selects a preamble in group A.

Condition 1: the case in which the size of data to be transmitted through Msg3 is larger than a threshold ra-Msg3SizeGroupA configured by the gNB and in which a measured path loss value is {PCMAX (of the Serving Cell performing the Random Access Procedure)−preambleReceivedTargetPower−(msg3-DeltaPreamble)−messagePowerOffsetGroupB} (that is, maximum transmission power of the cell performing random access−preambleReceivedTargetPower configured by the gNB−a constant determined according to a preamble (msg3-DeltaPreamble)−messagePowerOffsetGroupB configured by the gNB) or Condition 2: the case in which random access is performed to transmit a Common Control Channel (CCCH) generated in the idle state or the inactive state of the UE and the corresponding CCCH message is larger than a threshold ra-Msg3SizeGroupA configured by the gNB Accordingly, upon receiving a preamble belonging to preamble group A, the gNB may allocate uplink resources of 56 bits. Upon receiving a preamble belonging to group B, the gNB may allocate uplink resources of 72 bits.

In addition, in order not to generate a problem described below, the UE may not apply condition 1, and the gNB may allocate 56-bit resources not only in the case in which preamble group A is received but also in the case in which a dedicated preamble (that is, a non-contention-based random access preamble) for beam failure recovery is received. Alternatively, the UE may directly apply condition 1 and condition 2 but apply condition 1 only to the case other than beam failure recovery, so that the same uplink resources may be always received when non-contention-based and contention-based random access is performed.

Meanwhile, one or more UEs may simultaneously transmit random access preambles through the above-described PRACH occasion (that is, another UE may also randomly select one of the contention-based preamble identifier through corresponding resources, and a plurality of UEs may select the same preamble index).

PRACH resources may exist over one subframe, or only some symbols within one subframe may be used. Information on PRACH resources may be included in system information broadcasted by the gNB or configuration information in a handover command, and the UE may know which time and frequency resources are used for transmitting preambles through the information on the PRACH resources. Random access preambles are specific sequences specially designed to be received even though they are transmitted before the UE and the gNB are completely synchronized, and there may be a plurality of preamble identifiers (indices) according to standards. If there are a plurality of preamble identifiers, the preamble transmitted by the UE may be randomly selected by the UE from a plurality of preambles or may be a specific preamble designated by the gNB.

Meanwhile, if the gNB configures a specific signal to be measured when the UE in the connected mode state performs random access, the UE may select the PRACH occasion on the basis of the corresponding specific signal to be measured. The corresponding specific signal to be measured may be an SSB or a channel state information reference signal (CSI-RS). For example, if handover is performed due to movement of the UE, the gNB may configure the PRACH occasion mapped to the SSB or the CSI-RS of the target gNB in the handover command, and accordingly the UE measures the configured signal and determine which PRACH occasion is used for transmitting the random access preamble.

If the gNB receives the preamble (or a preamble transmitted by another UE), the gNB transmits a random access response (hereinafter, referred to as an RAR) to the preamble to the UE in step 817. The RAR message includes preamble identifier information used in step 815, uplink transmission timing correction information, and uplink resource allocation information and temporary UE identifier information to be used in the following step (that is, step 821). For example, if a plurality of UEs transmit different preambles and attempt random access in step 815, the preamble identifier information is transmitted to inform of the preamble to which the RAR message responds. The uplink resource allocation information is detailed information on resources to be used by the UE in step 821 and includes the physical location and size of resources, a decoding and a coding scheme (modulation and coding scheme (MCS)) used for transmission, and transmission power control information. If the UE transmitting the preamble initially accesses the gNB, the UE does not have an identifier allocated by the gNB for communication with the gNB, so that the temporary UE identifier information is a value transmitted for initial access of the UE.

The RAR message should be transmitted within a predetermined period after a predetermined time from transmission of the preamble, and the predetermined period is referred to as an "RAR window". The RAR window starts at a time point after a predetermined time from transmission of the first preamble. The predetermined time may have a value in units of subframes (4 ms) or a smaller value. The length of the RAR window is configured within a system information message broadcasted by the gNB or within a handover command message.

Meanwhile, when the RAR message is transmitted, the gNB schedules the corresponding RAR message through a PDCCH, and the corresponding scheduling information is scrambled using a random access-radio network temporary identifier (RA-RNTI). The RA-RNTI is mapped to PRACH resources used to transmit the message in step 815, and the UE transmitting the preamble to specific PRACH resources may attempt PDCCH reception on the basis of the RA-RNTI and determine whether there is an RAR message corresponding to the preamble transmitted by the UE. That is, if the RAR message is a response to the preamble transmitted by the UE in step 815 as illustrated in the FIG. 8, the RA-RANTI used for scheduling information of the RAR message include information on the corresponding transmission in step 815. To this end, the RA-RANTI may be obtained by the following equation.

$$\text{RA-RNTI}=1+s\_id+14\times t\_id+14\times 80\times f\_id+14\times 80\times 8\times ul\_carrier\_id \qquad \text{Equation 2}$$

In Equation 2, s_id denotes an index corresponding to a first OFDM symbol at which transmission of preamble in step 815 starts and has a value of $0\leq s\_id<14$ (that is, smaller than a maximum number of OFDMs within one slot). t_id denotes an index corresponding to a first slot at which transmission of the preamble in step 815 starts and has a value of $0\leq t\_id<80$ (that is, a maximum number of slots within one system frame (40 ms)). f_id denotes PRACH resources on the frequency through which the preamble transmitted in step 815 is transmitted and has a value of $0\leq f\_id<8$ (that is, smaller than a maximum number of PRACHs on the frequency within the same time). ul_carrier_id denotes a factor for identifying whether a preamble is transmitted in normal uplink (NUL) (in this case, 0) or a preamble is transmitted in supplementary uplink (SUL) (in this case, 1) if two subcarriers are used for uplink in one cell.

In the FIG. 8, a scenario in which the UE receives the RAR message using the RA-RANTI corresponding to transmission of the preamble 815 and a response to the preamble identifier transmitted by the UE is included in the RAR message is assumed. Accordingly, the UE inserts a message to be transmitted into an Msg3 buffer within the UE to fit the size of uplink resources for Msg3 allocated to the RAR message in step 819. In the random access procedure, the preamble is referred to as Msg1, the RAR is referred to as Msg2, a message transmitted by the UE in uplink is referred to as Msg3, a message received by the UE in downlink is referred to as Msg4, and a buffer for storing data to be transmitted through Msg3 is referred to as Msg3.

In the scenario of the FIG. 8, it is assumed that beam failure recovery is performed in the connected mode of the UE. Accordingly, the UE may insert a C-RNTI MAC control element (CE) (MAC CE is a control message in the MAC layer) including C-RNTI information indicating that the UE currently performing random access is the UE into the Msg3, generate data to be transmitted by the UE along with uplink data according to the size of allocated uplink resources received in the RAR, and transmit the generated data in step 821.

However, the FIG. 8 assumes a scenario in which the UE fails in transmitting Msg3 in steps 821, 823, and 825. The UE transmits Msg3, starts ra-ContentionResolutionTimer (random access-contention resolution timer), when a response to Msg3 does not arrive until the corresponding timer expires in step 827, determines that Msg3 has not been normally transmitted, and starts a procedure of transmitting again the random access preamble.

If ra-ContentionResolutionTimer expires, the UE selects an SSB again at the time point at which the timer expires in order to retransmit the preamble. In steps 829 to 837 of FIG. 2D, a scenario in which the SSB which the UE selects again is an SSB to which dedicated random access resources area allocated like SSB #1 in the above example in step 829. The UE transmits a dedicated preamble through the PRACH occasion corresponding to the selected SSB in step 831. If non-contention-based random access is performed in beam failure recovery as in the scenario of step 829, the UE receives a PDCCH for downlink or uplink resource allocation instead of the RAR as a message corresponding to the transmitted preamble in step 833. More specifically, when the UE receives the beam failure recovery-related configuration from the gNB, the UE separately receives the resource location (recoverySearchSpace) at which the PDCCH for downlink or uplink resource allocation is received. Upon receiving the PDCCH scrambled with a C-RNTI which is a unique identifier within the cell of the UE for downlink or uplink resource allocation at the corresponding resource location in step 833, the UE determines that random access ends in step 835. In the FIG. 8, it is assumed that the UE receives a PDCCH scrambled with a C-RNTI for uplink resource allocation.

Meanwhile, when performing contention-based random access (procedure in steps 811 to 827), the UE store data in the Msg3 buffer according to the size of allocated uplink resources of the RAR received from the gNB. The data stored in the Msg3 buffer may include not only a C-RNTI MAC CE for identifying contention-based random access but also a MAC CE for a buffer status report (BSR), a MAC CE for a power headroom report), or uplink data.

However, if the UE performs non-contention-based random access in step 831, the gNB cannot know that the UE has already performed contention-based random access. Accordingly, when the gNB allocates uplink to the UE later in step 833, the size of allocated resources may be different from the size of allocated resources in the previous RAR. If the size of allocated resources in the RAR in contention-based random access is different from the size of allocated resources when the gNB allocates uplink to the UE in non-contention-based random access, the UE discards MAC CEs for the BSR and the PHR and generates a MAC PDU again only with MAC SDUs (that is, data from the RLC layer) in order to prevent important data (for example, a handover completion message) from being lost in step 837.

In order to prevent the MAC CEs for the BSR and the PHR from being discarded, when allocating resources in non-contention-based random access, the gNB may consider a method of allocating the same size of allocated uplink resources (for example, 56 bits) generally used in contention-based random access in step 837. However, even in the contention-based random access, the gNB may allocate uplink resources of 56 bits or 72 bits according to the buffer status of the UE, and the size of other resources which the gNB can allocate is also not limited. Accordingly, if the size of allocated resource in the RAR in the contention-based random access is different from the size of resources allocated when the gNB allocates uplink to the UE in the non-contention-based random access, a method of transmitting lost MAC CEs again is needed.

Figure 9:
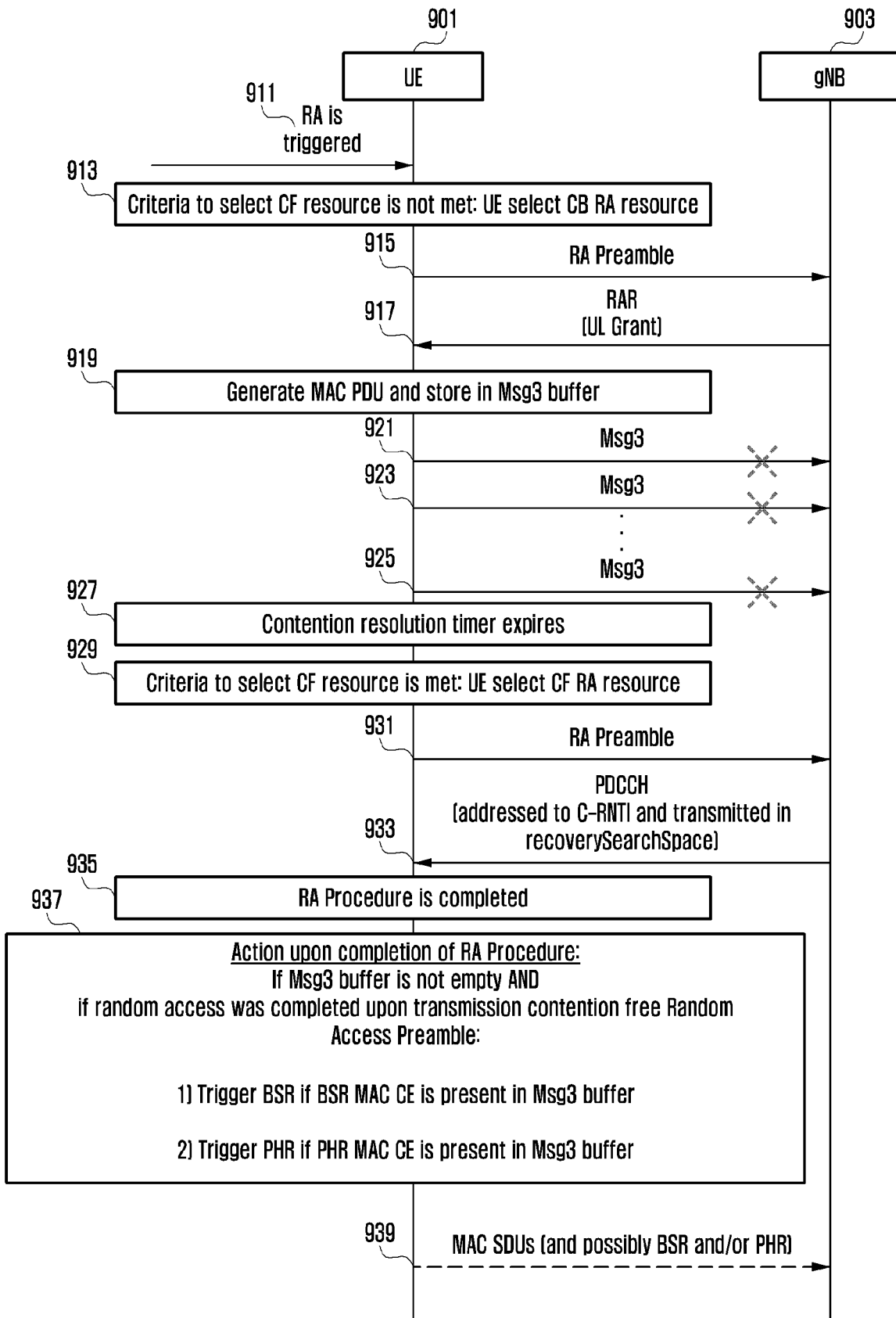
FIG. 9 illustrates data transmission and reception between the UE and the gNB when a method of preventing loss of a buffer status report and a power headroom report is applied according to some embodiments of the disclosure.

FIG. 9 illustrates data transmission and reception between the UE and the gNB when a method of preventing a buffer status report and a power headroom report from being lost is applied according to an embodiment of the disclosure.

In FIG. 9, the description which is the same as that in FIG. 8 will be omitted. Steps 911 to 935 of FIG. 9 are the same as steps 811 to 835 of FIG. 8. That is, FIG. 9 assumes a scenario in which the UE 901 performs contention-based random access in steps 911 to 927, performs non-contention-based random access in steps 929 to 935, receives a PDCCH for uplink resource allocation, and then completes the random access procedure in step 935.

When random access is completed, the UE according to some embodiments of the disclosure identifies whether the Msg3 buffer is empty (that is, there is data in the Msg3 buffer) and whether the random access is terminated by transmitting a non-contention random access preamble.

If the Msg3 buffer is not empty and the random access is terminated by transmitting the non-contention-based random access preamble, the UE triggers a BSR if the BSR exists in the Msg3 buffer. If there is the MACE CE related to the PHR in the Msg3 buffer, the PHR is triggered in step 937. The UE may transmit the relevant MAC CE according to the triggered BSR and/or PHR to the gNB 903 in step 939.

If the BSR is triggered, the UE may trigger a scheduling request (SR) according to the type of the BSR and transmit SR information through a PUCCH, or may transmit the BSR when receiving uplink resources from the gNB without triggering a separate SR.

The type of the BSR may be divided as follows according to a triggered condition.

First type: regular BSR
 BSR transmitted in the case in which a BSR retransmission timer (retxBSR-Timer) expires if there is data which can be transmitted for any logical channel/radio bearer (RB) belonging to a logical channel group (hereinafter, referred to as an LCG)

BSR transmitted in the case in which data to be transmitted from a higher layer (RLC or PDCP layer) is generated for the logical channel/radio bearer belonging to the LCG and the generated data has a higher priority than a logical channel/radio bearer belonging to any LCG BSR transmitted in the case in which data to be transmitted from a higher layer (RLC or PDCP layer) is generated for the logical channel/radio bearer belonging to the LCG and there is no data in any LCG except for the generated data Second type: periodic BSR BSR transmitted in the case in which a periodic BSR timer (periodicBSR-Timer) configured in the UE expires Third type: padding BSR BSR transmitted in the case in which uplink resources are allocated and padding bits filling the remaining space after data transmission is equal to or larger than a sum of the size of the BSR MAC CE and the size of a sub header of the BSR MAC CE.

transmit a truncated BSR if there are packets in buffers of a plurality of LCGs

If the BSR is included in the Msg3 buffer according to the aforementioned type of the BSR, the UE may trigger the corresponding BSR type again or may always trigger the regular BSR or the periodic BSR according to the condition under which the BSR was previously triggered. If the BSR included in the Msg3 buffer was the padding BSR, the UE may not separately trigger the BSR.

Although not mentioned, another type of the BSR may include a sidelink BSR for making a request for resources to the gNB for direct communication with the UE. Another embodiment of the disclosure relates to a scenario in which the UE acquires uplink resources by transmitting a sidelink BSR MAC CE to the gNB and directly transmits data to another UE. The UE may trigger the BSR only when the sidelink BSR is lost. Alternatively, the UE may not trigger the BSR again in the case of the sidelink BSR but may trigger the BSR only in the case of the BSR triggered as the aforementioned regular BSR. For example, in the case in which communication between UEs has a very high priority like communication between vehicles, the BSR may be triggered again. Otherwise, the BSR may not be triggered again.

According to another embodiment of the disclosure, if the regular BSR or the sidelink BSR is lost, the UE may trigger the BSR only when a priority of a logical channel belonging to the BSR is higher than a priority configured as an RRC message by the BS or configured within the UE.

Meanwhile, power headroom information is a difference between maximum transmission power configured in the UE and transmission power estimated by the UE. The transmission power estimated by the UE is calculated on the basis of a value used when the UE performs uplink transmission in the case in which the UE actually performs uplink transmission (at this time, the calculated value is a real value) but is calculated on the basis of a predetermined equation defined in standards in the case in which the UE does not actually perform uplink transmission (at this time, the calculated value is a virtual value). The UE reports the power headroom information to the gNB (PHR), and thus the gNB may determine maximum transmission power of the UE.

The conventional conditions about the time point at which the UE transmits the PHR to the gNB (that is, the UE triggers the PHR) are as follows.

the case in which a change in downlink reception strength is larger than or equal to dl-PathlossChange dB when prohibitPHR-Timer expires the case in which prohibitPHR-Timer expires (periodic report)

the case in which PHR report-related configuration information is initially configured (or updated)

the case in which an SCell including uplink is added the case in which a primary cell of a secondary gNB (PSCell) is added when dual connectivity technology is used According to some embodiments of the disclosure, if the size of allocated uplink resources in Msg3 is different from the size of allocated resources in the RAR due to addition of the conditions and thus the PHR-related MAC CE is lost, the UE may trigger the PHR and transmits the PHR-related MAC CE to the gNB. In connection with the transmitted PHR-related MAC CE, the UE transmits a single entry PHR MAC CE if the number serving cells is singular and transmits multiple entry PHR MAC CEs if the number of serving cells is plural.

According to the added conditions of triggering of the BSR or the PHR, the UE may trigger the lost BSR and/or PHR again and rapidly reports corresponding information to the gNB again.

Figure 10:
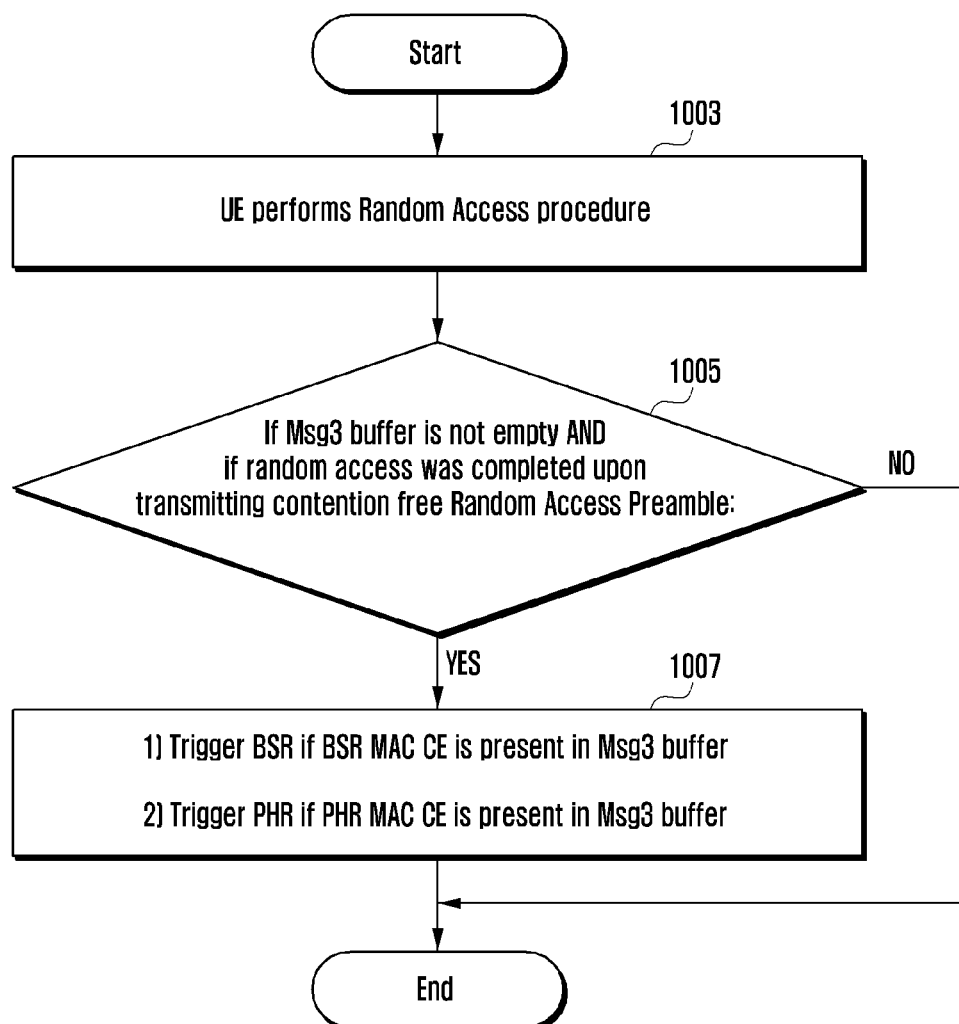
FIG. 10 illustrates a procedure of the UE when a method of preventing loss of a buffer status report and a power headroom report is applied according to some embodiments of the disclosure.

FIG. 10 illustrates a procedure of the UE when a method of preventing a buffer status report and a power headroom report from being lost is applied according to an embodiment of the disclosure.

In FIG. 10, a scenario in which the UE in the connected state performs random access and completes the random access in order to recover beam failure is assumed in step 1003.

When random access is completed in step 1003, the UE identifies whether the Msg3 buffer is empty (whether there is data) and whether random access is terminated by transmitting a non-contention-based random access preamble in step 1005.

If the Msg3 buffer is not empty and the random access is terminated by transmitting the non-contention-based random access preamble, the UE triggers a BSR if the BSR exists in the Msg3 buffer. If there is the MAC CE related to the PHR in the Msg3 buffer, the PHR is triggered in step 937. The UE may transmit the relevant MAC CE according to the triggered BSR and/or PHR to the gNB in step 1007.

If the BSR is triggered, the UE may trigger a scheduling request (SR) according to the type of the BSR and transmit SR information through a PUCCH, or may transmit the BSR when receiving uplink resources from the gNB without triggering a separate SR.

The type of the BSR may be divided as follows according to a triggered condition.

First type: regular BSR

BSR transmitted in the case in which a BSR retransmission timer (retxBSR-Timer) expires if there is data which can be transmitted for any logical channel/radio bearer (RB) belonging to a logical channel group (hereinafter, referred to as an LCG)

BSR transmitted in the case in which data to be transmitted from a higher layer (RLC or PDCP layer) is generated for a logical channel/radio bearer belonging to an LCG and the generated data has a higher priority than a logical channel/radio bearer belonging to any LCG BSR transmitted in the case in which data to be transmitted from a higher layer (RLC or PDCP layer) is generated for the logical channel/radio bearer belonging to the LCG and there is no data in any LCG except for the generated data Second type: periodic BSR
BSR transmitted in the case in which a periodic BSR timer (periodicBSR-Timer) configured in the UE expires Third type: padding BSR
BSR transmitted in the case in which uplink resources are allocated and padding bits filling the remaining space after data transmission is equal to or larger than a sum of the size of the BSR MAC CE and the size of a sub header of the BSR MAC CE.
transmit a truncated BSR if there are packets in buffers of a plurality of LCGs If the BSR is included in the Msg3 buffer according to the aforementioned type of the BSR, the UE may trigger the corresponding BSR type again or may always trigger the regular BSR or the periodic BSR according to the condition under which the BSR was previously triggered. If the BSR included in the Msg3 buffer was the padding BSR, the UE may not separately trigger the BSR.

Although not mentioned, another type of the BSR may include a sidelink BSR for making a request for resources to the gNB for direct communication with the UE. Another embodiment of the disclosure relates to a scenario in which the UE acquires uplink resources by transmitting a sidelink BSR MAC CE to the gNB and directly transmits data to another UE. The UE may trigger the BSR only when the sidelink BSR is lost. Alternatively, the UE may not trigger the BSR again in the case of the sidelink BSR but may trigger the BSR only in the case of the BSR triggered as the aforementioned regular BSR. For example, in the case in which communication between UEs has a very high priority like communication between vehicles, the BSR may be triggered again. Otherwise, the BSR may not be triggered again.

According to another embodiment of the disclosure, if the regular BSR or the sidelink BSR is lost, the UE may trigger the BSR only when a priority of a logical channel belonging to the BSR is higher than a priority configured as an RRC message by the BS or configured within the UE.

Meanwhile, power headroom information is a difference between maximum transmission power configured in the UE and transmission power estimated by the UE. The transmission power estimated by the UE is calculated on the basis of a value used when the UE performs uplink transmission in the case in which the UE actually performs uplink transmission (at this time, the calculated value is a real value) but is calculated on the basis of a predetermined equation defined in standards in the case in which the UE does not actually perform uplink transmission (at this time, the calculated value is a virtual value). The UE reports the power headroom information to the gNB (PHR), and thus the gNB may determine maximum transmission power of the UE.

The conventional conditions about the time point at which the UE transmits the PHR to the gNB (that is, the UE triggers the PHR) are as follows.
the case in which a change in downlink reception strength is larger than or equal to dl-PathlossChange dB when prohibitPHR-Timer expires
the case in which prohibitPHR-Timer expires (periodic report)
the case in which PHR report-related configuration information is initially configured (or updated)
the case in which an SCell including uplink is added
the case in which a primary cell of a secondary gNB (PSCell) is added when dual connectivity technology is used According to some embodiments of the disclosure, if the size of allocated uplink resources in Msg3 is different from the size of allocated resources in the RAR due to addition of the conditions and thus the PHR-related MAC CE is lost, the UE may trigger the PHR and transmits the PHR-related MAC CE to the gNB. In connection with the transmitted PHR-related MAC CE, the UE transmits a single entry PHR MAC CE if the number serving cells is singular and transmits multiple entry PHR MAC CEs if the number of serving cells is plural.

According to the added conditions of triggering of the BSR or the PHR, the UE may trigger the lost BSR and/or PHR again and rapidly reports corresponding information to the gNB again.

Figure 11:
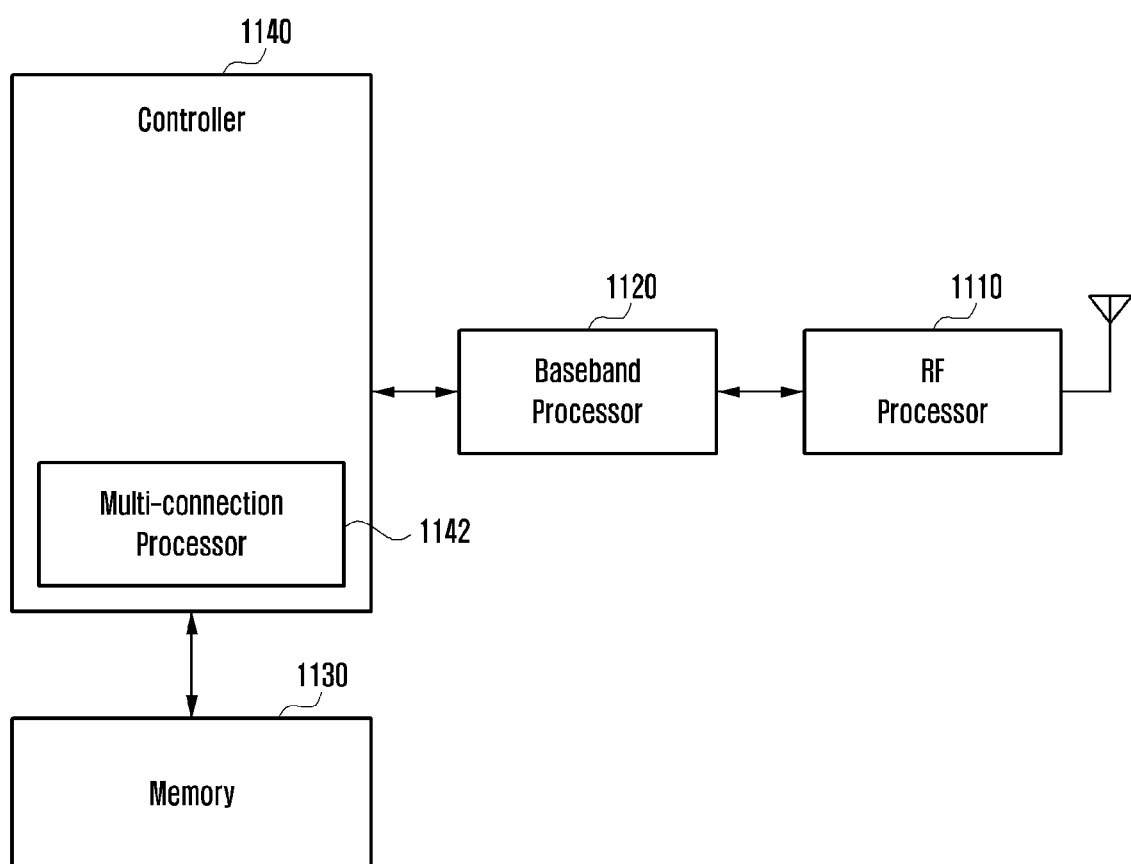
FIG. 11 illustrates the configuration of the UE in a wireless communication system according to some embodiments of the disclosure.

FIG. 11 illustrates the configuration of the UE in a wireless communication system according to some embodiments of the disclosure.

Referring to FIG. 11, the UE includes a radio-frequency (RF) processing unit 1110, a baseband processing unit 1120, a memory 1130, and a controller 1140. Of course, the elements included in the UE are not limited thereto, and the UE may include fewer elements or more elements than those illustrated in FIG. 11.

The RF processing unit 1110 performs a function for transmitting and receiving a signal through a wireless channel such as converting and amplifying a signal band. That is, the RF processing unit 1110 up-converts a baseband signal provided from the baseband processor 1120 into an RF band signal and then transmits the converted signal through an antenna, and down-converts an RF band signal received through the antenna into a baseband signal. For example, the RF processing unit 1110 may include a transmission filter, a reception filter, an amplifier, a mixer, an oscillator, a digital-to-analog convertor (DAC), an analog-to-digital convertor (ADC), and the like.

Although FIG. 11 illustrates only one antenna, the UE may include a plurality of antennas. The RF processing unit 1110 may include a plurality of RF chains. Moreover, the RF processing unit 1110 may perform beamforming. For the beamforming, the RF processing unit 1110 may control the phase and the size of each of the signals transmitted/received through a plurality of antennas or antenna elements. Further, the RF processing unit 1110 may perform multiple-input multiple-output (MIMO) and receive a plurality of layers during MIMO operation.

The baseband processing unit 1120 performs a function for conversion between a baseband signal and a bitstream according to a physical layer standard of the system. For example, when data is transmitted, the baseband processing unit 1120 generates complex symbols by encoding and modulating a transmission bitstream. Further, when data is received, the baseband processing unit 1120 reconstructs a reception bitstream by demodulating and decoding a baseband signal provided from the RF processing unit 1110. For example, in an orthogonal frequency division multiplexing (OFDM) scheme, when data is transmitted, the baseband processing unit 1120 generates complex symbols by encoding and modulating a transmission bitstream, mapping the complex symbols to subcarriers, and then configures OFDM symbols through an inverse fast Fourier transform (IFFT) operation and a cyclic prefix (CP) insertion. Further, when data is received, the baseband processing unit 1120 divides the baseband signal provided from the RF processor 1110 in the unit of OFDM symbols, reconstructs the signals mapped to the subcarriers through a fast Fourier transform (FFT) operation, and then reconstructs a reception bitstream through demodulation and decoding.

The baseband processing unit 1120 and the RF processing unit 1110 transmit and receive signals as described above. Accordingly, the baseband processing unit 1120 and the RF processing unit 1110 may be referred to as transmitters, receivers, transceivers, or communication units. Further, at least one of the baseband processing unit 1120 and the RF processing unit 1110 may include a plurality of communication modules in order to support a plurality of different radio access technologies. At least one of the baseband processing unit 1120 and the RF processing unit 1110 may include a plurality of different communication modules in order to process signals of different frequency bands. For example, the different radio access technologies may include a WLAN (for example, IEEE 802.11) and a cellular network (for example, LTE). Further, the different frequency bands may include a super high frequency (SHF) (for example, 2.5 GHz and 5 GHz) band and a millimeter (mm) wave (for example, 60 GHz) band. The UE may transmit and receive a signal to and from the ENB through the baseband processing unit 1120 and the RF processing unit 1110, and the signal may include control information and data.

The memory 1130 may store data, such as a basic program for operating a UE, an application program, configuration information, and the like. Particularly, the memory 1130 may store information related to a WLAN node for performing wireless communication using a WLAN access technology. The memory 1130 provides stored data according to a request from the controller 1140. The memory 1130 may be configured by storage media such as ROM, RAM, hard disc, CD-ROM, and DVD or a combination of the storage media. The memory 1130 may be configured by a plurality of memories. According to some embodiments, the memory 1130 may store a program for performing a method of transmitting data according to the disclosure.

The controller 1140 controls the overall operation of the UE. For example, the controller 1140 transmits and receives a signal through the baseband processing unit 1120 and the RF processing unit 1110. Further, the controller 1140 records data in the memory 1140 and reads the data. To this end, the controller 1140 may include at least one processor. For example, the controller 1140 may include a communication processor (CP) that performs a control for communication, and an application processor (AP) that controls a higher layer such as an application. Further, at least one element in the UE may be implemented as a single chip. According to some embodiments of the disclosure, the controller 1140 includes a multi-connection processing unit 1142 for processing the operation in a multi-connection mode.

Each element of the UE may operate to perform the embodiments of the disclosure.

For example, the controller 1140 may control the UE to perform a procedure related to the operation of the UE illustrated in FIG. 1E. That is, the controller 1140 may make a request for retransmission to the RLC layer in order to prevent loss of data in the Msg3 buffer during random access.

The controller 1140 may control the UE to perform a procedure related to the operation of the UE illustrated in FIG. 2E. That is, if the BSR and the PHR in the Msg3 buffer are lost during random access, the controller 1140 may rapidly report corresponding information to the ENB again by triggering the same again.

Figure 12:
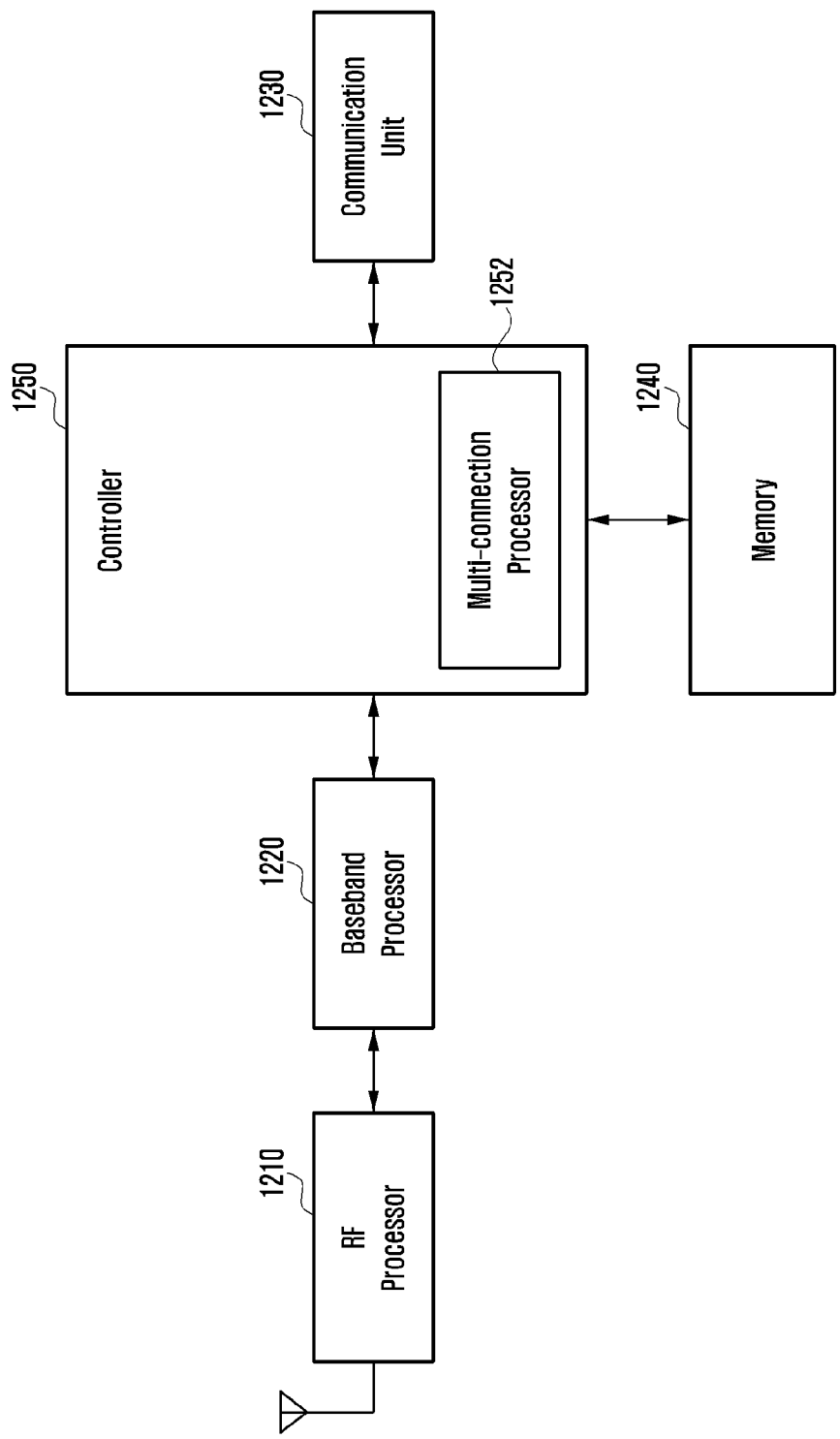
FIG. 12 illustrates the configuration of the ENB in a wireless communication system according to some embodiments of the disclosure.

FIG. 12 illustrates the configuration of the base station in a wireless communication system according to some embodiments of the disclosure.

Referring to FIG. 12, the base station may include an RF processing unit 1210, a baseband processing unit 1220, a communication unit 1230, a memory 1240, and a controller 1250. Of course, the disclosure is not limited thereto, and the base station may include fewer elements or more elements than those illustrated in FIG. 12.

The RF processing unit 1210 may perform a function for transmitting and receiving a signal through a wireless channel such as covering and amplifying a signal band. The RF processing unit 1210 may up-convert a baseband signal provided from the baseband processing unit 1220 into an RF band signal, transmit the RF band signal through an antenna, and then down-convert an RF band signal received through an antenna into a baseband signal. For example, the RF processing unit 1210 may include a transmission filter, a reception filter, an amplifier, a mixer, an oscillator, a DAC, and an ADC. Although FIG. 12 illustrates only one antenna, the RF processing unit 1210 may include a plurality of antennas. The RF processing unit 1210 may include a plurality of RF chains. The RF processing unit 1210 may perform beamforming. For the beamforming, the RF processing unit 1210 may control the phase and the size of each of the signals transmitted and received through a plurality of antennas or antenna elements. The RF processing unit 1210 may perform a downlink MIMO operation by transmitting one or more layers.

The baseband processing unit 1220 may perform a function for conversion between a baseband signal and a bitstream according to physical layer standards of a predetermined radio access technology. For example, when data is transmitted, the baseband processing unit 1220 may generate complex symbols by coding and modulating a transmission bitstream. When data is received, the baseband processing unit 1220 may reconstruct a reception bitstream by demodulating and decoding a baseband signal provided from the RF processing unit 1210. For example, in an OFDM scheme, when data is transmitted, the base band processing unit 1220 may generate complex symbols by encoding and modulating the transmission bitstream, map the complex symbols to subcarriers, and then configure OFDM symbols through an IFFT operation and CP insertion. In addition, when data is received, the baseband processing unit 1220 may divide a baseband signal provided from the RF processing unit 1210 in units of OFDM symbols, reconstruct signals mapped to subcarriers through an FFT operation, and then reconstruct a reception bitstream through demodulation and decoding. The baseband processing unit 1220 and the RF processing unit 1210 may transmit and receive the signal as described above. Accordingly, the baseband processing unit 1220 and the RF processing unit 1210 may be referred to as transmitters, receivers, transceivers, communication units, or wireless communication units. The base station may transmit and receive a signal to and from the UE through the baseband processing unit 1220 and the RF processing unit 1210, and the signal may include control information and data.

The communication unit 1230 provides an interface for communicating with other nodes within the network. That is, the communication unit 1230 converts a bitstream transmitted from a primary base station to another node, for example, a secondary base station or a core network into a physical signal and converts a physical signal received from the other node into a bitstream. The communication unit 1230 may be a backhaul communication unit.

The memory 1240 stores data such as a basic program, an application, and configuration information for the operation of the base station. The memory 1240 may store information on a bearer allocated to the access UE and a measurement result reported by the accessed UE. Further, the memory 1240 may store information which is a reference for determining whether to provide or stop multiple connections to the UE. The memory 1240 provides stored data according to a request from the controller 1250. The memory 1240 may be configured by storage media such as ROM, RAM, hard disc, CD-ROM, and DVD or a combination of the storage media. further, the memory 1240 may be configured by a plurality of memories. According to some embodiments, the memory 1240 may store a program for performing a method of transmitting a buffer status report according to the disclosure.

The controller 1250 controls the overall operation of the base station. For example, the controller 1250 transmits and receives a signal through the baseband processing unit 1220 and the RF processing unit 1210 or through the backhaul communication unit 1230. Further, the controller 1250 records data in the memory 1240 and reads the data. To this end, the controller 1250 may include at least one processor. At least one element of the base station may be implemented as a single chip. Further, each element of the base station may operate in order to perform the embodiments of the disclosure.

Methods according to embodiments stated in claims and/or specifications of the disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

Embodiment 2

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system is being developed to meet the growing demand for high speed data services, support ultra-reliability and low latency applications. The fifth generation wireless communication system will be implemented not only in lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system. In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer. Few example use cases the fifth generation wireless communication system wireless system is expected to address is enhanced Mobile Broadband (eMBB), massive Machine Type Communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the Internet of Things (IoT)/Internet of Everything (IoE) envisioning connectivity of billions of devices. The URLL requirements like very low latency, very high reliability and variable mobility so on and so forth address the market segment representing the Industrial automation application, vehicle-to-vehicle/vehicle-to-infrastructure communication foreseen as one of the enabler for autonomous cars.

The current design of 5G wireless communication system is for operation on licensed carrier(s). A study has been initiated recently to study enhancements to 5G wireless communication system for operation on unlicensed carrier(s). The main motivation of using unlicensed carrier is CAPEX reduction for cellular operators by utilizing free spectrum access for intelligent data offloading; improved and intelligent spectrum access and management, to address increasing wireless traffic demand under limited available spectrum and allowing network operators without licensed spectrum to utilize the radio efficient 3GPP radio access technology. Various deployment scenarios are being considered for operation on unlicensed carrier(s) such as:

NR-U LAA: Carrier aggregation between licensed band NR (PCell) and unlicensed band NR-U (SCell)
    NR-U SA: Stand-alone NR-U
    ENU-DC: Dual connectivity between licensed band LTE (PCell) and unlicensed band NR-U (PS Cell)
    NNU-DC: Dual connectivity between licensed band NR (PCell) and unlicensed band NR-U (PS Cell)
    Note that the scenarios above include an NR cell with DL in unlicensed band and UL in licensed band One of the goal of the above study is to identify enhancements needed to support paging procedure in unlicensed band. In the 5th generation (also referred as NR or New Radio) wireless communication system the paging is transmitted to page UE which are attached to the wireless communication network but are in idle/inactive mode. In the idle/inactive mode UE wake ups at regular intervals (i.e. every paging discontinuous reception (DRX) cycle) for short periods to receive paging and other broadcast information. Network may configure several paging occasions (POs) in a DRX cycle. In a PO, paging message is transmitted using physical downlink shared channel (PDSCH). Physical downlink common control channel (PDCCH) is addressed to paging RNTI (P-RNTI) if there is a paging message in PDSCH. P-RNTI is common for all UEs. So UE identity (i.e. SAE-temporary mobile subscriber identity (S-TMSI)) is included in paging message to indicate paging for a specific UE. Paging message may include multiple UE identities to page multiple UEs. Paging message is broadcasted (i.e. PDCCH is masked with P-RNTI) over data channel (i.e. PDSCH).

A UE monitors one PO every DRX cycle. Each PO is a set of 'S' PDCCH monitoring occasions, where 'S' is the number of transmitted SSBs in cell. The UE determines its PO based on UE_ID. The UE first determines the paging frame (PF) and then determine the PO with respect to the determined PF. One PF is a radio frame (10 ms). The PF for a UE is the radio frame with system frame number (SFN) which satisfies the equation (SFN+PF_offset) mod T=(T div N)*(UE_ID mod N); where PF_offset, T and N is signaled by gNB in system information. UE monitors $(i\_s+1)^{th}$ PO, where i_s=floor(UE_ID/N) mod Ns; where N and Ns is signaled by gNB in system information.

The PDCCH monitoring occasions for paging which are not overlapping with UL symbols are sequentially numbered from zero starting from the $1^{st}$ PDCCH monitoring occasion for paging in the PF. The PDCCH monitoring occasions are determined based on paging search space configuration signaled by gNB in system information. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to ssb-PositionsInBurst in SystemInformationBlock1 (SIB 1).

If the carrier used for downlink transmission is unlicensed carrier, gNB needs to perform channel sensing to determine whether the channel is free or not before transmitting paging message in the downlink. It is possible that gNB has paging message to transmit but is not able to transmit it in PO as channel is not free. This will delay the paging transmission to next DRX cycle. An enhanced method of determining PF/PO is needed.

Embodiment 2-1: PF/PO Determination to Support Additional Paging Opportunities

Figure 13:
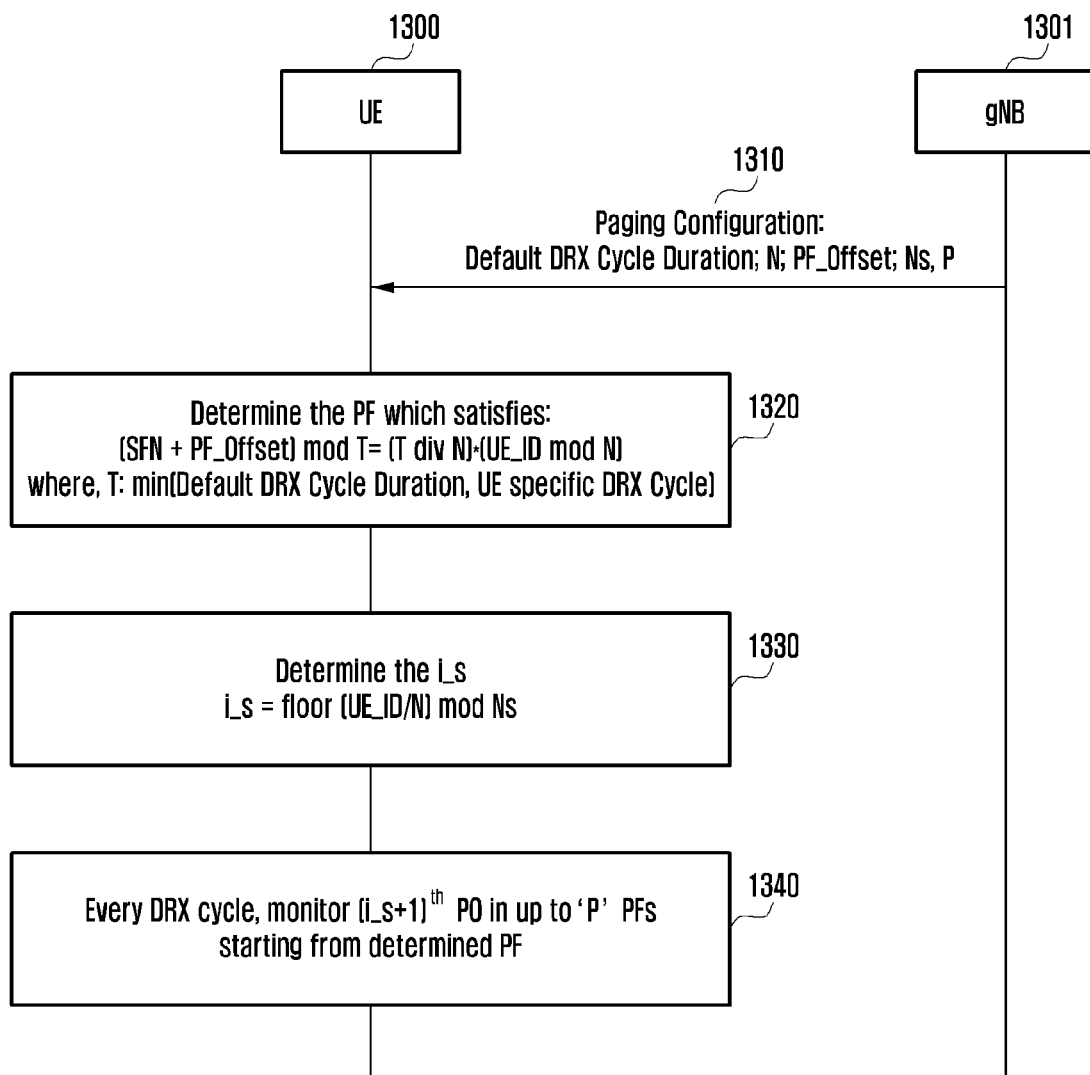
FIG. 13 illustrates an embodiment of determining the PO(s) in a DRX cycle according to an embodiment of method 1.

[Method 1]
FIG. 13 illustrates an embodiment of determining the PO(s) in a DRX cycle according to an embodiment of method 1.

Referring to FIG. 13, a UE 1300 acquires/receives the paging configuration (Default DRX Cycle Duration, PF_Offset, N, Ns, P) from the system information signaled by a network (may be used interchangeably with gNB) 1301 in step 1310. In an RRC_IDLE and RRC INACTIVE state UE also acquires/receives paging search space configuration from the system information signaled by network. In RRC Connected State, the paging search space configuration is signaled by the network 1301 for one or more configured BWP(s) in dedicated signaling. So, in RRC Connected state UE acquires/receives paging search space configuration from dedicated RRC signaling. UE also acquires/receives parameter ssb-PositionsInBurst from system information i.e. SystemInformationBlock1. It can also be received in dedicated RRC signaling in RRC Connected state.

In step 1320, the UE 1300 first determines the paging frame. The PF is the radio frame with SFN which satisfies:

$$(SFN+PF\_Offset) \bmod T = (T \text{ div } N)*(UE\_ID \bmod N)$$

Where,
T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.
N: Number of paging frames in DRX cycle. N is signaled by gNB (e.g. in system information). The values of N can be T, T/2, T/4, T/8, T/16, T/32 and so on.
UE_ID: S-TMSI mod 1024

In step 1330, the UE 1300 then calculates an index i_s, where i_s is derived from the following equation:

$$i\_s = \text{floor}(UE\_ID/N) \bmod Ns, \text{ where}$$

Ns: Number of POs. per PF. The parameter Ns is signaled by gNB (e.g. in system information). Note that all the POs corresponding to a PF need not be located within that PF. They may be located in one or more radio frames starting from PF.
N: Number of paging frames in DRX cycle. N is signaled by gNB (e.g. in system information).
UE_ID: S-TMSI mod 1024.

Every DRX cycle T (as determined above), the UE 1300 monitors $(i\_s+1)^{th}$ PO in up to 'P' consecutive PFs starting from the determined PF in step 1320 in step 1340. The parameter 'P' is signalled by gNB 1301 (e.g. in system information). If PF determined in step 1320 is SFN X. UE monitors SFN X+k*T/N where k=0, 1, 2, ... P−1.

Figure 14:
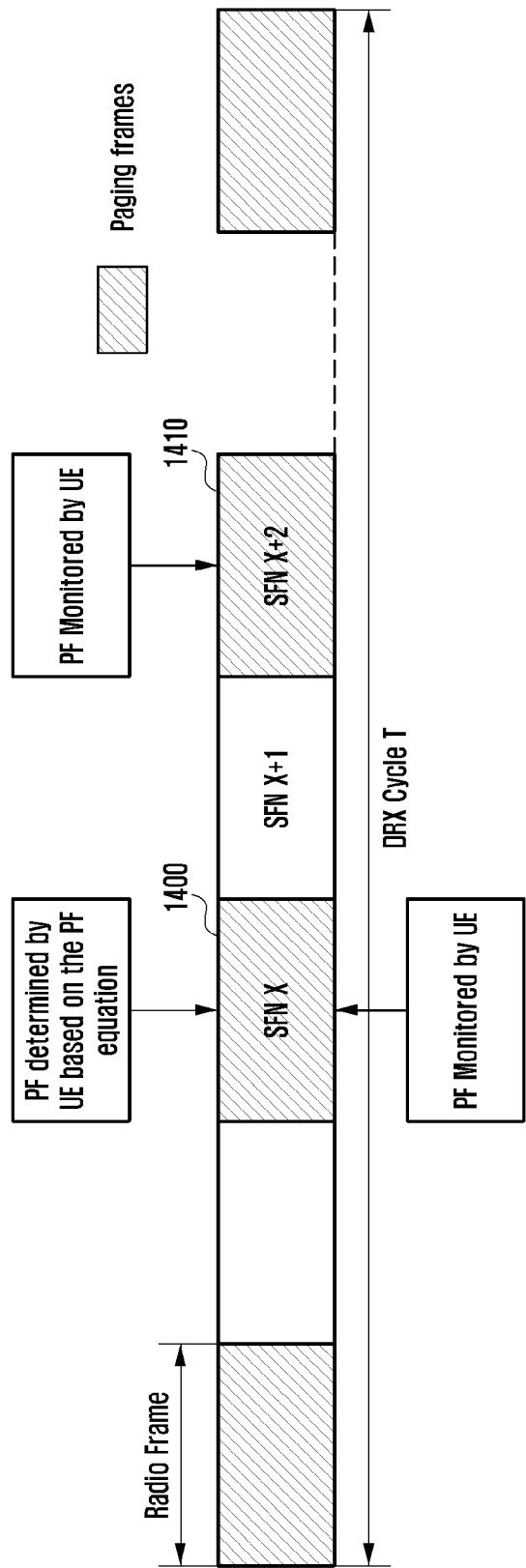
FIG. 14 illustrates an example of the PFs monitored by a UE determined by method 1.

FIG. 14 illustrates an example of the PFs monitored by a UE determined by method 1. SFN X 1400 is the PF determined by the UE, value of 'P' signalled by a gNB is 2 and N equals T/2. So the UE monitors $(i\_s+1)^{th}$ PO with respect to SFN X and SFN X+1*T/N=SFN X+2. The UE will first monitor $(i\_s+1)^{th}$ PO with respect to SFN X 1400. If it does not receive PDCCH addressed to P-RNTI in monitored PO, it monitors $(i\_s+1)^{th}$ PO with respect to next PF i.e. SFN X+2 1410.

In an embodiment, if a UE receives PDCCH addressed to P-RNTI in the monitored PO wherein a paging message in DL TB scheduled by this PDCCH includes paging for itself (i.e. paging message includes UE_ID), the UE may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein a paging message in DL TB scheduled by this PDCCH includes paging for itself, the UE may not monitor its other POs in that DRX cycle. The indication SkipAdditionalPOMonitoring provides flexibility to the network to immediately transmit paging when the channel becomes available or postpone it to subsequent POs.

In another embodiment, if a UE receives PDCCH addressed to P-RNTI in the monitored PO wherein DL TB scheduled by this PDCCH includes paging message (may or may not include paging for itself), the UE may not monitor it's other POs in that DRX cycle. In another embodiment, if network signals SkipAdditionalPOMonitoring in system information or dedicated RRC signaling and if a UE receives PDCCH addressed to P-RNTI in the monitored PO wherein DL TB scheduled by this PDCCH includes paging message (may or may not include paging for itself), the UE may not monitor it's other POs in that DRX cycle.

In another embodiment, if a UE receives PDCCH addressed to P-RNTI in the monitored PO, it may not monitor its other POs in that DRX cycle. In another embodiment, if network signals SkipAdditionalPOMonitoring in system information or dedicated RRC signaling and if a UE receives PDCCH addressed to P-RNTI in the monitored PO, the UE may not monitor it's other POs in that DRX cycle.

In another embodiment, if a UE receives PDCCH addressed to P-RNTI in the monitored PO wherein DL TB scheduled by this PDCCH includes paging message and there is no indication in the received paging message to monitor other POs, the UE may not monitor its other POs in that DRX cycle. In another embodiment, if a UE receives PDCCH addressed to P-RNTI in the monitored PO and there is no indication in the received PDCCH to monitor the other POs, it may not monitor its other POs in that DRX cycle. In another embodiment, if a UE receives PDCCH addressed to P-RNTI in the monitored PO wherein DL TB scheduled by this PDCCH includes paging message and there is indication in the received paging message to monitor other POs, the UE may monitor its other POs in that DRX cycle. In another embodiment, if a UE receives PDCCH addressed to P-RNTI in the monitored PO and there is indication in the received PDCCH to monitor the other POs, it monitor its other POs in that DRX cycle. In an embodiment, a UE may monitor all its POs in a DRX cycle.

According to an embodiment, PDCCH monitoring occasions corresponding to $(i\_s+1)^{th}$ PO is determined as follows:

Non Default Association (i.e. pagingSearchSpace parameter received from gNB is set to not zero):

In this case PDCCH monitoring occasions for paging are determined based on paging search configuration. A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation below:

$$(y*(\text{number of slots in a radio frame}) + x - \text{Monitoring-offset-PDCCH-slot}) \mod (\text{Monitoring-periodicity-PDCCH-slot}) = 0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), the UE can know the 1st PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. The PDCCH monitoring occasions for paging which remains after the exclusion are the valid PDCCH monitoring occasions for paging and are referred as PDCCH monitoring occasions for paging in subsequent procedure. Note that exclusion of monitoring occasions for paging which are overlapping with UL symbols determined according to tdd-UL-DL-ConfigurationCommon parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols where UL symbols are determined according to tdd-UL-DL-ConfigurationCommon parameter signalled in SIB 1, are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions for paging are then mapped to POs as follows:

When firstPDCCH-MonitoringOccasionOfPO is present (firstPDCCH-MonitoringOccasionOfPO is optionally signaled in paging configuration), the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter). firstPDCCH-MonitoringOccasionOfPO is a list of starting PDCCH monitoring occasion numbers.

Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to ssb-PositionsInBurst in SystemInformationBlock1. Note that PDCCH monitoring occasions for paging are determined based on paging search space configuration.

For default association, Ns is either 1 or 2. For Ns=1, there is only one PO which starts in the PF. For Ns=2, PO is either in the first half frame (i_s=0) or the second half frame (i_s=1) of the PF. For default association PDCCH monitoring occasions for paging are same as PDCCH monitoring ocassions for remaining minimum system information (RMSI).

In an alternate embodiment, if the multiple frequency division multiplexed (FDMed) POs are supported (all POs including FDMed POs are identified by i_s) by configuring multiple paging coresets and firstPDCCH-MonitoringOccasionOfPO is not signalled, the $(i\_s+1)^{th}$ PO is a set of 'S' consecutive PDCCH monitoring occasions for paging starting from the $(i\_s/C)*S^{th}$ PDCCH monitoring occasion for paging. 'S' is the number of actual transmitted SSBs determined according to ssb-PositionsInBurst in SystemInformationBlock1. C is the number of paging control resource sets (coresets). In the PDCCH monitoring occasions of $(i\_s+1)^{th}$ PO, a UE monitors $k^{th}$ paging coreset where k=i_s mod C.

In an embodiment of the present disclosure, parameter 'S' can be equal to [number of actual transmitted SSBs determined according to ssb-PositionsInBurst in SystemInformationBlock1]*X where X is signaled by gNB or X is the number of times each SSB is repeated in SSB window.

It is to be noted that for paging a UE, gNB also determines the PO(s) for that UE in same manner as that UE determines based on the procedure explained above.

[Method 2]
Method 2-1

Figure 15:
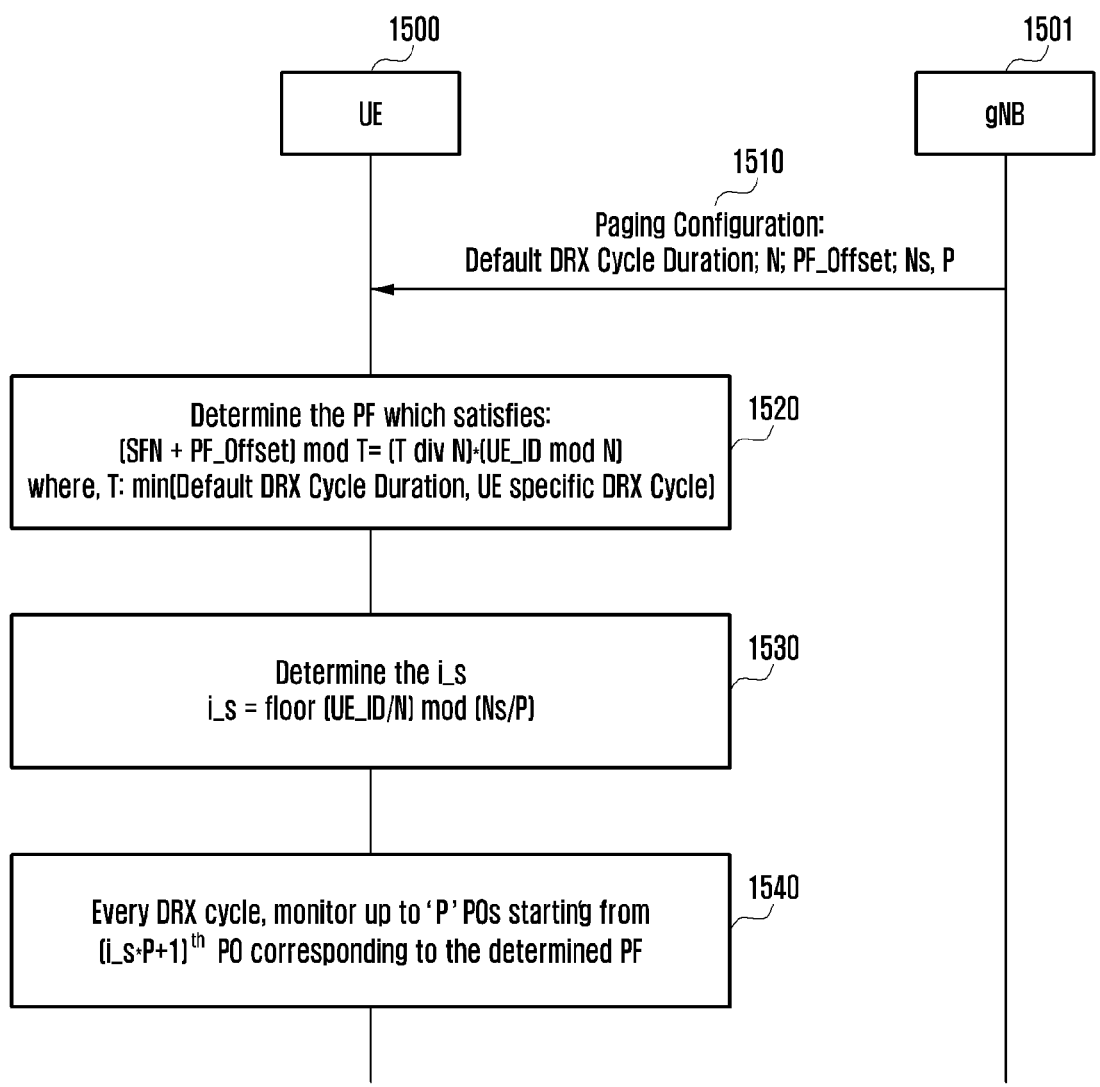
FIG. 15 illustrates a procedure of determining the PO(s) in a DRX cycle according to an embodiment of method 2-1.

FIG. 15 illustrates a procedure of determining the PO(s) in a DRX cycle according to an embodiment of method 2-1.

Referring to FIG. 15, a UE 1500 acquires the paging configuration (Default DRX Cycle Duration, PF_Offset, N, Ns, P) from the system information signaled by a network 1501 in step 1510. In an RRC IDLE and RRC INACTIVE state UE also acquires paging search space configuration from the system information signaled by network. In RRC Connected State, the paging search space configuration is signaled by the network 1501 for one or more configured BWP(s) in dedicated signaling. So, in RRC Connected state UE acquires paging search space configuration from dedicated RRC signaling. UE also acquires/receives parameter ssb-PositionsInBurst from system information i.e. SystemInformationBlock1. It can also be received in dedicated RRC signaling in RRC Connected state.

A UE first determines the paging frame in step 1520. The PF is the radio frame with SFN which satisfies:

$$(SFN+PF\_Offset) \mod T = (T \text{ div } N)*(UE\_ID \mod N)$$

Where,
T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.
N: Number of paging frames in DRX cycle. N is signaled by gNB (e.g. in system information). The values of N can be T, T/2, T/4, T/8, T/16, T/32 and so on.
UE_ID: S-TMSI mod 1024

In step 1530, the UE 1500 then calculates an index i_s, where i_s is derived from the following equation:

$$i\_s = \text{floor}(UE\_ID/N) \mod (Ns/P), \text{ where}$$

Ns: Number of POs. per PF. The parameter Ns is signaled by gNB (e.g. in system information). Note that all the POs corresponding to a PF need not be located within that PF. They may be located in one or more radio frames starting from PF.N: Number of paging frames in DRX cycle. N is signaled by gNB (e.g. in system information).
P: Number of POs per DRX cycle monitored by UE
UE_ID: S-TMSI mod 1024.

Every DRX cycle T (as determined above), the UE 1500 monitors up to 'P' POs starting from the $(i\_s*P+1)^{th}$ PO corresponding to the determined PF in step 1520 in step 1510. The parameter 'P' is signalled by gNB 1501 (e.g. in system information).

Figure 16:
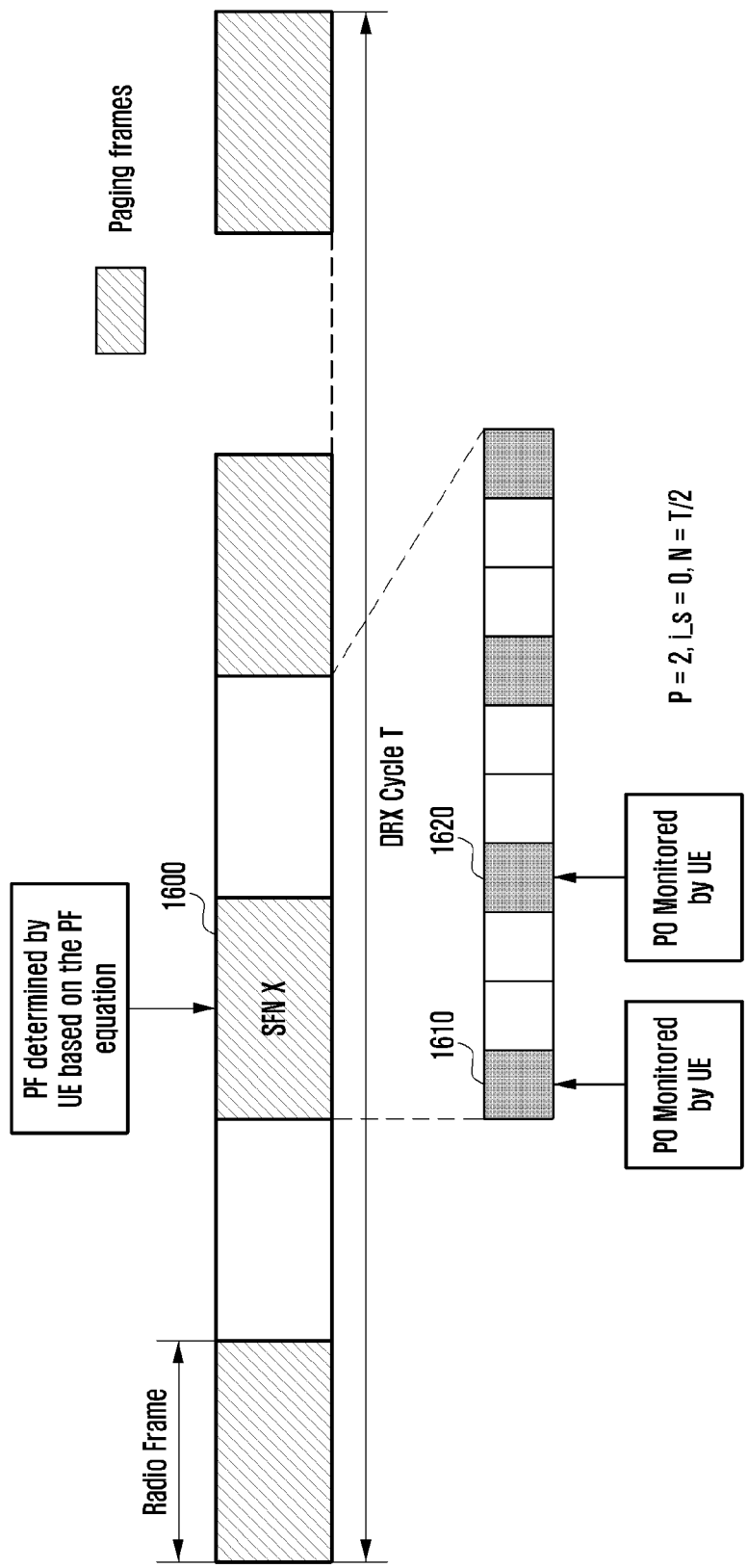
FIG. 16 illustrates an example of the PF and POs monitored by a UE determined by this method 2-1.

FIG. 16 illustrates an example of the PF and POs monitored by a UE determined by method 2-1. SFN X 1600 is the PF determined by the UE, value of 'P' signalled by a gNB is 2, N equals T/2 and i_s determined by the UE is 0. So the UE monitors $1^{st}$ and $2^{nd}$ PO 1610, 1620 with respect to SFN X. The UE will first monitor $1^{st}$ PO 1610 with respect to SFN X 1600. If it does not receive PDCCH addressed to P-RNTI in monitored PO, it monitors $2^{nd}$ PO 1620 with respect SFN X 1600.

In an embodiment, if a UE receives PDCCH addressed to P-RNTI in the monitored PO, wherein a paging message in DL TB scheduled by this PDCCH includes paging for itself (i.e. paging message includes UE ID), the UE may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein a paging message in DL TB scheduled by this PDCCH includes paging for itself, the UE may not monitor its other POs in that DRX cycle. The indication SkipAdditionalPOMonitoring provides flexibility to the network to immediately transmit paging when the channel becomes available or postpone it to subsequent POs.

In another embodiment, if a UE receives PDCCH addressed to P-RNTI in the monitored PO, wherein DL TB scheduled by this PDCCH includes a paging message (may or may not include paging for itself) it may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein DL TB scheduled by this PDCCH includes a paging message (may or may not include paging for itself) the UE may not monitor it's other POs in that DRX cycle.

In another embodiment, if a UE receives PDCCH addressed to P-RNTI in the monitored PO, the UE may not monitor its other POs in that DRX cycle. In another embodiment, if network signals SkipAdditionalPOMonitoring in system information or dedicated RRC signaling and if a UE receives PDCCH addressed to P-RNTI in the monitored PO the UE may not monitor its other POs in that DRX cycle.

In another embodiment, if a UE receives PDCCH addressed to P-RNTI in the monitored PO wherein DL TB scheduled by this PDCCH includes a paging message and there is no indication in the received paging message to monitor the other POs, it may not monitor its other POs in that DRX cycle. In another embodiment, if a UE receives PDCCH addressed to P-RNTI in the monitored PO and there is no indication in the received PDCCH to monitor the other POs, the UE may not monitor its other POs in that DRX cycle.

In another embodiment, if a UE receives PDCCH addressed to P-RNTI in the monitored PO wherein DL TB scheduled by this PDCCH includes a paging message and there is indication in the received paging message to monitor the other POs, the UE monitors its other POs in that DRX cycle. In another embodiment, if a UE receives PDCCH addressed to P-RNTI in the monitored PO and there is indication in the received PDCCH to monitor the other POs, the UE monitors its other POs in that DRX cycle. In an embodiment, a UE may monitor all its POs in a DRX cycle.

According to an embodiment, PDCCH monitoring occasions corresponding to $(i\_s*P+1)^{th}$ PO is determined as follows:

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

(y*(number of slots in a radio frame)+x−Monitoring-offset-PDCCH-slot)mod(Monitoring-periodicity-PDCCH-slot)=0;

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the PDCCH monitoring occasions for paging from the start of PF.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. The PDCCH monitoring occasions for paging which remains after the exclusion are the valid PDCCH monitoring occasions for paging and are referred as PDCCH monitoring occasions for paging in subsequent procedure. Note that exclusion of monitoring occasions for paging which are overlapping with UL symbols determined according to tdd-UL-DL-Configuration-Common parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols (determined according to tdd-UL-DL-ConfigurationCommon parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs as follows: When firstPDCCH-MonitoringOccasionOfPO is present (firstPDCCH-MonitoringOccasionOfPO is optionally signaled in paging configuration), the $(i\_s*P+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s*P+1)^{th}$ value of the firstPDCCH-MonitoringOccasionOfPO parameter).

Otherwise, the $(i\_s*P+1)^{th}$ PO is a set of 'S' consecutive PDCCH monitoring occasions for paging starting from the (i_s*P*PDCCH monitoring occasion for paging. 'S' is the number of actual transmitted SSBs determined according to ssb-PositionsInBurst in SystemInformationBlock1. Note that PDCCH monitoring occasions for paging are determined based on paging search space configuration.

In an alternate embodiment, if the multiple FDMed POs are supported (all POs including FDMed POs are identified by i_s) by configuring multiple paging coresets and firstPDCCH-MonitoringOccasionOfPO is not signalled, the $(i\_s*P+1)^{th}$ PO is a set of 'S' consecutive PDCCH monitoring occasions for paging starting from the $(i\_s*P/C)*S^{th}$ PDCCH monitoring occasion for paging. 'S' is the number of actual transmitted SSBs determined according to ssb-PositionsInBurst in SystemInformationBlock1. C is the number of paging coresets. In the PDCCH monitoring occasions of $(i\_s*P+1)^{th}$ PO, UE monitors $k^{th}$ paging coreset where k=(i_s*P) mod C.

In an embodiment of the present disclosure, parameter 'S' can be equal to [number of actual transmitted SSBs determined according to ssb-PositionsInBurst in SystemInformationBlock1]*X, where X is signaled by gNB or X is the number of times each SSB is repeated in SSB window.

It is to be noted that for paging a UE, gNB also determines the PO(s) for that UE in same manner as that UE determines based on the procedure explained above.

Figure 17:
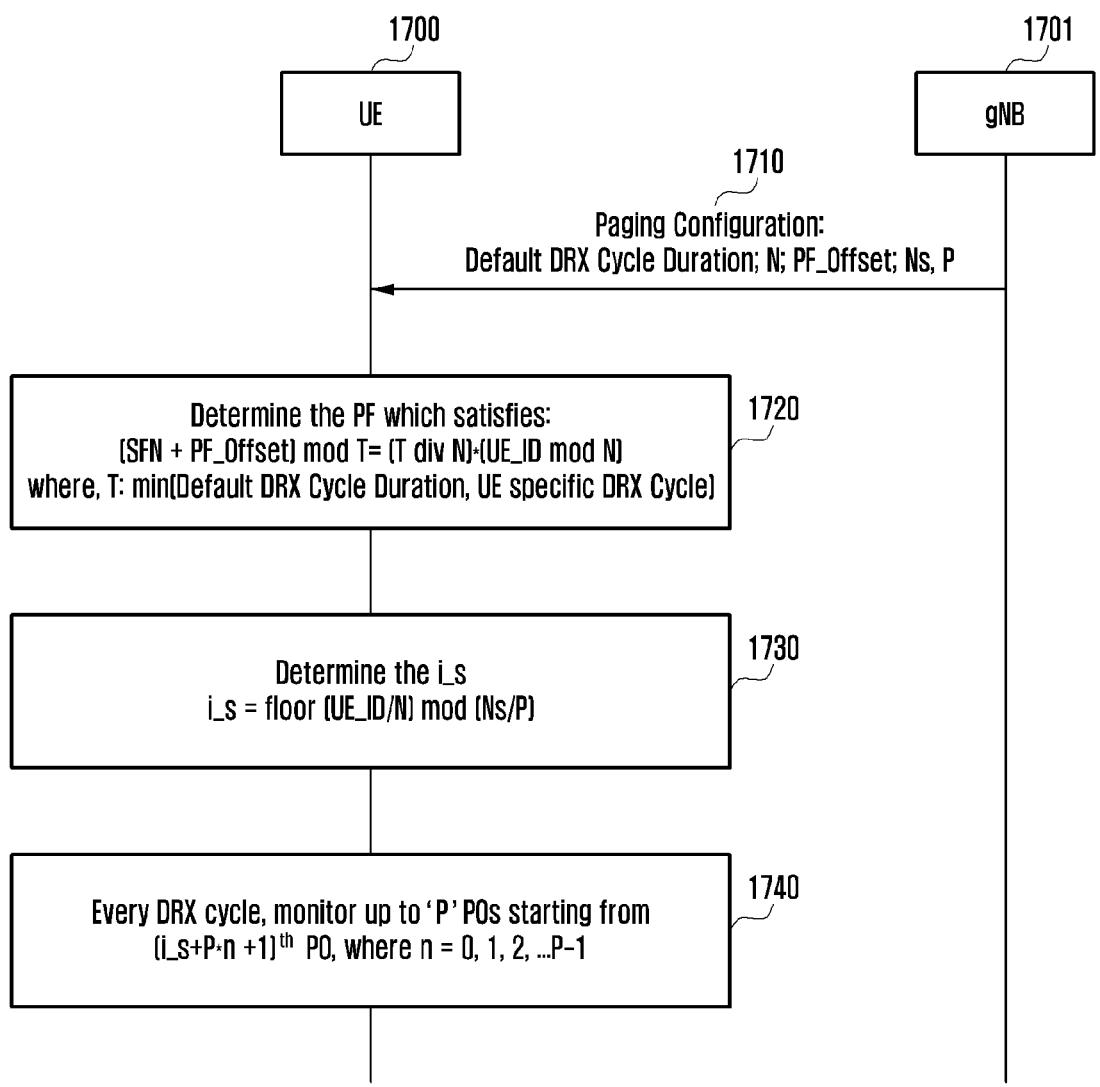
FIG. 17 illustrates a procedure of determining the PO(s) in a DRX cycle according to an embodiment of method 2-2.

Method 2-2:

FIG. 17 illustrates a procedure of determining the PO(s) in a DRX cycle according to an embodiment of method 2-2.

Referring to the FIG. 17, a UE 1700 acquires the paging configuration (Default DRX Cycle Duration, PF_Offset, N, Ns, P) from the system information signaled by a network 1701 in step 1710. In an RRC IDLE and RRC INACTIVE state UE also acquires paging search space configuration from the system information signaled by network. In an RRC Connected State, the paging search space configuration is signaled by the network 1701 for one or more configured BWP(s) in dedicated signaling. So, in the RRC Connected state UE acquires paging search space configuration from dedicated RRC signaling. The UE also acquires/receives parameter ssb-PositionsInBurst from system information i.e. SystemInformationBlock1. It can also be received in dedicated RRC signaling in RRC Connected state.

The UE first determines the paging frame in step 1720. The PF is the radio frame with SFN which satisfies:

(SFN+PF_Offset)mod T=(T div N)*(UE_ID mod N)

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

The UE then calculates an index i_s in step 1730, where i_s is derived from the following equation:

i_s=floor(UE_ID/N)mod(Ns/P), where

Ns: Number of POs. per PF. The parameter Ns is signaled by gNB (e.g. in system information). Note that all the POs corresponding to a PF need not be located within that PF. They may be located in one or more radio frames starting from PF.

N: Number of paging frames in DRX cycle. N is signaled by gNB (e.g. in system information).

P: Number of POs per DRX cycle monitored by UE

UE_ID: S-TMSI mod 1024.

Every DRX cycle T (as determined above), The UE monitors up to 'P' POs given by (i_s+P*n+1) where n=0, 1, 2, . . . P−1 in step 1740. The parameter 'P' is signalled by gNB 1701 (e.g. in system information).

Figure 18:
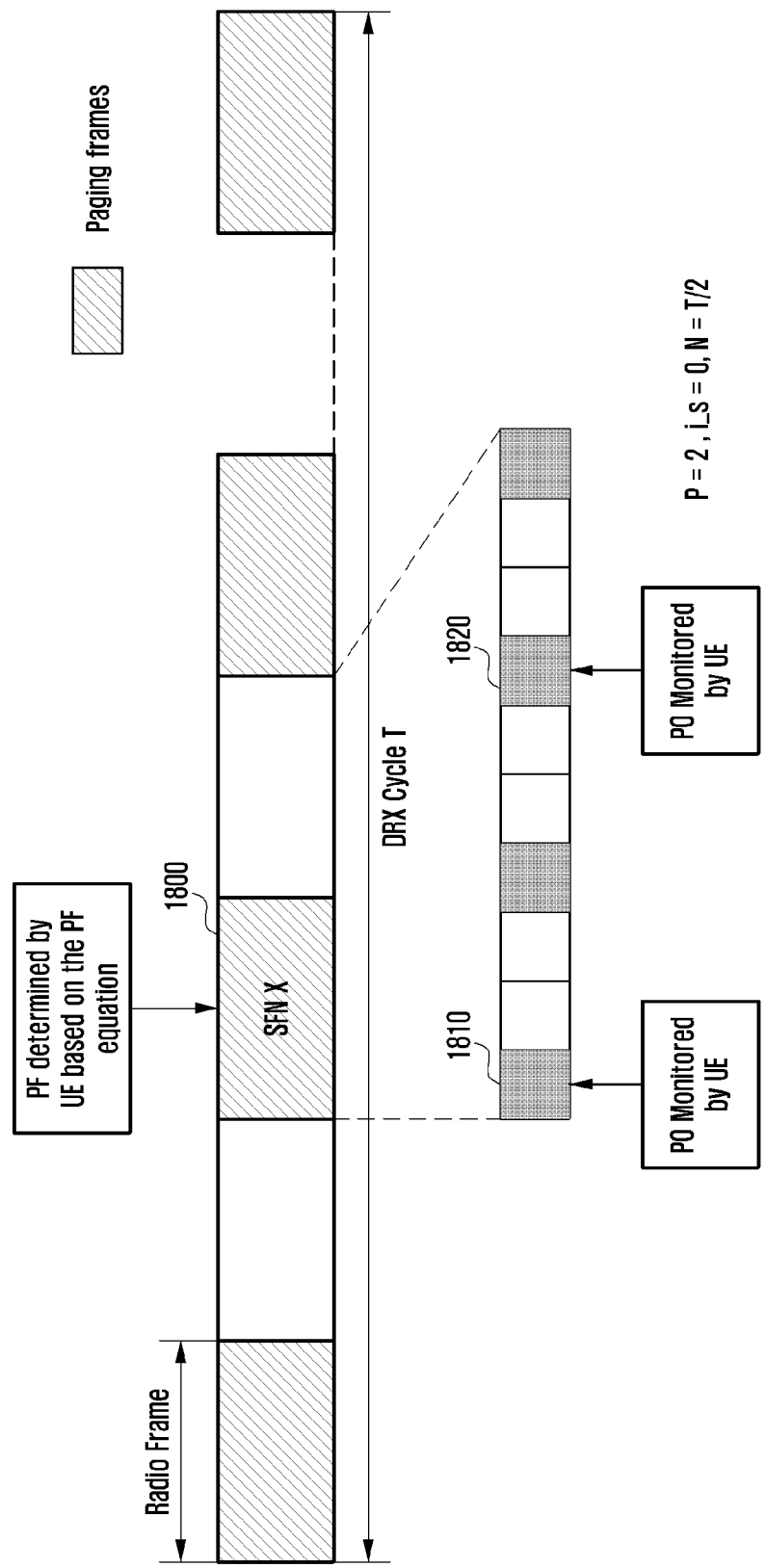
FIG. 18 illustrates an example of the POs monitored by a UE determined by method 2-2.

FIG. 18 illustrates an example of the POs monitored by a UE determined by method 2-2. SFN X 1800 is the PF determined by the UE, value of 'P' signalled by a gNB is 2, N equals T/2 and i_s determined by the UE is 0. So the UE monitors $1^{st}$ and $3^{rd}$ PO 1810, 1820 with respect to SFN X. The UE will first monitor $1^{st}$ PO 1810 with respect to SFN X 1800. If it does not receive paging message in monitored PO, it monitors $3^{rd}$ PO 1820 with respect SFN X 1800.

In an embodiment, if a UE receives PDCCH addressed to P-RNTI in the monitored PO, wherein paging message in DL TB scheduled by this PDCCH includes paging for itself (i.e. paging message includes UE ID), it may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein paging message in DL TB scheduled by this PDCCH includes paging for itself, the UE may not monitor its other POs in that DRX cycle. The indication SkipAdditionalPOMonitoring provides flexibility to network to immediately transmit paging when the channel becomes available or postpone it to subsequent POs.

In another embodiment, if a UE receives PDCCH addressed to P-RNTI in the monitored PO, wherein DL TB scheduled by this PDCCH includes paging message (may or may not include paging for itself) the UE may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein DL TB scheduled by this PDCCH includes paging message (may or may not include paging for itself) the UE may not monitor its other POs in that DRX cycle.

In another embodiment, if a UE receives PDCCH addressed to P-RNTI in the monitored PO, it may not monitor its other POs in that DRX cycle. In another embodiment, if a network signals SkipAdditionalPOMonitoring in system information or dedicated RRC signaling and if a UE receives PDCCH addressed to P-RNTI in the monitored PO, the UE may not monitor its other POs in that DRX cycle.

In another embodiment, if a UE receives PDCCH addressed to P-RNTI in the monitored PO wherein DL TB scheduled by this PDCCH includes a paging message and there is no indication in the received paging message to monitor the other POs, it may not monitor its other POs in that DRX cycle. In another embodiment, if a UE receives PDCCH addressed to P-RNTI in the monitored PO and there is no indication in the received PDCCH to monitor the other POs, the UE may not monitor its other POs in that DRX cycle.

In another embodiment, if a UE receives PDCCH addressed to P-RNTI in the monitored PO wherein DL TB scheduled by this PDCCH includes paging message and there is indication in the received paging message to monitor the other POs, the UE monitors its other POs in that DRX cycle. In another embodiment, if a UE receives PDCCH addressed to P-RNTI in the monitored PO and there is indication in the received PDCCH to monitor the other POs, the UE monitors its other POs in that DRX cycle. In an embodiment, a UE may monitor all its POs in a DRX cycle.

According to an embodiment, PDCCH monitoring occasions corresponding to $(i\_s+P*n+1)^{th}$ PO is determined as follows:

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the 1st PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. The PDCCH monitoring occasions for paging which remains after the exclusion are the valid PDCCH monitoring occasions for paging and are referred as PDCCH monitoring occasions for paging in subsequent procedure. Note that exclusion of monitoring occasions for paging which are overlapping with UL symbols determined according to tdd-UL-DL-ConfigurationCommon parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols (determined according to tdd-UL-DL-ConfigurationCommon parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs as follows:

When firstPDCCH-MonitoringOccasionOfPO is present (firstPDCCH-MonitoringOccasionOfPO is optionally signaled in paging configuration), the $(i\_s+P*n+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+P*n+1)^{th}$ value of the firstPDCCH-MonitoringOccasionOfPO parameter).

Otherwise, the $(i\_s+P*n+1)^{th}$ PO is a set of 'S' consecutive PDCCH monitoring occasions for paging starting from the $((i\_s+P*n)*S)^{th}$ PDCCH monitoring occasion for paging. 'S' is the number of actual transmitted SSBs determined according to ssb-PositionsInBurst in SystemInformationBlock1. Note that PDCCH monitoring occasions for paging are determined based on paging search space configuration.

In an alternate embodiment, if the multiple FDMed POs are supported (all POs including FDMed POs are identified by i_s) by configuring multiple paging coresets and firstPDCCH-MonitoringOccasionOfPO is not signalled, the $(i\_s+P*n+1)^{th}$ PO is a set of 'S' consecutive PDCCH monitoring occasions for paging starting from the $((i\_s+P*n)/C)*S^{th}$ PDCCH monitoring occasion for paging. 'S' is the number of actual transmitted SSBs determined according to ssb-PositionsInBurst in SystemInformationBlock1. C is the number of paging coresets. In the PDCCH monitoring occasions of $(i\_s+P*n+1)^{th}$ PO, UE monitors $k^{th}$ paging coreset where k=(i_s+P*n) mod C.

In an embodiment of the present disclosure, parameter 'S' can be equal to [number of actual transmitted SSBs determined according to ssb-PositionsInBurst in SystemInformationBlock1]*X where X is signaled by gNB or X is the number of times each SSB is repeated in SSB window.

It is to be noted that for paging a UE, gNB also determines the PO(s) for that UE in same manner as that UE determines based on the procedure explained above.

[Method 3]
Method 3-1

Figure 19:
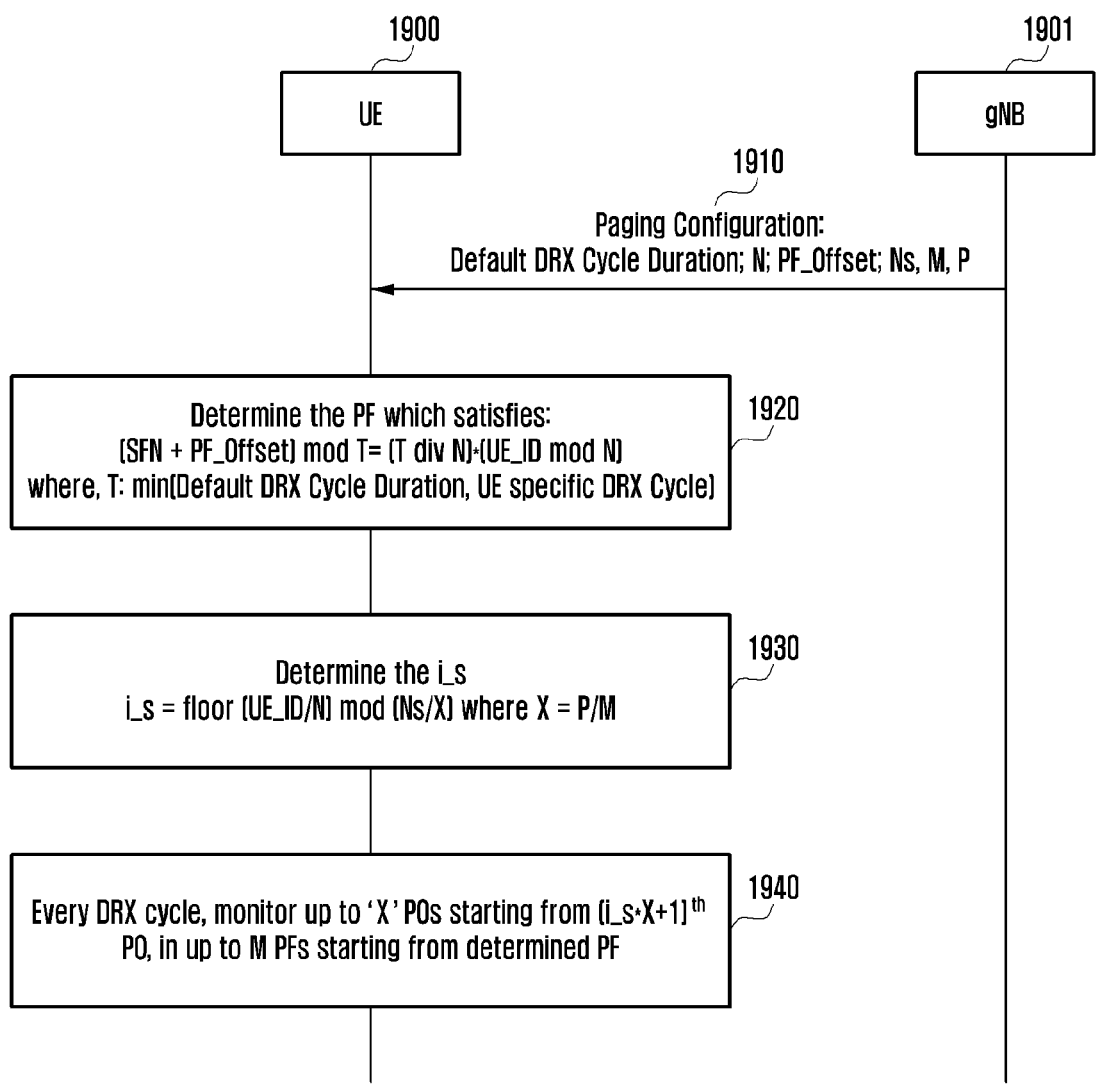
FIG. 19 illustrates a procedure of determining the PO(s) in a DRX cycle according to an embodiment of method 3-1.

FIG. 19 illustrates a procedure of determining the PO(s) in a DRX cycle according to an embodiment of method 3-1.

Referring to FIG. 19, a UE 1900 acquires the paging configuration (Default DRX Cycle Duration, PF_Offset, N, Ns, P, M) from the system information signaled by a network 1901 in step 1910. In an RRC IDLE and RRC INACTIVE state UE also acquires paging search space configuration from the system information signaled by the network. In RRC Connected State, the paging search space configuration is signaled by the network 1901 for one or more configured BWP(s) in dedicated signaling. So, in RRC Connected state, a UE acquires paging search space configuration from dedicated RRC signaling. The UE also acquires/receives parameter ssb-PositionsInBurst from system information i.e. SystemInformationBlock1. It can also be received in dedicated RRC signaling in RRC Connected state.

The UE first determines the paging frame in step 1920. The PF is the radio frame with SFN which satisfies:

(SFN+PF_Offset)mod $T=(T$ div $N)*(UE\_ID$ mod $N)$

Where,
T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.
N: Number of paging frames in DRX cycle. N is signaled by gNB (e.g. in system information). The values of N can be T, T/2, T/4, T/8, T/16, T/32 and so on.
UE_ID: S-TMSI mod 1024
The UE then calculates an index i_s in step 1930, where i_s is derived from the following equation:

i_s=floor(UE_ID/N)mod(Ns/X), where

Ns: Number of POs. per PF. The parameter Ns is signaled by gNB (e.g. in system information). Note that all the POs corresponding to a PF need not be located within that PF. They may be located in one or more radio frames starting from PF.
N: Number of paging frames in DRX cycle. N is signaled by gNB (e.g. in system information).
P: Number of POs per DRX cycle monitored by UE
M: Number of PFs per DRX cycle monitored by UE
X: P/M; Number of POs per PF monitored by UE
UE_ID: S-TMSI mod 1024.

Every DRX cycle T (as determined above, the UE monitors up to 'X' POs starting from $(i\_s*X+1)^{th}$ PO, in up to 'M' PFs starting from the determined PF in step 1920 in step 1940. The parameter 'P' and 'M' is signalled by gNB 1901 (e.g. in system information). If the PF determined in step 1920 is SFN X, the UE 1900 monitors SFN X+k*T/N where k=0, 1, 2, . . . M−1.

Figure 20:
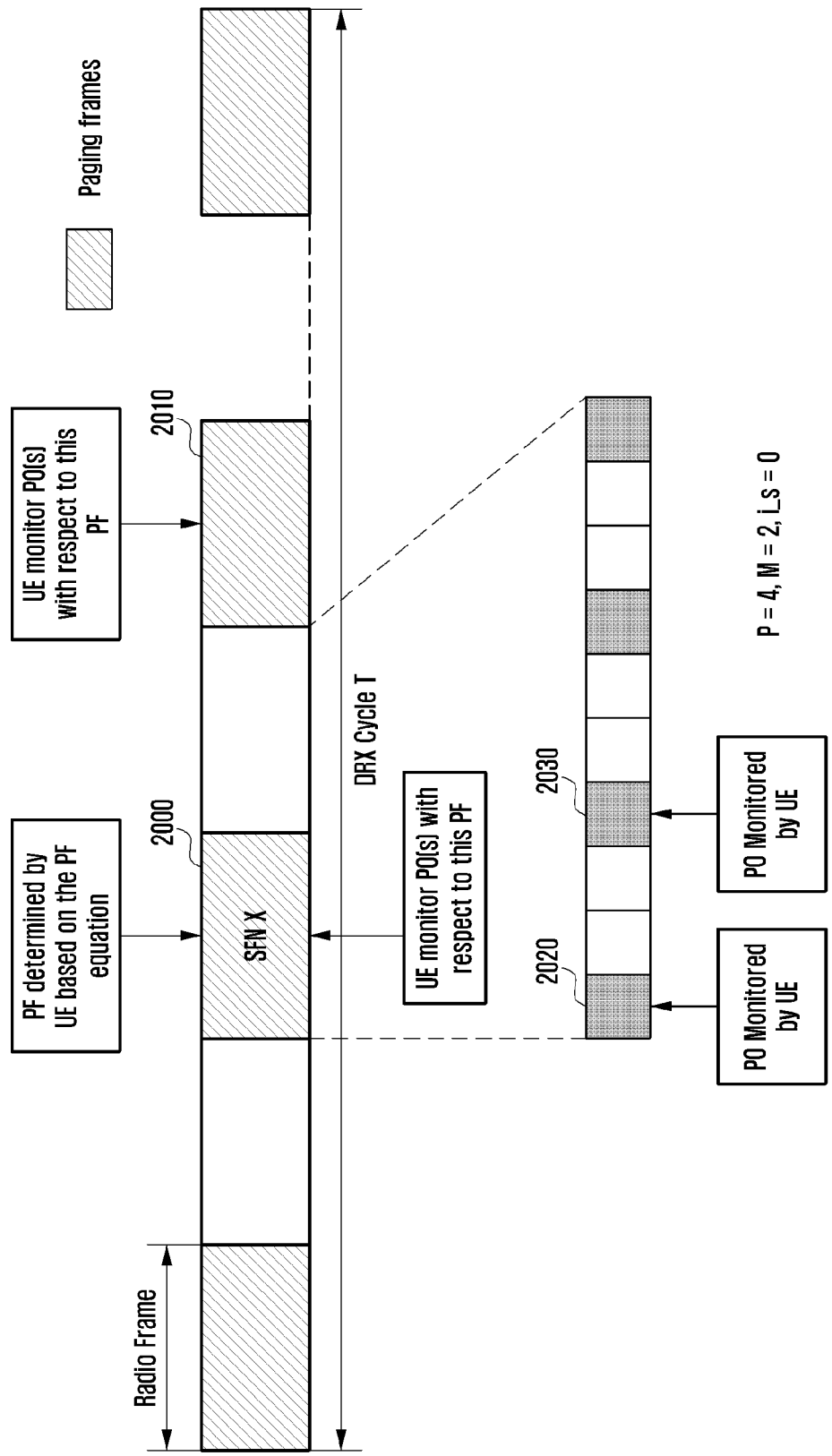
FIG. 20 illustrates an example of the POs monitored by the UE determined by method 3-1.

FIG. 20 illustrates an example of the POs monitored by the UE determined by method 3-1. SFN X 2000 is the PF determined by the UE, value of 'P' signalled by gNB is 4, value of M signalled by gNB is 2, N equals T/2 and i_s determined by UE is 0. So the UE monitors $1^{st}$ and $2^{nd}$ PO 2020 2030 with respect to SFN X 2000 and SFN X+2 2010. The UE will first monitor $1^{st}$ PO 2020 with respect to SFN X 2000. If it does not receive PDCCH addressed to P-RNTI in monitored PO, it monitors $2^{nd}$ PO 2030 with respect SFN X 2000 and so on.

In an embodiment, if a UE receives PDCCH addressed to P-RNTI in the monitored PO, wherein a paging message in DL TB scheduled by this PDCCH includes paging for itself (i.e. paging message includes UE ID), it may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein paging message in DL TB scheduled by this PDCCH includes paging for itself, the UE may not monitor its other POs in that DRX cycle. The indication SkipAdditionalPOMonitoring provides flexibility to network to immediately transmit paging when the channel becomes available or postpone it to subsequent POs.

In another embodiment, if a UE receives PDCCH addressed to P-RNTI in the monitored PO, wherein DL TB scheduled by this PDCCH includes paging message (may or may not include paging for itself) it may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein DL TB scheduled by this PDCCH includes paging message (may or may not include paging for itself), the UE may not monitor its other POs in that DRX cycle.

In another embodiment, if a UE receives PDCCH addressed to P-RNTI in the monitored PO, it may not monitor its other POs in that DRX cycle. In another embodiment, if a network signals SkipAdditionalPOMonitoring in system information or dedicated RRC signaling and if a UE receives PDCCH addressed to P-RNTI in the monitored PO the UE may not monitor its other POs in that DRX cycle.

In another embodiment, if a UE receives PDCCH addressed to P-RNTI in the monitored PO wherein DL TB scheduled by this PDCCH includes paging message and there is no indication in the received paging message to monitor the other POs, it may not monitor its other POs in that DRX cycle. In another embodiment, if a UE receives PDCCH addressed to P-RNTI in the monitored PO and there is no indication in the received PDCCH to monitor the other POs, it may not monitor its other POs in that DRX cycle.

In another embodiment, if a UE receives PDCCH addressed to P-RNTI in the monitored PO wherein DL TB scheduled by this PDCCH includes paging message and there is indication in the received paging message to monitor the other POs, the UE monitors its other POs in that DRX cycle. In another embodiment, if a UE receives PDCCH addressed to P-RNTI in the monitored PO and there is indication in the received PDCCH to monitor the other POs, the UE monitors its other POs in that DRX cycle. In an embodiment, a UE may monitor all its POs in a DRX cycle.

According to an embodiment, PDCCH monitoring occasions corresponding to $(i\_s*X+1)^{th}$ PO is determined as follows:

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

$(y*(\text{number of slots in a radio frame})+x-\text{Monitoring-offset-PDCCH-slot})\text{mod}(\text{Monitoring-periodicity-PDCCH-slot})=0;$ The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the $1^{st}$ PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. The PDCCH monitoring occasions for paging which remains after the exclusion are the valid PDCCH monitoring occasions for paging and are referred as PDCCH monitoring occasions for paging in subsequent procedure. Note that exclusion of monitoring occasions for paging which are overlapping with UL symbols determined according to tdd-UL-DL-Configuration-Common parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols (UL symbols are determined according to tdd-UL-DL-Configuration-Common parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs as follows:

When firstPDCCH-MonitoringOccasionOfPO is present (firstPDCCH-MonitoringOccasionOfPO is optionally signaled in paging configuration), the $(i\_s*X+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s*X+1)^{th}$ value of the firstPDCCH-MonitoringOccasionOfPO parameter).

Otherwise, the $(i\_s*X+1)^{th}$ PO is a set of 'S' consecutive PDCCH monitoring occasions for paging starting from the $(i\_s*X*$PDCCH monitoring occasion for paging. 'S' is the number of actual transmitted SSBs determined according to ssb-PositionsInBurst in SystemInformationBlock1. Note that PDCCH monitoring occasions for paging are determined based on paging search space configuration.

In an alternate embodiment, if the multiple FDMed POs are supported (all POs including FDMed POs are identified by i_s) by configuring multiple paging coresets and firstPDCCH-MonitoringOccasionOfPO is not signalled, the $(i\_s*X+1)^{th}$ PO is a set of 'S' consecutive PDCCH monitoring occasions for paging starting from the $(i\_s*X/C)*S^{th}$ PDCCH monitoring occasion for paging. 'S' is the number of actual transmitted SSBs determined according to ssb-PositionsInBurst in SystemInformationBlock1. C is the number of paging coresets. In the PDCCH monitoring occasions of $(i\_s*X+1)^{th}$ PO, UE monitors $k^{th}$ paging coreset where k=$(i\_s*X)$ mod C.

In an embodiment of the present disclosure, parameter 'S' can be equal to [number of actual transmitted SSBs determined according to ssb-PositionsInBurst in SystemInformationBlock1]*L where L is signaled by gNB or L is the number of times each SSB is repeated in SSB window.

It is to be noted that for paging a UE, gNB also determines the PO(s) for that UE in same manner as that UE determines based on the procedure explained above.

Figure 21:
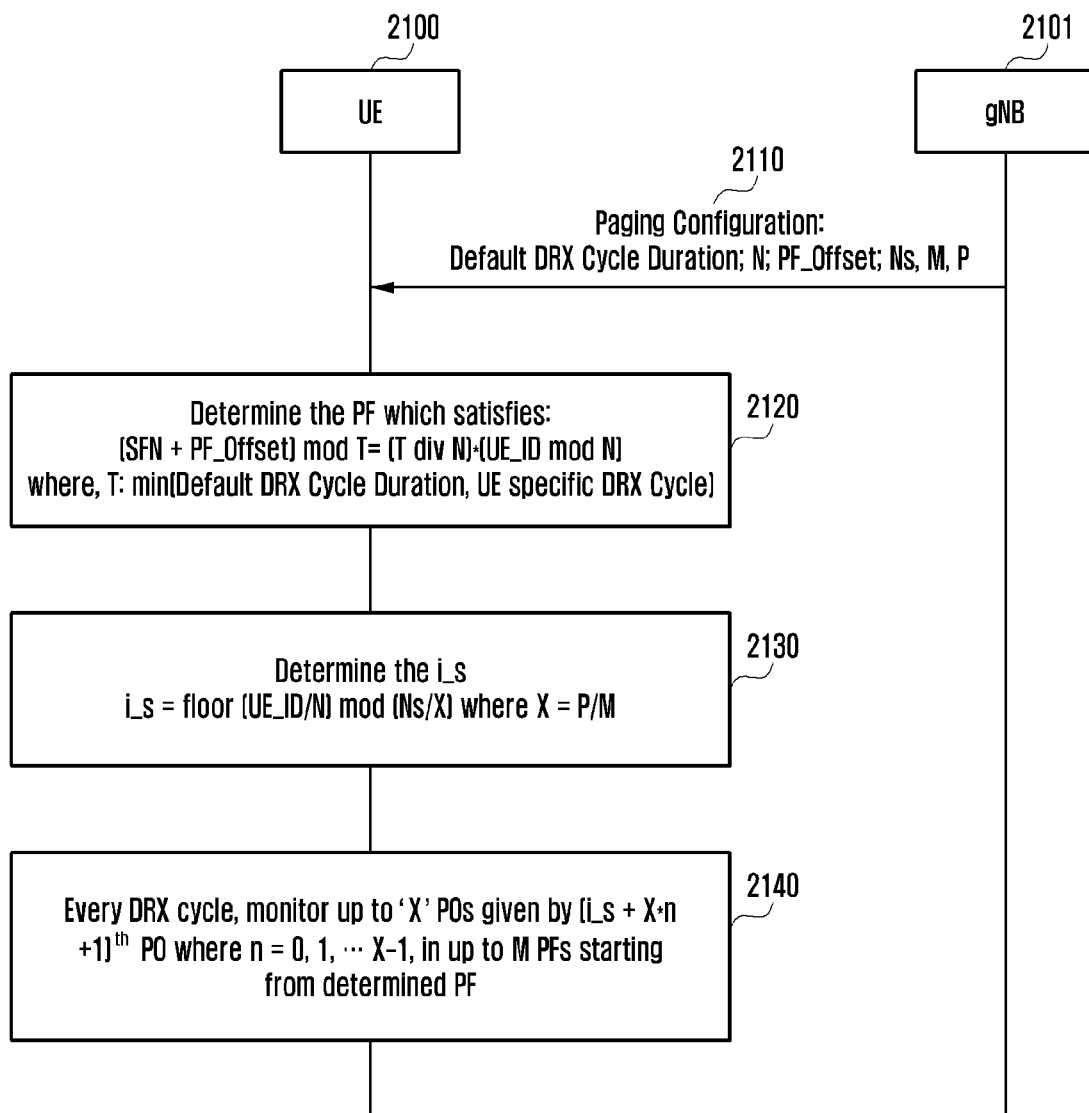
FIG. 21 illustrates a procedure of determining the PO(s) in a DRX cycle according to method 3-2.

Method 3-2:

FIG. 21 illustrates a procedure of determining the PO(s) in a DRX cycle according to an embodiment of method 3-2.

A UE 2100 acquires the paging configuration (Default DRX Cycle Duration, PF_Offset, N, Ns, P, M) and paging search space configuration from the system information signaled by a network 2101 in step 2110. In RRC IDLE and RRC INACTIVE state UE also acquires paging search space configuration from the system information signaled by network. In RRC Connected State, the paging search space configuration is signaled by the network 2101 for one or more configured BWP(s) in dedicated signaling. So, in RRC Connected state, a UE acquires paging search space configuration from dedicated RRC signaling. The UE also acquires parameter ssb-PositionsInBurst from system information i.e. SystemInformationBlock1. It can also be received in dedicated RRC signaling in RRC Connected state.

The UE 2100 first determines the paging frame in step 2120. The PF is the radio frame with SFN which satisfies:

$(SFN+PF\_Offset)\text{mod } T=(T \text{ div } N)*(UE\_ID \text{ mod } N)$

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

The UE 2100 then calculates an index i_s in step 2130, where i_s is derived from the following equation:

$$i\_s = \text{floor}(UE\_ID/N) \bmod (Ns/X), \text{ where}$$

Ns: Number of POs. per PF. The parameter Ns is signaled by gNB (e.g. in system information). Note that all the POs corresponding to a PF need not be located within that PF. They may be located in one or more radio frames starting from PF.

N: Number of paging frames in DRX cycle. N is signaled by gNB (e.g. in system information).

P: Number of POs per DRX cycle monitored by UE

M: Number of PFs per DRX cycle monitored by UE

X: P/M; Number of POs per PF monitored by UE

UE_ID: S-TMSI mod 1024.

Every DRX cycle T (as determined above), the UE 2100 monitors up to 'X' POs given by (i_s+X*n+1) where n=0, 1, 2, ... X−1, in up to 'M' PFs starting from the determined PF in step 2120. The parameter 'P' and 'M' is signalled by gNB 2101 (e.g. in system information). If PF determined in step 2120 is SFN X, the UE 2100 monitors SFN X+k*T/N where k=0, 1, 2, ... M−1.

Figure 22:
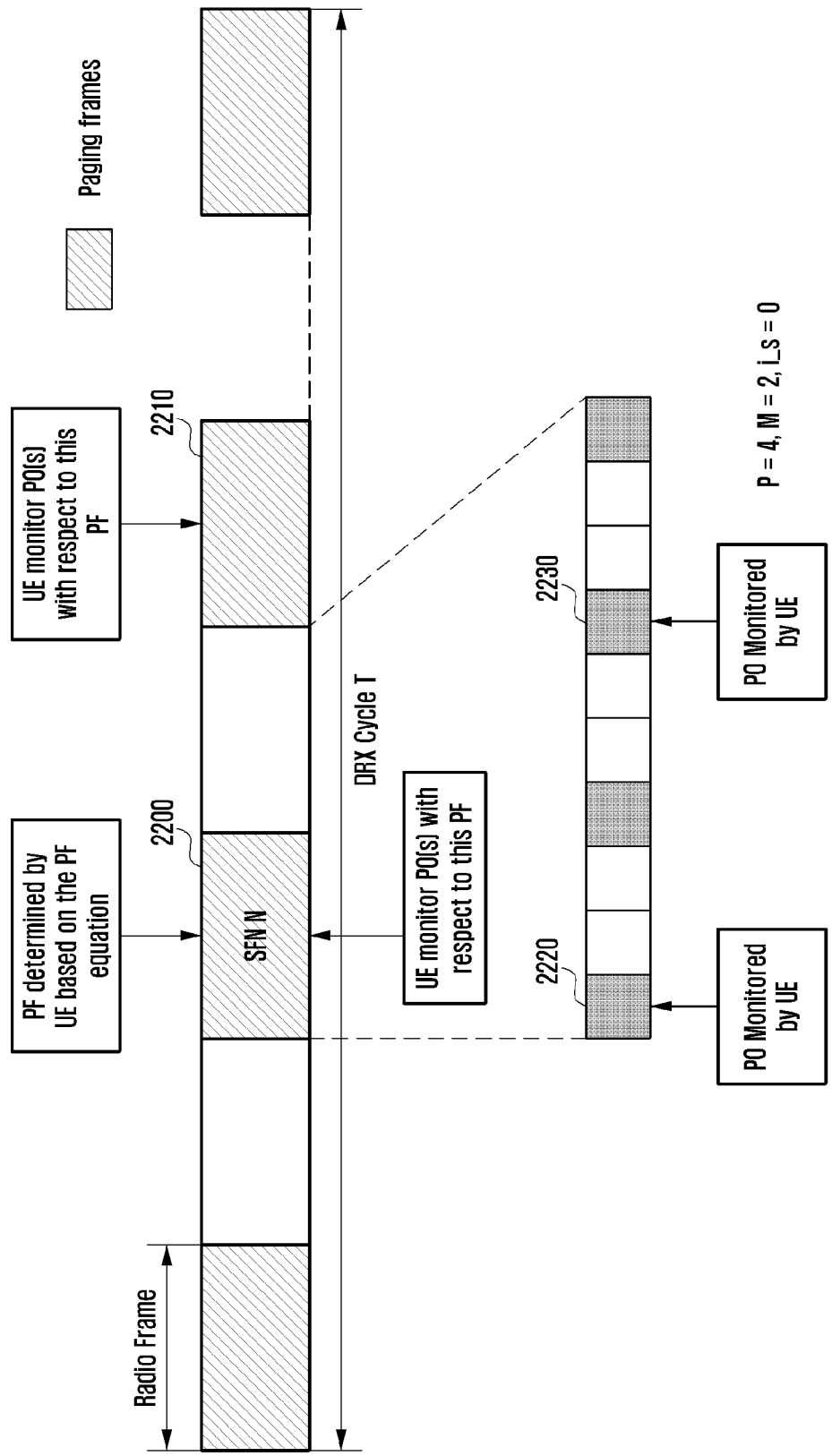
FIG. 22 illustrates an example of the POs monitored by the UE determined by method 3-2.

FIG. 22 illustrates an example of the POs monitored by the UE determined by method 3-2. SFN X 2200 is the PF determined by the UE, value of 'P' signalled by a gNB is 4, value of M signalled by the gNB is 2, N equals T/2 and i_s determined by the UE is 0. So the UE monitors $1^{st}$ and 3rd PO 2220, 2230 with respect to SFN X 2200 and SFN X+2 2210. The UE will first monitor $1^{st}$ PO 2220 with respect to SFN X 2200. If it does not receive PDCCH addressed to P-RNTI in monitored PO, it monitors $3^{rd}$ PO 2230 with respect SFN X 2200 and so on.

In an embodiment, if a UE receives PDCCH addressed to P-RNTI in the monitored PO, wherein paging message in DL TB scheduled by this PDCCH includes paging for itself (i.e. paging message includes UE ID), the UE may not monitor its other POs in that DRX cycle. In another embodiment, if a network signals SkipAdditionalPOMonitoring in system information or dedicated RRC signaling and if a UE receives PDCCH addressed to P-RNTI in the monitored PO wherein paging message in DL TB scheduled by this PDCCH includes paging for itself, the UE may not monitor its other POs in that DRX cycle. The indication SkipAdditionalPOMonitoring provides flexibility to network to immediately transmit paging when the channel becomes available or postpone it to subsequent POs.

In another embodiment, if a UE receives PDCCH addressed to P-RNTI in the monitored PO, wherein DL TB scheduled by this PDCCH includes paging message (may or may not include paging for itself) the UE may not monitor its other POs in that DRX cycle. In another embodiment, if a network signals SkipAdditionalPOMonitoring in system information or dedicated RRC signaling and if the UE receives PDCCH addressed to P-RNTI in the monitored PO wherein DL TB scheduled by this PDCCH includes paging message (may or may not include paging for itself) the UE may not monitor its other POs in that DRX cycle.

In another embodiment, if a UE receives PDCCH addressed to P-RNTI in the monitored PO, it may not monitor its other POs in that DRX cycle. In another embodiment, if a network signals SkipAdditionalPOMonitoring in system information or dedicated RRC signaling and if a UE receives PDCCH addressed to P-RNTI in the monitored PO the UE may not monitor its other POs in that DRX cycle.

In another embodiment, if a UE receives PDCCH addressed to P-RNTI in the monitored PO wherein DL TB scheduled by this PDCCH includes paging message and there is no indication in the received paging message to monitor the other POs, it may not monitor its other POs in that DRX cycle. In another embodiment, if a UE receives PDCCH addressed to P-RNTI in the monitored PO and there is no indication in the received PDCCH to monitor the other POs, it may not monitor its other POs in that DRX cycle.

In another embodiment, if a UE receives PDCCH addressed to P-RNTI in the monitored PO wherein DL TB scheduled by this PDCCH includes paging message and there is indication in the received paging message to monitor the other POs, the UE monitors its other POs in that DRX cycle. In another embodiment, if a UE receives PDCCH addressed to P-RNTI in the monitored PO and there is indication in the received PDCCH to monitor the other POs, it monitors its other POs in that DRX cycle. In an embodiment, a UE may monitor all its POs in a DRX cycle.

PDCCH monitoring occasions corresponding to (i_s+X*n+1)$^{th}$ PO is determined as follows:

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

$$(y^*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the 1st PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. The PDCCH monitoring occasions for paging which remains after the exclusion are the valid PDCCH monitoring occasions for paging and are referred as PDCCH monitoring occasions for paging in subsequent procedure. Note that exclusion of monitoring occasions for paging which are overlapping with UL symbols determined according to tdd-UL-DL-Configuration-Common parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols (UL symbols are determined according to tdd-UL-DL-Configuration-Common parameter signalled in SIB 1) are sequentially numbered from zero starting from the 1st PDCCH monitoring occasion for paging in the PF. In other words the valid PDCCH monitoring occasions from the start of PF are sequentially numbered from zero. These numbered PDCCH monitoring occasions are then mapped to POs as follows:

When firstPDCCH-MonitoringOccasionOfPO is present (firstPDCCH-MonitoringOccasionOfPO is optionally signaled in paging configuration), the $(i\_s+X*n+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+X*n+1)^{th}$ value of the firstPDCCH-MonitoringOccasionOfPO parameter).

Otherwise, the $(i\_s+X*n+1)^{th}$ PO is a set of 'S' consecutive PDCCH monitoring occasions for paging starting from the $((i\_s+X*n)*S)^{th}$ PDCCH monitoring occasion for paging. 'S' is the number of actual transmitted SSBs determined according to ssb-PositionsInBurst in SystemInformation-Block1. Note that PDCCH monitoring occasions for paging are determined based on paging search space configuration.

In an alternate embodiment, if the multiple FDMed POs are supported (all POs including FDMed POs are identified by i_s) by configuring multiple paging coresets and firstPDCCH-MonitoringOccasionOfPO is not signalled, the $(i\_s+X*n+1)^{th}$ PO is a set of 'S' consecutive PDCCH monitoring occasions for paging starting from the $((i\_s+X*n)/C)*S^{th}$ PDCCH monitoring occasion for paging. 'S' is the number of actual transmitted SSBs determined according to ssb-PositionsInBurst in SystemInformationBlock1. C is the number of paging coresets. In the PDCCH monitoring occasions of $(i\_s+X*n+1)^{th}$ PO, UE monitors $k^{th}$ paging coreset where $k=(i\_s+X*n)$ mod C.

In an embodiment of the present disclosure, parameter 'S' can be equal to [number of actual transmitted SSBs determined according to ssb-PositionsInBurst in SystemInformationBlock1]*L where L is signaled by gNB or L is the number of times each SSB is repeated in SSB window.

In method 3-3, P is number of POs per DRX cycle monitored by UE. M is the number of PFs per DRX cycle monitored by UE. X is number of POs per PF monitored by UE, where X=P/M. In embodiment 1 and 2 explained above, P and M are signaled by gNB. In alternate embodiment any of the two parameters amongst P, M and X can be signaled by gNB. The third parameter can be obtained based on relation X=P/M. Embodiment 1 or 2 can then be used to determine PF/POs to be monitored by UE in DRX cycle.

It is to be noted that for paging a UE, gNB also determines the PO(s) for that UE in same manner as that UE determines based on the procedure explained above.

Figure 23:
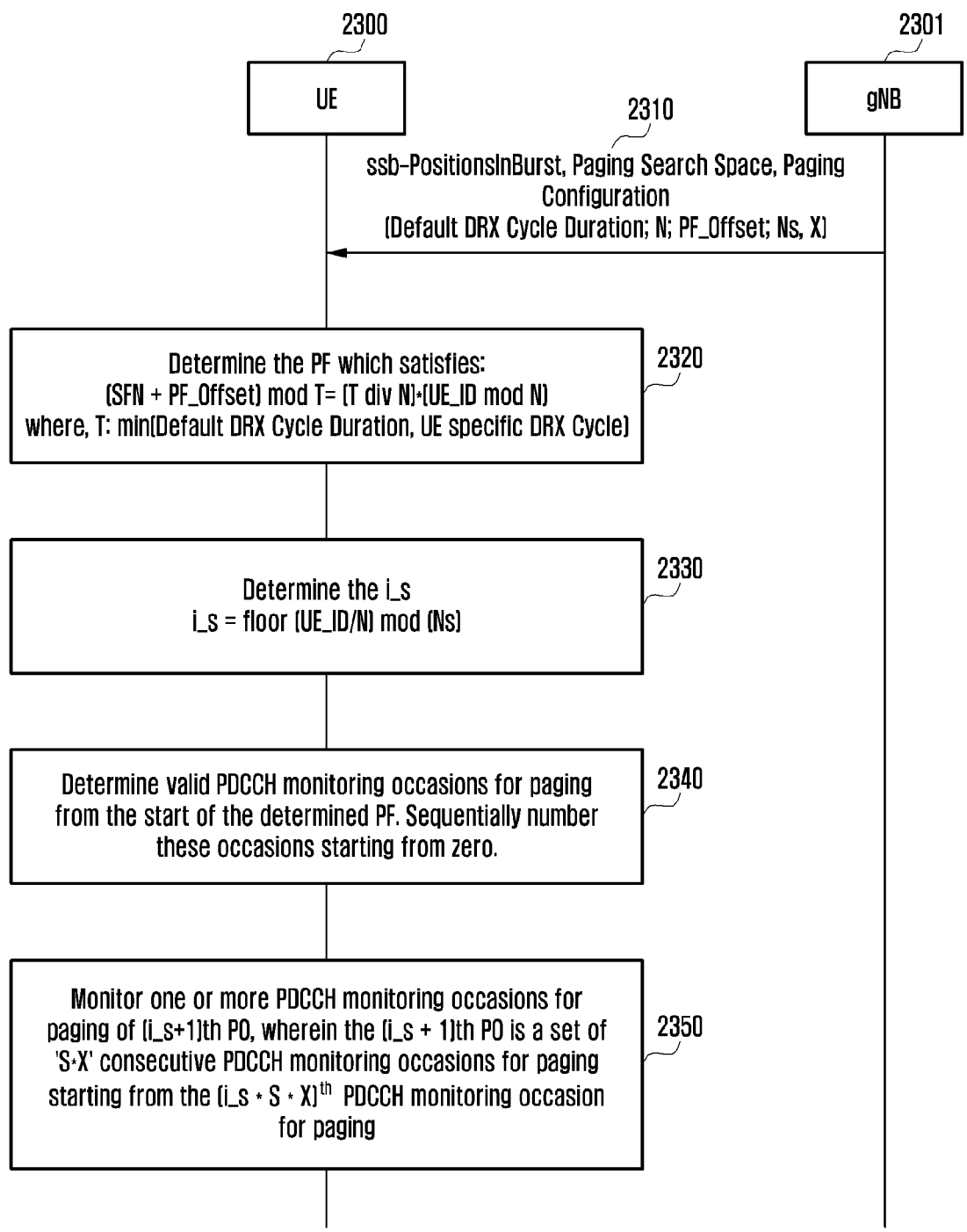
FIG. 23 illustrates a procedure of determining the PO(s) in a DRX cycle according to an embodiment of method 4-1.

[Method 4]
Method 4-1:
FIG. 23 illustrates a procedure of determining the PO(s) in a DRX cycle according to an embodiment of method 4-1.

A UE 2300 acquires/receives the paging configuration (Default DRX Cycle Duration, PF_Offset, N, Ns, X) from the system information (i.e. SystemInformationBlock1) signaled by a network 2301 in step 2310. In RRC IDLE and RRC INACTIVE state UE also acquires/receives paging search space configuration from the system information (i.e. SystemInformationBlock1) signaled by network. In RRC Connected State, the paging search space configuration is signaled by the network for one or more configured BWP(s) in dedicated signaling. So, in RRC Connected state a UE acquires/receives paging search space configuration from dedicated RRC signaling. The UE also acquires parameter ssb-PositionsInBurst from system information i.e. SystemInformationBlock1. It can also be received in dedicated RRC signaling in RRC Connected state.

The UE 2300 first determines the paging frame in step 2320. The PF is the radio frame with SFN which satisfies:

$$(SFN+PF\_Offset) \bmod T = (T \operatorname{div} N)*(UE\_ID \bmod N)$$

Where,
T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.
N: Number of paging frames in DRX cycle. N is signaled by gNB (e.g. in system information). The values of N can be T, T/2, T/4, T/8, T/16, T/32 and so on.
UE_ID: S-TMSI mod 1024

The UE 2300 then calculates an index i_s in step 2330, where i_s is derived from the following equation:

$$i\_s = \operatorname{floor}(UE\_ID/N) \bmod Ns, \text{ where}$$

Ns: Number of POs. per PF. The parameter Ns is signaled by gNB (e.g. in system information). Note that all the POs corresponding to a PF need not be located within that PF. They may be located in one or more radio frames starting from PF.
N: Number of paging frames in DRX cycle. N is signaled by gNB (e.g. in system information).
UE_ID: S-TMSI mod 1024.

In step 2340, the UE 2300 determines valid PDCCH monitoring occasions for paging from the start of determined PF in step 2320.

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

$$(y*(\text{number of slots in a radio frame})+x-\text{Monitoring-offset-PDCCH-slot}) \bmod (\text{Monitoring-periodicity-PDCCH-slot})=0;$$

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the 1st PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. Note that exclusion of monitoring occasions for paging which are overlapping with UL symbols determined according to tdd-UL-DL-ConfigurationCommon parameter is performed only in TDD cell as in FDD cell tdd-UL-DL-ConfigurationCommon is not signaled. tdd-UL-DL-ConfigurationCommon is signaled only in TDD cell. The PDCCH monitoring occasions for paging which are not overlapping with UL symbols (UL symbols are determined according to tdd-UL-DL-Configuration-Common parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs.

In step 2350, every DRX cycle T (as determined above), UE monitors $(i\_s+1)^{th}$ PO in determined PF in step 2320. PDCCH monitoring occasions corresponding to $(i\_s+1)^{th}$ PO is determined as follows:

When firstPDCCH-MonitoringOccasionOfPO is present (firstPDCCH-MonitoringOccasionOfPO is optionally signaled in paging configuration), the $(i\_s+1)^{th}$ PO is a set of 'S*X' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S*X' consecutive PDCCH monitoring occasions for paging starting from the $(i\_s*S*X)^{th}$ PDCCH monitoring occasion for paging.

'S' is the number of actual transmitted SSBs determined according to ssb-PositionsInBurst in SystemInformationBlock1. The parameter ssb-PositionsInBurst in SystemInformationBlock1 indicates which SSBs are transmitted by a gNB. ssb-PositionsInBurst is a bitmap. The first/leftmost bit in ssb-PositionsInBurst corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted. For example let's say that ssb-PositionsInBurst indicates (by setting the corresponding bit of bitmap to 1) that SSB Index 4, SSB Index 8, SSB Index 14 and SSB Index 16 are transmitted by the gNB. Since four SSBs are transmitted, S is equal to 4.

'X' is signalled by the gNB in paging configuration or 'X' is number of times each SSB is repeated in SSB window. 'X' can also be referred as an extension factor for extending PO or for configuring additional PDCCH monitoring occasions in a PO. 'X" can also be referred as number of PDCCH monitoring occasions per SSB in a PO. Note that PDCCH monitoring occasions for paging are determined based on paging search space configuration. Default value of X can be assumed as 1 i.e. if 'X' is not signaled, X is set to 1 for determining PDCCH monitoring occasions of a PO. In an embodiment 'X' is signaled by gNB for paging in unlicensed carrier or a cell in which DL carrier is in unlicensed frequency band.

In an alternate embodiment, if the multiple FDMed POs are supported (all POs including FDMed POs are identified by i_s) by configuring multiple paging coresets and firstPDCCH-MonitoringOccasionOfPO is not signalled, the $(i\_s+1)^{th}$ PO is a set of 'S*X' consecutive PDCCH monitoring occasions for paging starting from the $(i\_s/C)*S*X^{th}$ PDCCH monitoring occasion for paging. 'S' is the number of actual transmitted SSBs determined according to ssb-PositionsInBurst in SystemInformationBlock1. C is the number of paging coresets. In the PDCCH monitoring occasions of $(i\_s+1)^{th}$ PO, UE monitors $k^{th}$ paging coreset where k=i_s mod C.

In another embodiment, instead of X, PO duration in slots/symbols can be signalled. PO comprises of all PDCCH monitoring occasions in the PO duration. In another embodiment instead of 'X', parameter 'A' i.e. number of PDCCH monitoring occasions in a PO can be signalled. In this case in the above description S*X is replaced by 'A'. In an embodiment, instead of signaling 'X' network can signal number of PDCCH monitoring occasions in a PO wherein X=(number of PDCCH monitoring occasions in a PO)/(number of actual transmitted SSBs determined according to ssb-PositionsInBurst in SystemInformationBlock1).

Each PDCCH monitoring occasion for paging in PO is associated with one of the transmitted SSBs (or SS/PBCH blocks). Based on this association a UE can determine PDCCH monitoring occasion corresponding to one or more suitable SSBs (e.g. SSB with SS-RSRP above a threshold) and monitor only these PDCCH monitoring occasions in a PO. In the existing system $K^{th}$ PDCCH monitoring occasion for paging in PO corresponds to $K^{th}$ transmitted SSB. However this mapping rule between PDCCH monitoring occasions of a PO and transmitted SSBs works only if number of PDCCH monitoring occasions in a PO is equal to number of transmitted SSBs. As described above each PO consists of 'S*X' PDCCH monitoring occasions and for X>1 number of PDCCH monitoring occasions in a PO is larger than number of transmitted SSBs. So new mapping rule between PDCCH monitoring occasions in PO and transmitted SSBs is needed.

There are up to 64 SSBs and each SSB is uniquely identified by a SSB identifier. The parameter ssb-PositionsInBurst in SystemInformationBlock1 indicates which SSBs are transmitted by gNB. ssb-PositionsInBurst is a bitmap. The first/leftmost bit in ssb-PositionsInBurst corresponds to SS/PBCH block index 0, the second bit corresponds to SS/PBCH block index 1, and so on. Value 0 in the bitmap indicates that the corresponding SS/PBCH block is not transmitted while value 1 indicates that the corresponding SS/PBCH block is transmitted.

Figure 24:
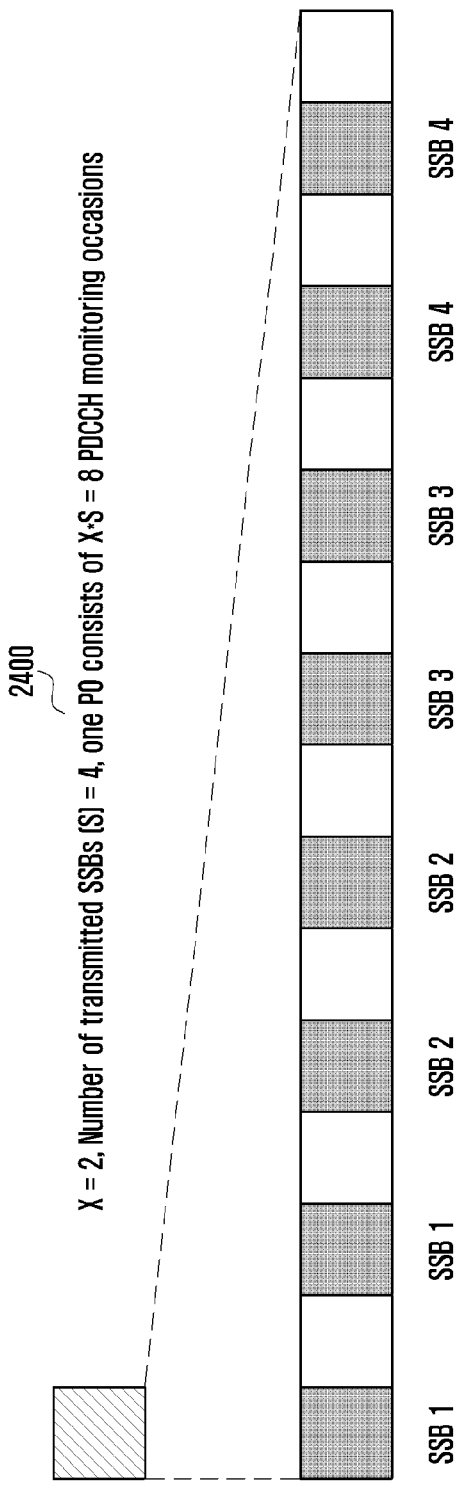
FIG. 24 illustrates an example of PDCCH monitoring occasions in a PO corresponding to transmitted SSBs according to embodiment of method 4-1.

In an embodiment, $[(K-1)*X+x]^{th}$ PDCCH monitoring occasion in PO corresponds to $K^{th}$ transmitted SSB, where x=0, 1, ..., X-1; and K=1, 2, ..., S. S is the number of actual transmitted SSBs determined according to ssb-PositionsInBurst in SIB1 and 'X' is the number of PDCCH monitoring occasions per SSB. Note that the actual transmitted SSBs are sequentially numbered from 1 to S in ascending order of their SSB Indices. For example let's say that ssb-PositionsInBurst indicates that SSB Index 4, SSB Index 8, SSB Index 14 and SSB Index 16 are transmitted by gNB. So S is 4, and K equals to 1 for SSB with SSB Index 4, K equals to 2 for SSB with SSB Index 8, K equals to 3 for SSB with SSB index 14 and K equals to 4 for SSB with SSB Index 16. FIG. 24 illustrates an example of PDCCH monitoring occasions in a PO corresponding to transmitted SSBs according to embodiment of method 4-1. Referring to FIG. 24, one or more PDCCH monitoring occasions corresponding a specific SSB 2400 are allocated in index order of the transmitted SSBs in the PO. Each transmitted SSB is mapped to X consecutive PDCCH monitoring occasions wherein the SSBs are mapped to PDCCH monitoring occasions in the PO in ascending order of their SSB indices.

Figure 25:
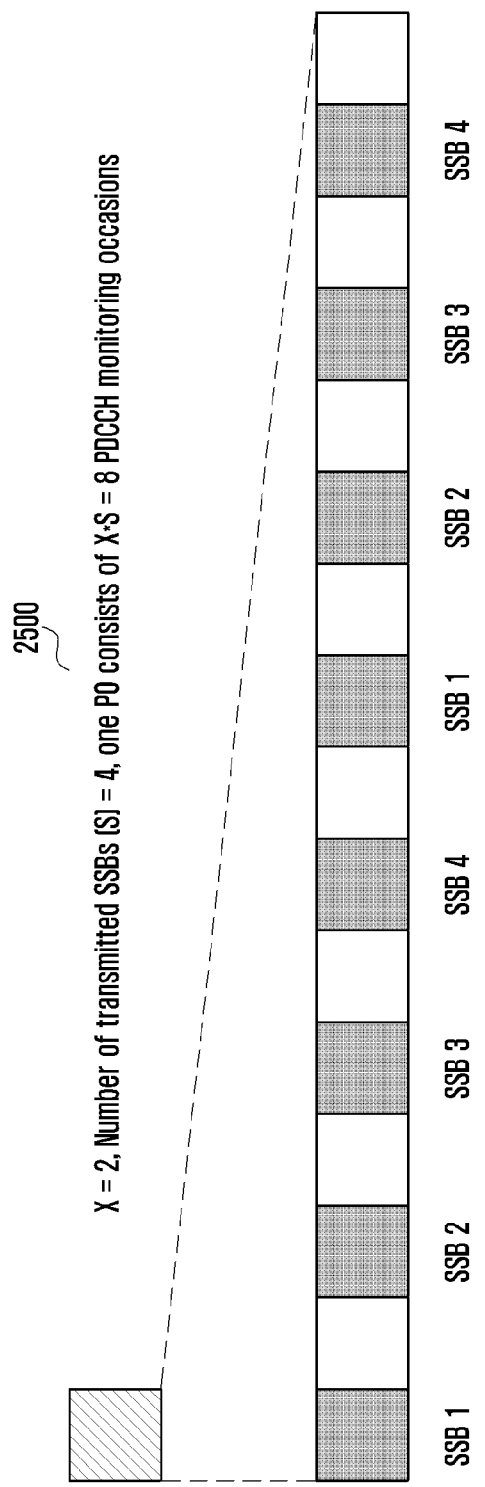
FIG. 25 illustrates another example PDCCH monitoring occasions in a PO corresponding to transmitted SSBs according to embodiment of method 4-1.

In another embodiment, $(x*S+K)^{th}$ PDCCH monitoring occasion for paging in the PO corresponds to $K^{th}$ transmitted SSB, where x=0, 1, . . . , X−1; and K=1, 2, . . . , S. S is the number of actual transmitted SSBs determined according to ssb-PositionsInBurst in SIB1 and 'X' is the number of PDCCH monitoring occasions per SSB. Note that the actual transmitted SSBs are sequentially numbered from 1 to S in ascending order of their SSB Indices. For example let's say that ssb-PositionsInBurst indicates that SSB Index 4, SSB Index 8, SSB Index 14 and SSB Index 16 are transmitted by gNB. So K equal to 1 for SSB with SSB Index 4, K equals to 2 for SSB with SSB Index 8, K equals to 3 for SSB with SSB index 14 and K equals to 4 for SSB with SSB Index 16. FIG. 25 illustrates another example PDCCH monitoring occasions in a PO corresponding to transmitted SSBs according to embodiment of method 4-1. Referring to FIG. 25, each PDCCH monitoring occasions corresponding each transmitted SSB 2500 is allocated in index order of the transmitted SSBs. A plural set of PDCCH monitoring occasions corresponding to the transmitted SSBs can be allocated in the PO. In this method PO consists of 'X' sets of 'S' consecutive PDCCH monitoring occasions where each set of 'S' consecutive PDCCH monitoring occasions is mapped to 'S' transmitted SSBs sequentially in order of increasing SSB indices.

In the existing system one PO consist of only 'S' PDCCH monitoring occasions. However in this method, PO is extended to give more opportunities ('S*X' where X>1) to transmit PDCCH addressed to P-RNTI in unlicensed carrier as channel may not be always available in unlicensed carrier. However this may increase UE power consumption. So some criteria to stop monitoring PDCCH monitoring PDCCH monitoring occasions in PO is needed.

In an embodiment, if a UE receives PDCCH addressed to P-RNTI in a PDCCH monitoring occasion of the monitored PO, wherein a paging message in DL TB scheduled by this PDCCH includes paging for itself (i.e. paging message includes UE ID), the UE may not monitor remaining PDCCH monitoring occasions of the monitored PO in that DRX cycle. In another embodiment, if a network signals SkipAdditionalPMOMonitoring in system information or dedicated RRC signaling and if a UE receives PDCCH addressed to P-RNTI in a PDCCH monitoring occasion of the monitored PO wherein paging message in DL TB scheduled by this PDCCH includes paging for itself, the UE may not monitor remaining PDCCH monitoring occasions of the monitored PO in that DRX cycle. The indication SkipAdditionalPMOMonitoring provides flexibility to network to immediately transmit paging when the channel becomes available or postpone it to subsequent PDCCH monitoring occasions of the PO.

In an embodiment, if a UE receives PDCCH addressed to P-RNTI in a PDCCH monitoring occasion of the monitored PO, wherein DL TB scheduled by this PDCCH includes paging message (may or may not include paging for itself) the UE may not monitor remaining PDCCH monitoring occasions of the monitored PO in that DRX cycle. In another embodiment, if a network signals SkipAdditionalPMOMonitoring in system information or dedicated RRC signaling and if a UE receives PDCCH addressed to P-RNTI in a PDCCH monitoring occasion of the monitored PO wherein DL TB scheduled by this PDCCH includes paging message (may or may not include paging for itself) the UE may not monitor remaining PDCCH monitoring occasions of the monitored PO in that DRX cycle.

In another embodiment, if a UE receives PDCCH addressed to P-RNTI in a PDCCH monitoring occasion of the monitored PO, the UE may not monitor remaining PDCCH monitoring occasions of the monitored PO in that DRX cycle. In another embodiment, if a network signals SkipAdditionalPMOMonitoring in system information or dedicated RRC signaling and if UE receives PDCCH addressed to P-RNTI in a PDCCH monitoring occasion of the monitored PO the UE may not monitor remaining PDCCH monitoring occasions of the monitored PO in that DRX cycle.

In another embodiment, if a UE receives PDCCH addressed to P-RNTI in a PDCCH monitoring occasion of the monitored PO wherein DL TB scheduled by this PDCCH includes paging message and there is no indication in the received paging message to monitor the other PDCCH monitoring occasions of PO, the UE may not monitor remaining PDCCH monitoring occasions of the monitored PO in that DRX cycle. In another embodiment, if a UE receives PDCCH addressed to P-RNTI in a PDCCH monitoring occasion of the monitored PO and there is no indication in the received PDCCH to monitor other PDCCH monitoring occasions of PO, the UE may not monitor remaining PDCCH monitoring occasions of the monitored PO in that DRX cycle.

In another embodiment, if a UE receives PDCCH addressed to P-RNTI in a PDCCH monitoring occasion of the monitored PO wherein DL TB scheduled by this PDCCH includes paging message and there is indication in the received paging message to monitor remaining PDCCH monitoring occasions of the PO, the UE monitors remaining PDCCH monitoring occasions of the monitored PO in that DRX cycle. In another embodiment, if a UE receives PDCCH addressed to P-RNTI in a PDCCH monitoring occasion of the monitored PO and there is indication in the received PDCCH to monitor remaining PDCCH monitoring occasions of the PO, the UE monitors remaining PDCCH monitoring occasions of the monitored PO in that DRX cycle.

It is to be noted that for paging a UE, gNB also determines the PO(s) for that UE in same manner as that UE determines based on the procedure explained above.

[Method 5]

In one embodiment of method 5 of the present disclosure, a UE determines the PO(s) in a DRX cycle as follows:

Step 1: a UE acquires the paging configuration (Default DRX Cycle Duration, PF_Offset, N, Ns) from the system information signaled by a network. In RRC IDLE and RRC INACTIVE state UE also acquires paging search space configuration from the system information signaled by network. In RRC Connected State, the paging search space configuration is signaled by the network for one or more configured BWP(s) in dedicated signaling. So, in RRC Connected state UE acquires paging search space configuration from dedicated RRC signaling.

Step 2: the UE first determines the paging frame. The PF is the radio frame with SFN which satisfies:

(SFN+PF_Offset)mod $T$=($T$ div $N$)*(UE_ID mod $N$)

Where,
T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.
N: Number of paging frames in DRX cycle. N is signaled by gNB (e.g. in system information). The values of N can be T, T/2, T/4, T/8, T/16, T/32 and so on.
UE_ID: S-TMSI mod 1024
Step 3: the UE then calculates an index i_s, where i_s is derived from the following equation:

i_s=floor(UE_ID/$N$)mod $Ns$, where

Ns: Number of POs. per PF. The parameter Ns is signaled by gNB (e.g. in system information). Note that all the POs corresponding to a PF need not be located within that PF. They may be located in one or more radio frames starting from PF.
N: Number of paging frames in DRX cycle. N is signaled by gNB (e.g. in system information).
UE_ID: S-TMSI mod 1024.
Step 4: Every DRX cycle, the UE monitors (i_s+1)$^{th}$ PO in determined PF in step 2.
PDCCH monitoring occasions corresponding to (i_s+1)$^{th}$ PO is determined as follows:
A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

($y$*(number of slots in a radio frame)+$x$−Monitoring-offset-PDCCH-slot)mod(Monitoring-periodicity-PDCCH-slot)=0;

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.
Based on paging search space configuration (comprising of parameters Monitoring-periodicity-PDCCH-slot, Monitoring-offset-PDCCH-slot, Monitoring-symbols-PDCCH-within-slot and duration), UE can know the 1$^{st}$ PDCCH monitoring occasion for paging in the determined PF and also the subsequent PDCCH monitoring occasions.
In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. Note that exclusion of monitoring occasions for paging which are overlapping with UL symbols determined according to tdd-UL-DL-ConfigurationCommon parameter is performed only in TDD cell as in FDD cell tdd-UL-DL-ConfigurationCommon is not signaled. The PDCCH monitoring occasions for paging which are not overlapping with UL symbols (UL symbols are determined according to tdd-UL-DL-ConfigurationCommon parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs as follows:
When firstPDCCH-MonitoringOccasionOfPO is present, the (i_s+1)$^{th}$ PO is a set of 'S' consecutive PDCCH monitoring occasions for paging starting from the PDCCH monitoring occasion indicated by firstPDCCH-MonitoringOccasionOfPO (i.e. the (i_s+1)$^{th}$ value of the firstPDCCH-MonitoringOccasionOfPO parameter).
Otherwise, the (i_s+1)$^{th}$ PO is a set of 'S' consecutive PDCCH monitoring occasions for paging starting from the (i_s*PDCCH monitoring occasion for paging. 'S' is the number of actual transmitted SSBs determined according to ssb-PositionsInBurst in SystemInformationBlock1. Note that PDCCH monitoring occasions for paging are determined based on paging search space configuration.
In the PDCCH monitoring occasions of (i_s+1)$^{th}$ PO, the UE monitors 'P' paging coresets (coreset indicates RBs in frequency domain and duration in symbols. The duration begins from the start of symbol indicated by PDCCH monitoring occasion). A gNB signals 'C' paging coresets (e.g. in paging configuration). In an embodiment, a UE monitors all paging coresets (i.e. P is equal to C). In another embodiment, a UE monitors 'P' Paging coresets amongst the 'C' paging coresets, starting from the i$^{th}$ coreset where i=UE_ID mod P. A UE may determine 'P' based on its capability. Value of 'P' can also be informed by the UE to a network in UE capability information message (or any other signaling message).

[Method 6]

In this embodiment of the present disclosure, paging is supported in multiple BWPs (say C BWPs) and a UE can monitor a paging message in 'P' BWPs. The list of BWPs in which paging is supported is signalled by a gNB. The paging configuration (e.g. DRX cycle duration, N, Ns, PF_Offset, search space configuration, coresets, etc.) can be signalled for each of these BWPs. Alternately the paging configuration is common for all these BWPs. In an embodiment, a UE monitors paging in all the C BWPs (i.e. P is equal to C). In another embodiment, a UE monitors 'P' BWPs amongst the 'C' BWPs, starting from the i$^{th}$ BWP where i=UE_ID mod P. A UE may also determine 'P' based on its capability. Value of 'P' can also be informed by the UE to a network in UE capability information message (or any other signaling message).
In each of monitored BWP, a UE determines the PF/PO using one of the methods (1 to 5) explained earlier or using the method described in 3GPP specification (TS 38.304).

Embodiment 2-2: PF/PO Determination when Multiple FDMed POs are Supported

In the current system in a DRX cycle multiple time division multiplexed (TDMed) POs are supported. If POs are FDMed as well as TDMed then method to determine PO for UE is needed.

Embodiment 2-2-1

Search space is common for all POs. Multiple Coresets are configured.

In one embodiment of method 5 of the present disclosure, a UE determine the PO(s) in a DRX cycle as follows:

Step 1: a UE acquires the paging configuration (Default DRX Cycle Duration, PF_Offset, N, Ns), list of paging coresets from the system information signaled by a network. In RRC IDLE and RRC INACTIVE state UE also acquires paging search space configuration from the system information signaled by network. In RRC Connected State, the paging search space configuration is signaled by the network for one or more configured BWP(s) in dedicated signaling. So, in RRC Connected state UE acquires paging search space configuration from dedicated RRC signaling.

Step 2: the UE first determines the paging frame. The PF is the radio frame with SFN which satisfies:

(SFN+PF_Offset)mod $T$=($T$ div $N$)*(UE_ID mod $N$)

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

Step 3: the UE then calculates an index i_s, where i_s is derived from the following equation:

$i\_s$=floor(UE_ID/$N$)mod $Ns$, where

Ns: Number of POs. per PF. The parameter Ns is signaled by gNB (e.g. in system information). Note that all the POs corresponding to a PF need not be located within that PF. They may be located in one or more radio frames starting from PF.

N: Number of paging frames in DRX cycle. N is signaled by gNB (e.g. in system information).

UE_ID: S-TMSI mod 1024.

Step 4: Every DRX cycle, UE monitors $(i\_s+1)^{th}$ PO in determined PF in step 2. PDCCH monitoring occasions corresponding to $(i\_s+1)^{th}$ PO is determined as follows:

A gNB signals paging search space configuration (comprising of parameters Monitoring-periodicity-PDCCH-slot, Monitoring-offset-PDCCH-slot, Monitoring-symbols-PDCCH-within-slot and duration). A UE determines a PDCCH monitoring occasion from the PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot) within a slot. PDCCH monitoring occasions are there in slots 'x' to x+duration where the slot with number 'x' in a radio frame with number 'y' satisfies the equation:

($y$*(number of slots in a radio frame)+$x$−Monitoring-offset-PDCCH-slot)mod(Monitoring-periodicity-PDCCH-slot)=0;

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space.

Based on paging search space configuration (comprising of parameters Monitoring-periodicity-PDCCH-slot, Monitoring-offset-PDCCH-slot, Monitoring-symbols-PDCCH-within-slot and duration), UE can know the 1st PDCCH monitoring occasion for paging in the determined PF and also the subsequent PDCCH monitoring occasions.

In a TDD cell, a UE receive TDD configuration using at least one of tdd-UL-DL-ConfigurationCommon IE, tdd-UL-DL-ConfigurationDedicated IE and group common PDCCH. tdd-UL-DL-ConfigurationCommon IE is signaled in system information and indicated DL symbols, UL symbols and flexible symbols. tdd-UL-DL-ConfigurationDedicated IE is signaled in dedicated RRC signaling and indicates which of the flexible symbols are UL symbols. Group common PDCCH provides TDD configuration for one or more slots.

Amongst the PDCCH monitoring occasions signaled by pagingSearchSpace, the UE excludes those PDCCH monitoring occasion(s) which are overlapping with UL symbol(s). The UL symbol(s) are determined according to tdd-UL-DL-ConfigurationCommon. Note that exclusion of monitoring occasions for paging which are overlapping with UL symbols determined according to tdd-UL-DL-ConfigurationCommon parameter is performed only in TDD cell as in FDD cell tdd-UL-DL-ConfigurationCommon is not signaled. The PDCCH monitoring occasions for paging which are not overlapping with UL symbols (UL symbols are determined according to tdd-UL-DL-ConfigurationCommon parameter signalled in SIB 1) are sequentially numbered from zero starting from the Pt PDCCH monitoring occasion for paging in the PF. In other words the valid PDCCH monitoring occasions from the start of PF are sequentially numbered from zero. These numbered PDCCH monitoring occasions are then mapped to POs as follows:

When firstPDCCH-MonitoringOccasionOfPO is present, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the $(i\_s/C)*S^{th}$ PDCCH monitoring occasion for paging. 'S' is the number of actual transmitted SSBs determined according to ssb-PositionsInBurst in SystemInformationBlock1. C is the number of paging coresets. Note that PDCCH monitoring occasions for paging are determined based on paging search space configuration.

In an embodiment of the present disclosure, parameter 'S' can be equal to [number of actual transmitted SSBs determined according to ssb-PositionsInBurst in SystemInformationBlock1]*L where L is signaled by a gNB or L is the number of times each SSB is repeated in SSB window.

Figure 26:
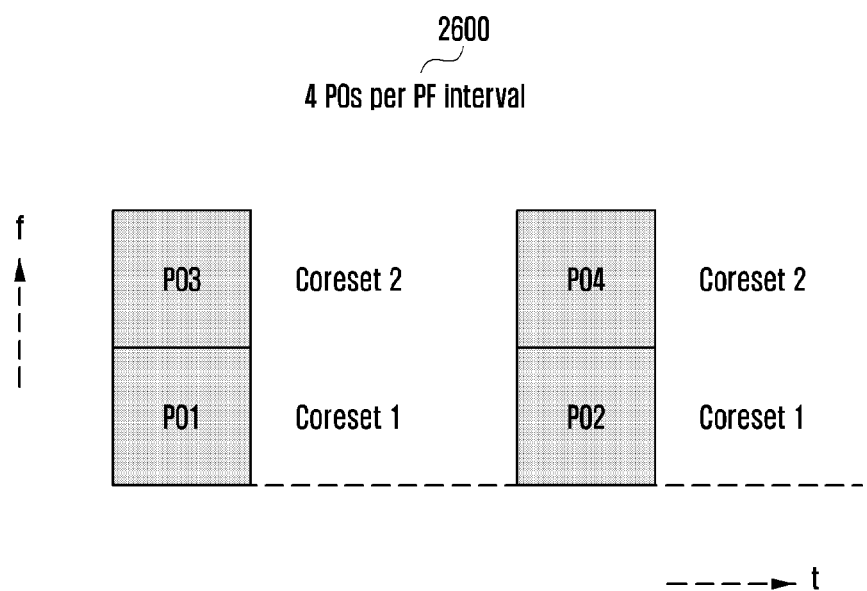
FIG. 26 illustrates an example of the mapping between POs and coresets for the case of Ns=4 and C=2 according to an embodiment 2-2-1.

In the PDCCH monitoring occasions of $(i\_s+1)^{th}$ PO, UE monitors $k^{th}$ paging coreset where k=i_s mod C. FIG. 26 illustrates an example of the mapping between POs and coresets for the case of Ns=4 and C=2 according to an embodiment 2-2-1. Referring to FIG. 26, 4 POs 2600 are allocated in a PF interval, and POs corresponding to coresets are FDMed.

Embodiment 2-2-2: Multiple Search Spaces are Configured

In one embodiment of method 5 of the present disclosure, a UE determine the PO(s) in a DRX cycle as follows:

Step 1: a UE acquires the paging configuration (Default DRX Cycle Duration, PF_Offset, N, Ns), list of paging search space configuration from the system information signaled by a network. In RRC Connected State, the paging search space configuration is signaled by the network for one or more configured BWP(s) in dedicated signaling.

Step 2: the UE first determines the Paging frame. The PF is the radio frame with SFN which satisfies:

$$(SFN+PF\_Offset) \bmod T = (T \text{ div } N)*(UE\_ID \bmod N)$$

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

Step 3: the UE then calculates an index i_s, where i_s is derived from the following equation:

$$i\_s = \text{floor}(UE\_ID/N) \bmod Ns, \text{ where}$$

Ns: Number of POs. per PF. The parameter Ns is signaled by gNB (e.g. in system information). Note that all the POs corresponding to a PF need not be located within that PF. They may be located in one or more radio frames starting from PF.

N: Number of paging frames in DRX cycle. N is signaled by gNB (e.g. in system information).

UE_ID: S-TMSI mod 1024.

Step 4: Every DRX cycle, the UE monitors $(i\_s+1)^{th}$ PO in determined PF in step 2.

PDCCH monitoring occasions corresponding to $(i\_s+1)^{th}$ PO is determined as follows:

UE determines PDCCH monitoring occasions based on $k^{th}$ paging search space where k=i_s mod C, C is number of paging search spaces. The PDCCH monitoring occasions for paging which are not overlapping with UL symbols (UL symbols are determined according to tdd-UL-DL-ConfigurationCommon parameter signalled in SIB 1) are sequentially numbered from zero starting from the $1^{st}$ PDCCH monitoring occasion for paging in the PF.

When firstPDCCH-MonitoringOccasionOfPO is present, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the $(i\_s/C)*S^{th}$ PDCCH monitoring occasion for paging. 'S' is the number of actual transmitted SSBs determined according to ssb-PositionsInBurst in SystemInformationBlock1. C is the number of paging search spaces.

In an embodiment of the present disclosure, parameter 'S' can be equal to [number of actual transmitted SSBs determined according to ssb-PositionsInBurst in SystemInformationBlock1]*L where L is signaled by gNB or L is the number of times each SSB is repeated in SSB window.

In the PDCCH monitoring occasions of $(i\_s+1)^{th}$ PO, the UE monitors paging coreset corresponding to determined paging search space.

Embodiment 2-3: PO Determination for Default Association

For default association (i.e. when parameter paging-SearchSpace signaled by a gNB is set to 0), PDCCH monitoring occasions for paging are same as PDCCH monitoring occasions for RMSI. According to the current design, for default association, Ns is either 1 or 2. Ns is signalled by gNB. For Ns=1, there is only one PO which starts in the PF. For Ns=2, PO is either in the first half frame (i_s=0) or the second half frame (i_s=1) of the PF.

For RMSI pattern ⅔ (i.e. PDCCH monitoring occasions for RMSI occurs at same time instances as SSBs) there can be up to two POs in a PF if SS burst set period is 5 ms. If Ns is set to one, UE shall monitor PO in first half frame or second half frame. Note that both starts in PF. If UE monitors in first half frame but network transmits in second half frame, UE will miss paging. If UE monitors in second half frame but network transmits in first half frame, UE will miss paging.

Embodiment 2-3-1

To overcome the issue, it is proposed that for default association (i.e. when parameter paging-SearchSpace signaled by gNB is set to 0), if Ns=1, there is only one PO which starts from the first PDCCH monitoring occasion for paging in the PF. For default association, PDCCH monitoring occasions for paging are same as the PDCCH monitoring occasions for RMSI.

PF/PO determination for default association (i.e. when parameter paging-SearchSpace signaled by gNB is set to 0) according to embodiment 2-3-1 is as follows:

Step 1: a UE acquires the paging configuration (Default DRX Cycle Duration, PF_Offset, N, Ns), paging search space configuration from the system information signaled by a network. In RRC Connected State, the paging search space configuration is signaled by the network for one or more configured BWP(s) in dedicated signaling.

Step 2: the UE first determines the paging frame. The PF is the radio frame with SFN which satisfies:

$$(SFN+PF\_Offset) \bmod T = (T \text{ div } N)*(UE\_ID \bmod N)$$

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

Step 3: the UE then calculates an index i_s, where i_s is derived from the following equation:

$$i\_s = \text{floor}(UE\_ID/N) \bmod Ns, \text{ where}$$

Ns: Number of POs. per PF. The parameter Ns is signaled by gNB (e.g. in system information). Note that all the POs corresponding to a PF need not be located within that PF. They may be located in one or more radio frames starting from PF.

N: Number of paging frames in DRX cycle. N is signaled by gNB (e.g. in system information).

UE_ID: S-TMSI mod 1024.

For Ns=2 and i_s=0, UE monitors PO in Pt half frame of PF. For Ns=2 and i_s=1, UE monitors PO in $2^{nd}$ half frame of PF. For Ns=1, there is only one PO which starts from the first PDCCH monitoring occasion for paging in the PF. For default association, PDCCH monitoring occasions for paging are same as the PDCCH monitoring occasions for RMSI.

Embodiment 2-3-2

In an alternate embodiment, if Ns=1 and RMSI pattern is ⅔ and SS burst set period is 5 ms, s gNB can indicate in paging configuration whether the PO is in 1$^{st}$ first half frame or second half frame of PF. A UE will monitor PO in 1$^{st}$ half frame or 2nd half frame of PF accordingly.

PF/PO determination for default association (i.e. when parameter paging-SearchSpace signaled by gNB is set to 0) according to embodiment 2-3-2 is as follows:

Step 1: UE acquires the paging configuration (Default DRX Cycle Duration, PF_Offset, N, Ns), paging search space configuration from the system information signaled by network. In RRC Connected State, the paging search space configuration is signaled by network for one or more configured BWP(s) in dedicated signaling.

Step 2: the UE first determines the paging frame. The PF is the radio frame with SFN which satisfies:

(SFN+PF_Offset)mod $T$=($T$ div $N$)*(UE_ID mod $N$)

Where,

T: DRX cycle of the UE. T is determined by the shortest of the UE specific DRX value, if allocated by upper layers (e.g. NAS), and a default DRX value signaled in system information. If UE specific DRX is not configured by upper layers, the default value is applied.

N: Number of paging frames in DRX cycle. N is signaled by gNB (e.g. in system information). The values of N can be T, T/2, T/4, T/8, T/16, T/32 and so on.

UE_ID: S-TMSI mod 1024

Step 3: the UE then calculates an index i_s, where i_s is derived from the following equation:

$i\_s$=floor(UE_ID/$N$)mod $Ns$, where

Ns: Number of POs. per PF. The parameter Ns is signaled by gNB (e.g. in system information).

N: Number of paging frames in DRX cycle. N is signaled by gNB (e.g. in system information).

UE_ID: S-TMSI mod 1024.

For Ns=2 and i_s=0, the UE monitors PO in 1$^{st}$ half frame of PF. For Ns=2 and i_s=1, the UE monitors PO in 2$^{nd}$ half frame of PF. If Ns=1 and RMSI pattern is ⅔ and SS burst set period is 5 ms, the gNB indicates in paging configuration whether the PO is in 1$^{st}$ first half frame or second half frame of PF. The UE will monitor PO in 1$^{st}$ half frame or 2$^{nd}$ half frame of PF accordingly. If the gNB does not indicate whether PO is in 1$^{st}$ half frame or 2$^{nd}$ half frame, UE will monitor a PO which starts (i.e. from the 1$^{st}$ PDCCH monitoring occasion) in PF.

For default association (i.e., paging search space is set to zero)

If RMSI pattern is ⅔:
  If SS burst set period is 5 ms:
    If a gNB sets Ns to 1, it indicates PO location in PF (1$^{st}$ half frame or 2$^{nd}$ Half frame)
    Else if the gNB sets Ns to 2, it does not indicate PO location PF
  Else
    The gNB sets Ns to 1
    It does not indicate PO location in PF
Else if RMSI pattern is 1
  The gNB sets Ns to 1
  It does not indicate PO location in PF If a paging search space is set to zero and if RMSI pattern is ⅔ and SS burst set period is 5 ms and Ns equals to one, a UE monitors PO in first half frame or second half frame as indicated by a gNB in paging configuration.

Embodiment 2-4: SI Message Reception

In fifth generation (also referred as NR or New Radio) wireless communication system, system information is divided into minimum system information (SI) (comprising of MIB and SIB1) and other SI (SIB 2, SIB 3 and so on). SIBs other than SIB1 are carried in SystemInformation (SI) messages, which are transmitted on the DL-SCH. Only SIBs having the same periodicity can be mapped to the same SI message. Each SI message is transmitted within periodically occurring time domain windows (referred to as SI-windows with same length for all SI messages). Each SI message is associated with a SI-window and the SI-windows of different SI messages do not overlap. That is, within one SI-window only the corresponding SI message is transmitted. The scheduling information in SIB 1 includes mapping between SIBs and SI messages, periodicity of each SI message and SI window length.

In the SI window of an SI message, a UE monitor the PDCCH monitor occasions configured (by parameter other system information (OSI) search space configuration) for SI message. The K$^{th}$ PDCCH monitoring occasion in SI window corresponds to K$^{th}$ transmitted SSB. This enables the UE to monitor only the PDCCH monitoring occasion corresponding to suitable (i.e. good SSB or SSB with RSRP above a specified threshold) SSB. In the frequency domain, the bandwidth (or coreset) for SI message reception is the initial BWP (signaled in SIB 1 or MIB).

Figure 27:
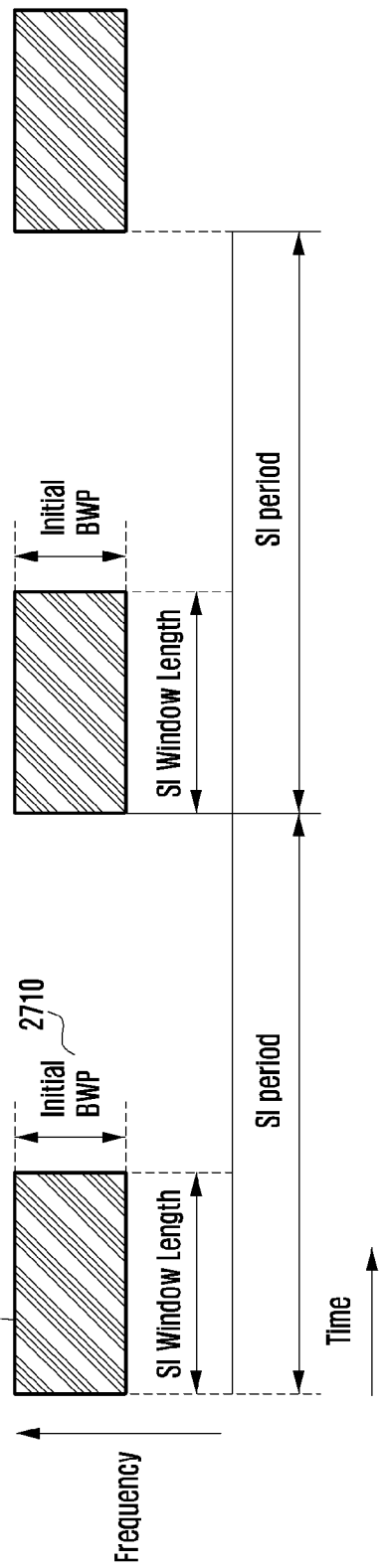
FIG. 27 illustrates an example of the initial BWP for SI reception according to an embodiment of the present disclosure.

FIG. 27 illustrates an example of the initial BWP for SI reception according to an embodiment of the present disclosure. Referring to FIG. 27, reference numeral 2700 indicates SI window that the UE monitors and 2710 indicates the initial BWP.

In unlicensed band, a gNB can transmit SI message only if channel is free (based on listen-before-talk (LBT)). This may lead to delay in transmitting the SI message and hence may delay the SI message acquisition by a UE. To reduce delay, additional opportunities for SI message transmission/reception are needed.

Embodiment 2-4-1

A gNB signals a list of 'N' Coresets for SI message reception. The gNB can signal this in SIB1 or MIB or in RRC message.

The gNB also signals SI periodicity, SI window length, search space configuration. The search space configuration can be common for all coresets. This means that only one search space configuration is signaled by gNB for SI messages (or OSI). The search space configuration can be dedicated for each coreset. This means that 'N' search space configurations are signaled by gNB for SI messages (or OSI)

The gNB can perform LBT on multiple sub-bands (corresponding to different coresets). The gNB broadcasts SI message in coreset where channel is available. A UE monitors for SI messages in one or more coresets depending on UE capability.

Figure 28:
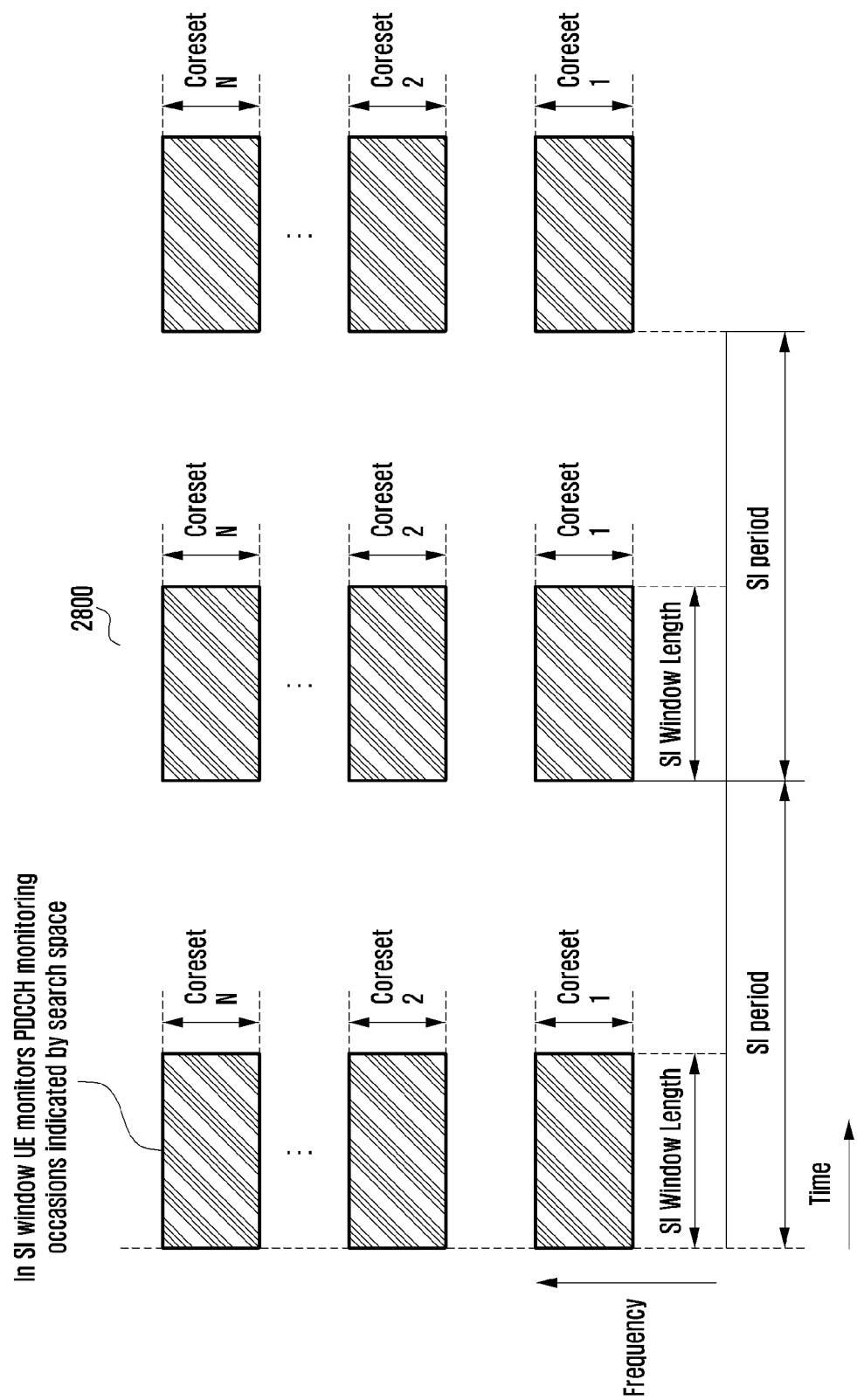
FIG. 28 illustrates an example of SI windows for SI message considering multiple coresets according to an embodiment of the present disclosure.
Figure 29:
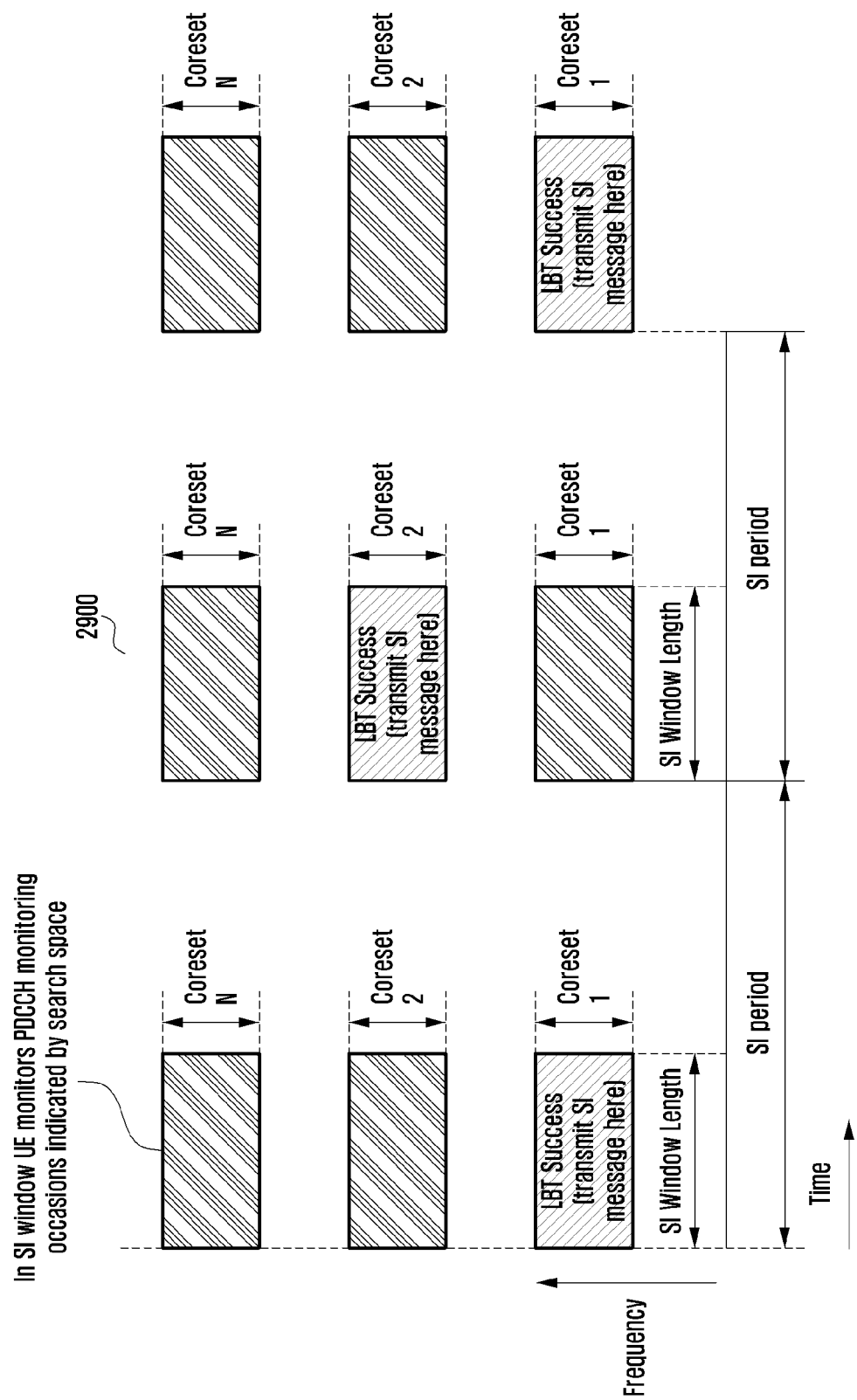
FIG. 29 illustrates an example of SI windows in which a gNB transmits SI message.

FIG. 28 illustrates an example of SI windows for SI message considering multiple coresets according to an embodiment of the present disclosure. Referring to FIG. 28, SI windows corresponding to plural coresets 2800 can be FDMed. FIG. 29 illustrates an example of SI windows in which a gNB transmits SI message. Referring to FIG. 29, in a SI period, in SI window occasion, the gNB will transmit SI message in coreset where the channel is free as reference numeral 2900. In different SI periods, the channel may be free in different coresets and gNB transmits SI message accordingly.

Embodiment 3

In the $5^{th}$ generation (also referred as NR or New Radio) wireless communication system the paging is transmitted to page UE which are attached to the wireless communication network but are in idle/inactive mode. In the idle/inactive mode UE wake ups at regular intervals (i.e. every paging DRX cycle) for short periods to receive paging, to receive SI update notification and to receive emergency notifications. Paging message is transmitted using physical downlink shared channel (PDSCH). Physical downlink common control channel (PDCCH) is addressed to P-RNTI if there is a paging message in PDSCH. P-RNTI is common for all UEs. UE identity (i.e. S-TMSI for idle UE or I-RNTI for inactive UE) is included in paging message to indicate paging for a specific UE. A paging message may include multiple UE identities to page multiple UEs. The paging message is broadcasted (i.e. PDCCH is masked with P-RNTI) over data channel (i.e. PDSCH). SI update and emergency notifications are included in DCI and PDCCH carrying this DCI is addressed to P-RNTI. In the idle/inactive mode, a UE monitors one paging occasion (PO) every DRX cycle. In RRC connected state, a UE monitors one or more POs to receive SI update notification and to receive emergency notifications. UE can monitor any PO in paging DRX cycle and monitors at least one PO in SI modification period.

A PO is a set of 'S' PDCCH monitoring occasions for paging, where 'S' is the number of transmitted SSBs (i.e. the Synchronization Signal and PBCH block (SSB) consists of primary and secondary synchronization signals (PSS, SSS) and PBCH) in cell. A UE first determines the paging frame (PF) and then determines the PO with respect to the determined PF. One PF is a radio frame (10 ms). The PF for a UE is the radio frame with system frame number 'SFN' which satisfies the equation (SFN+PF_offset) mod T=(T div N)* (UE_ID mod N); where PF_offset, T and N is signaled by gNB in system information.

A UE monitors $(i\_s+1)^{th}$ PO, where i_s=floor(UE_ID/N) mod Ns; where N and Ns is signaled by gNB in system information. The PDCCH monitoring occasions for paging are determined based on paging search space configuration (paging-SearchSpace) signaled by a gNB. The PDCCH monitoring occasions for paging which are not overlapping with UL symbols are sequentially numbered from zero starting from the $1^{st}$ PDCCH monitoring occasion for paging in the PF. The gNB may signal parameter firstPDCCH-MonitoringOccasionOfPO for each PO corresponding to a PF. When firstPDCCH-MonitoringOccasionOfPO is signalled, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the $(i\_s*S)^{th}$ PDCCH monitoring occasion for paging. 'S' is the number of actual transmitted SSBs determined according to parameter ssb-PositionsInBurst signalled in SystemInformationBlock1 received from a gNB.

In NR, the following parameters in paging-SearchSpace configures the PDCCH monitoring occasions for paging: Periodicity (p); Offset (o); Duration (d): Number of consecutive slots having PDCCH monitoring occasions every period given by periodicity; monitoringSymbolsWithinSlot (1 bitmap of size 14, one bit corresponding to an OFDM symbol); CORESET-time-duration (c): Number of consecutive OFDM symbols in a PDCCH monitoring occasion.

Figure 30:
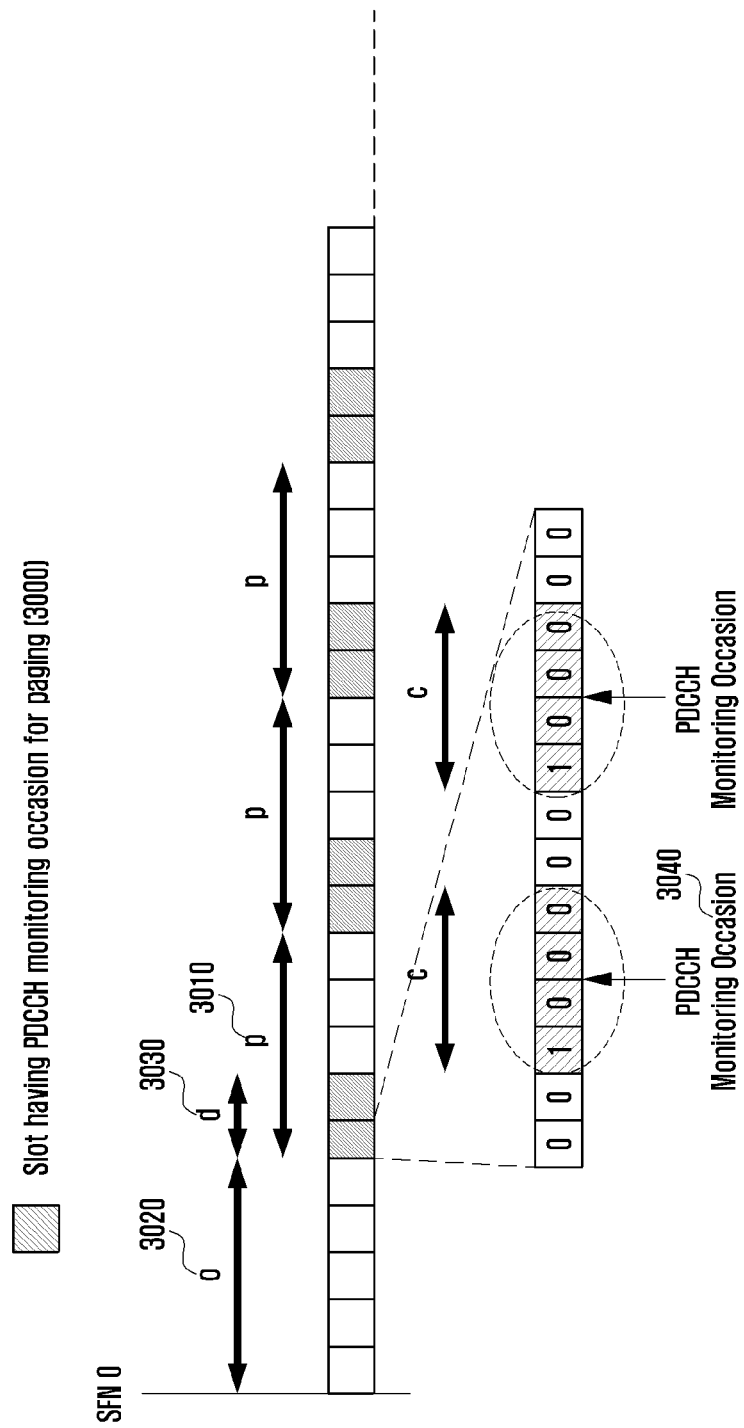
FIG. 30 illustrates an example of PDCCH monitoring occasions for paging configured by paging-SearchSpace.

FIG. 30 illustrates an example of PDCCH monitoring occasions for paging configured by paging-SearchSpace. Referring to FIG. 30, reference numeral 3000 indicates slot having PDCCH monitoring occasion for paging, periodicity (p) 3010 is 5 slots; offset (o) 3020 is 5 slots; duration (d) 3030 is 2 slots; monitoringSymbolsWithinSlot is 00100000100000 and CORESET-time-duration is 4 OFDM symbols.

In a TDD cell, the cell specific TDD configuration (indicating DL slots/symbols, UL slots/symbols) is signalled by parameter tdd-UL-DL-ConfigurationCommon in SystemInformationBlock1. tdd-UL-DL-ConfigurationCommon includes TDD or DL-UL pattern duration/period, $d_{slots}$, $d_{symbols}$, $u_{slots}$, $u_{symbols}$. '$d_{slots}$' indicates the number of consecutive full DL slots at the beginning of each DL-UL pattern. The first '$d_{slots}$' slots in TDD pattern duration are DL slots. All OFDM symbols in DL slots are DL symbols. '$u_{slots}$' indicates the number of consecutive full UL slots at the end of each DL-UL pattern The last '$u_{slots}$' slots in pattern are UL slots. All OFDM symbols in UL slots are UL symbols. '$d_{symbols}$' indicates the number of consecutive DL symbols in the beginning of the slot following the last full DL slot (as derived from '$d_{slots}$'). The value 0 indicates that there is no partial-downlink slot. The first '$d_{symbols}$' OFDM symbols in '$d_{slots}+1$'$^{th}$ slot are DL symbols. '$u_{symbols}$' indicates the number of consecutive UL symbols in the end of the slot preceding the first full UL slot (as derived from $u_{slots}$). The value 0 indicates that there is no partial-uplink slot. The last '$u_{symbols}$' OFDM symbols in '$u_{slots}+1$'th slot from end of TDD pattern duration are UL symbols. The remaining symbols in TDD pattern duration are flexible symbols. This pattern is repeated starting from SFN 0. The Flexible symbols can be configured as DL or UL symbols by tdd-UL-DL-ConfigurationDedicated. The tdd-UL-DL-ConfigurationDedicated is signalled to UE in dedicated RRC signaling.

Figure 31:
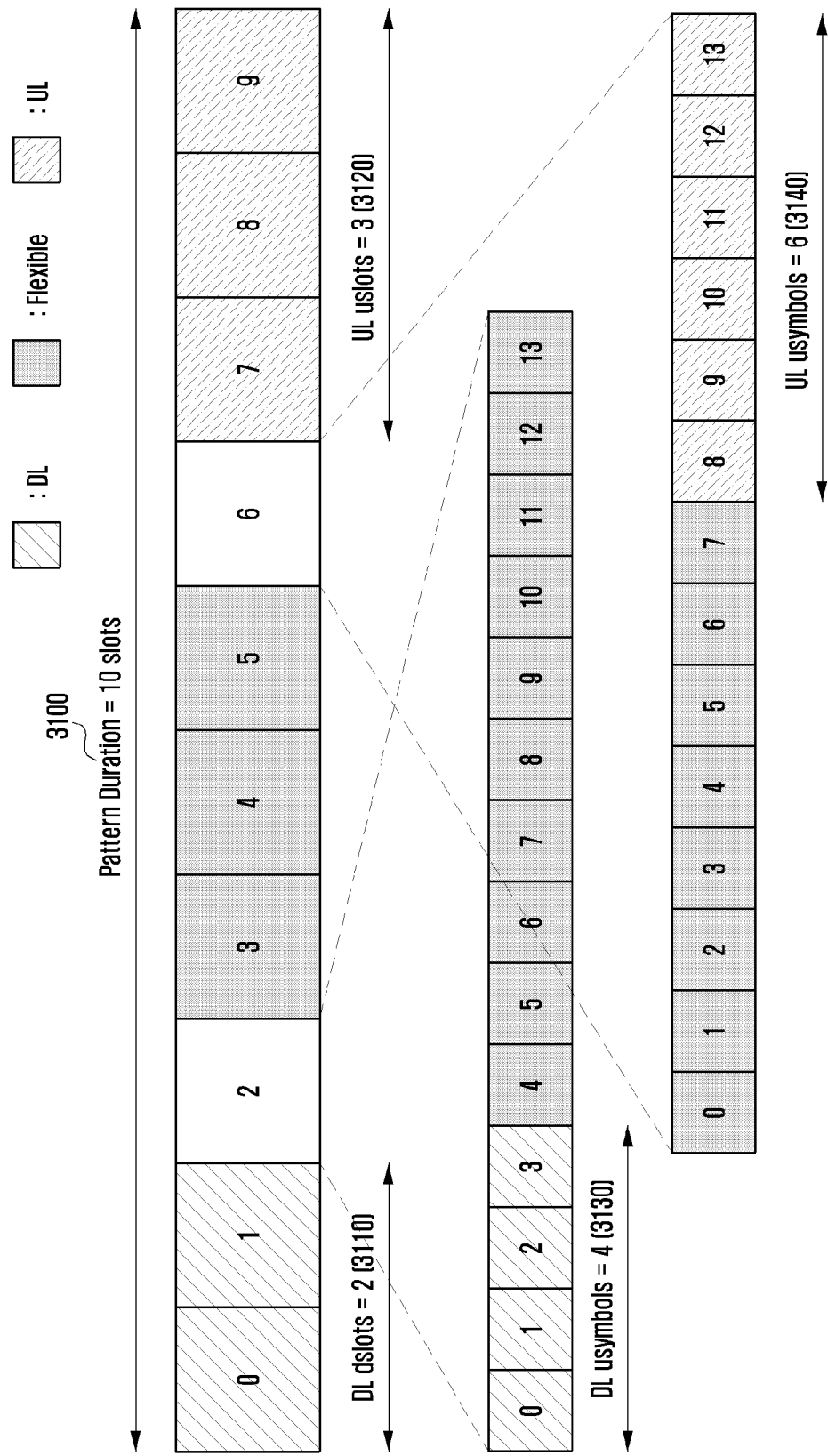
FIG. 31 illustrates an example of TDD configuration by tdd-UL-DL-Configuration Common.

FIG. 31 illustrates an example of TDD configuration by tdd-UL-DL-ConfigurationCommon. Referring to FIG. 31, TDD pattern duration is 3100 10 slots, $d_{slots}$ 3110 is 2 slots, $d_{symbols}$ 3130 is 4 OFDM symbols, $u_{slots}$ 3120 is 3 slots, $u_{symbols}$ 3140 is 6 OFDM symbols.

In addition to tdd-UL-DL-ConfigurationDedicated and tdd-UL-DL-ConfigurationCommon, Group common PDCCH can also indicate TDD configuration to a UE for one or more slots. In a TDD cell a UE can receive information about the UL symbols using one or more of tdd-UL-DL-ConfigurationDedicated, tdd-UL-DL-ConfigurationCommon and group common PDCCH.

In TDD cell, one or more PDCCH monitoring occasions signaled by paging-SearchSpace may overlap with UL symbols. In the current design, PDCCH monitoring occasions signaled by paging-SearchSpace which are not overlapping with UL symbols are considered as valid for paging. From the start of PF, these valid PDCCH monitoring occasions for paging are sequentially numbered starting from zero.

An Idle/Inactive UE determines UL symbols based on tdd-UL-DL-ConfigurationCommon signalled in SystemInformationBlock1. An RRC Connected UE determines UL symbols based on tdd-UL-DL-ConfigurationCommon, tdd- UL-DL-ConfigurationDedicated and TDD configuration received in group common PDCCH. As a result, there will be mismatch between PO determined by Idle/inactive UEs and Connected UEs.

Figure 32A:
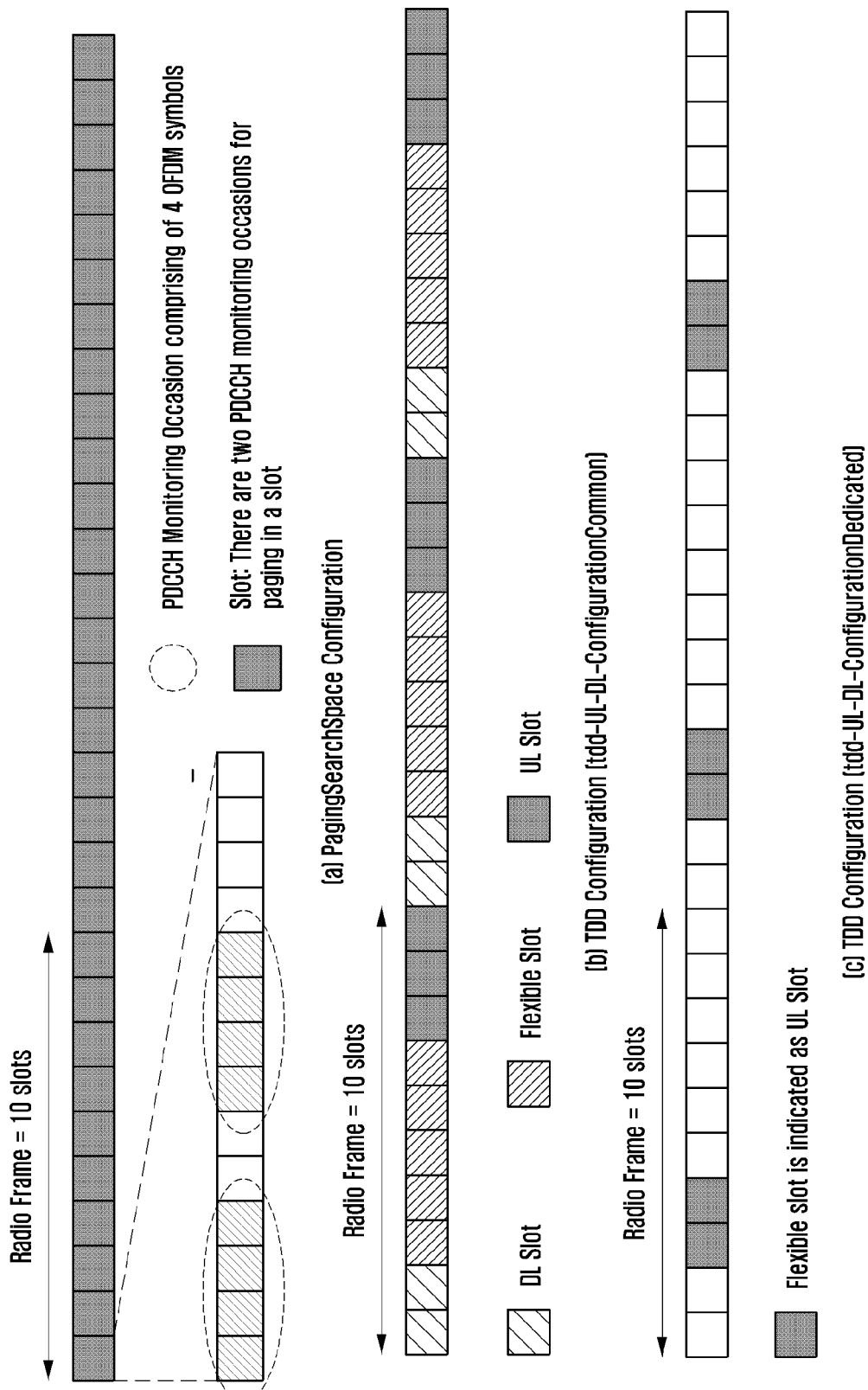
FIG. 32A illustrates an example of PDCCH monitoring occasions for paging and TDD configurations.

FIG. 32A illustrates an example of PDCCH monitoring occasions for paging and TDD configurations. Referring to FIG. 32A, PagingSeachSpace is configured every slot and 4 symbols from $1^{st}$ symbol and $7^{th}$ symbol are PDCCH monitoring occasions in a slot. TDD configuration based on tdd-UL-DL-ConfigurationCommon is illustrated and $3^{rd}$, $4^{th}$, $5^{th}$, $6^{th}$ and $7^{th}$ slot of radio frame are indicated as flexible slots. The $3^{rd}$ and $4^{th}$ slots are indicated as UL slots by tdd-DL-UL-ConfigurationDedicated.

Figure 32B:
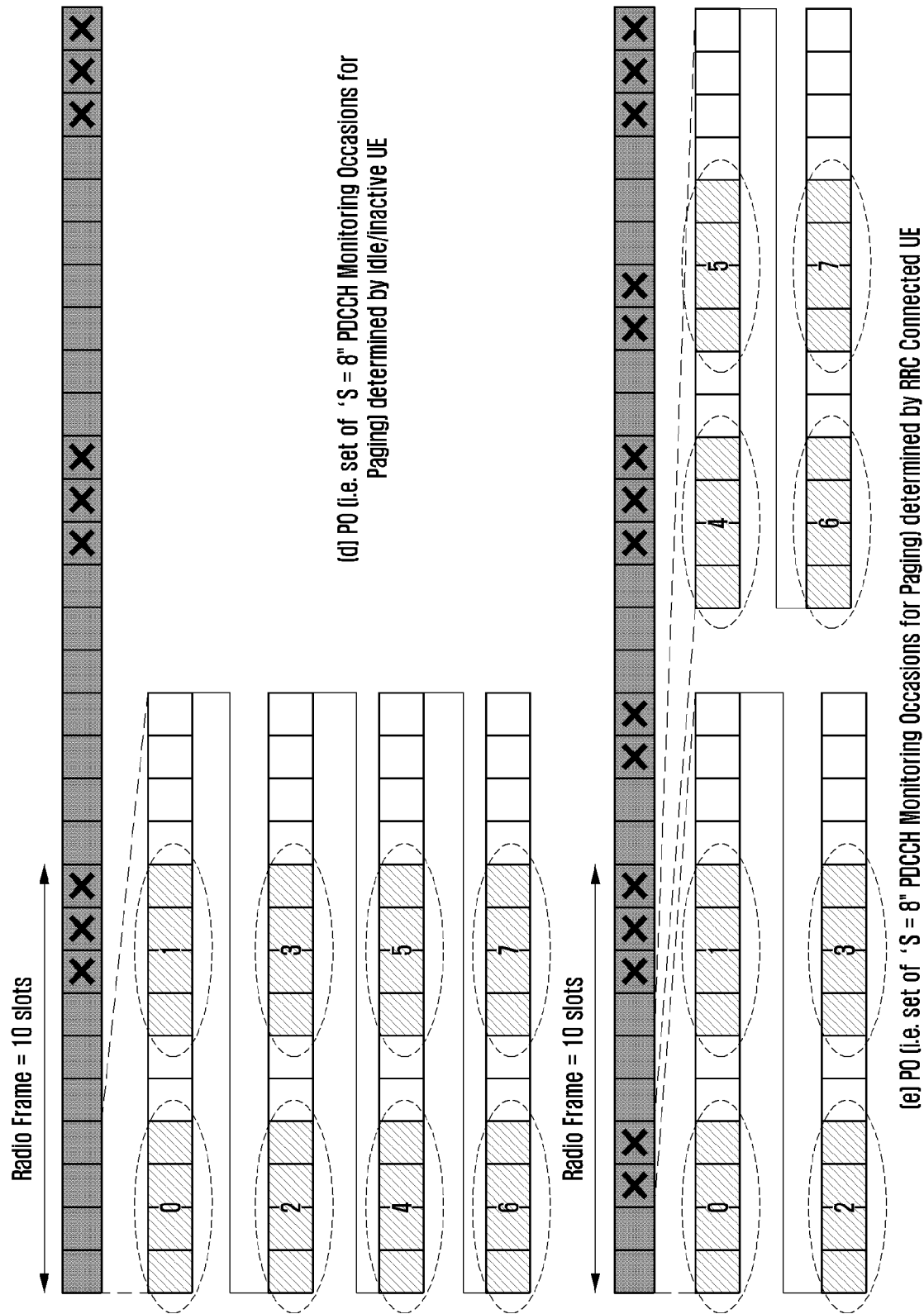
FIG. 32B illustrates an example of POs according to TDD configurations in FIG. 32A.

FIG. 32B illustrates an example of POs according to TDD configurations in FIG. 32A. Referring to 32b, for S=8, $1^{st}$ PO determined by idle/inactive UE consists of PDCCH monitoring occasions in slot 0, 1, 2 and 3. These UEs does not consider PDCCH monitoring occasions in slots 8 to 10 as valid as these are UL slots. $1^{st}$ PO determined by connected UE consists of PDCCH monitoring occasions in slot 0, 1, 4 and 5. These UEs does not consider PDCCH monitoring occasions in slots 8 to 10 and slots 3 and 4 as valid as these are UL slots.

Embodiment 3-1: Valid PDCCH Monitoring Occasions for Paging

[Method 1]

Figure 33:
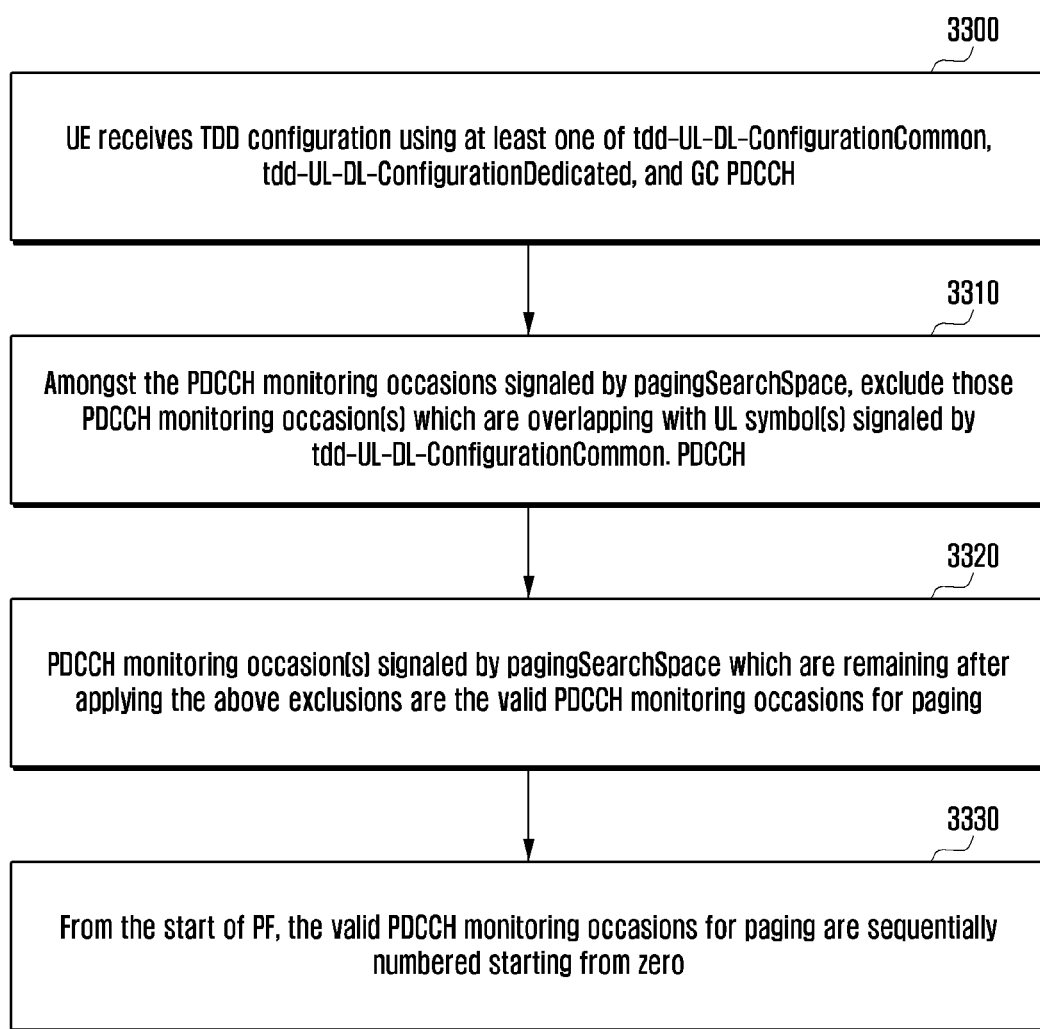
FIG. 33 illustrates a method of determining valid PDCCH monitoring occasions for paging according to an embodiment of method 1.

FIG. 33 illustrates a method of determining valid PDCCH monitoring occasions for paging according to an embodiment of method 1.

A UE receives TDD configuration using at least one of tdd-UL-DL-ConfigurationCommon, tdd-UL-DL-ConfigurationDedicated and group common (GC) PDCCH in step 3300.

Amongst the PDCCH monitoring occasion(s) signaled by pagingSearchSpace, the UE exclude those PDCCH monitoring occasion(s) which are overlapping with UL symbol(s) determined according to tdd-UL-DL-ConfigurationCommon in step 3310.

In step 3320, the UE then determines that PDCCH monitoring occasion(s) signaled by pagingSearchSpace which are remaining after applying the above exclusion are the valid PDCCH monitoring occasions for paging.

In step 3330, From the start of PF, the valid PDCCH monitoring occasions for paging are sequentially numbered starting from zero and mapped to 'Ns' PO(s) corresponding to PF.

if firstPDCCH-MonitoringOccasionOfPO is configured, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB.

The UE operation to determine PO is as follows:

UE receives the tdd-UL-DL-ConfigurationCommon from gNB. tdd-UL-DL-ConfigurationCommon is received in system information (e.g. SystemInformationBlock1).

The UE receives the paging channel configuration (i.e. Default DRX Cycle Duration, N, Ns, PF_offset) and paging search space configuration from a gNB wherein the paging search space id is not set to zero. The paging channel configuration is received in system information (e.g. SystemInformationBlock1) by the UE. The paging search space configuration is received in system information (e.g. SystemInformationBlock1) by an idle/inactive UE. The paging search space configuration is received in dedicated RRC signaling by an RRC connected UE. In dedicated RRC signaling paging search space configuration is signaled by the gNB in BWP configuration of each BWP in which paging can be received.

UE also acquires parameter ssb-PositionsInBurst from system information i.e. SystemInformationBlock1. It can also be received in dedicated RRC signaling in RRC Connected state.

The UE determines the PF. The PF for a UE is the radio frame with system frame number 'SFN' which satisfies the equation (SFN+PF_offset) mod T=(T div N)*(UE_ID mod N).

The UE determines index (i_s), where i_s=floor (UE_ID/N) mod Ns.

The paging search space id is not set to zero, so the PDCCH monitoring occasions for paging are determined according to search space configuration indicated by pagingSearchSpace.

The PDCCH monitoring occasions for paging which are not overlapping with UL symbols are sequentially numbered from zero starting from the Pt PDCCH monitoring occasion for paging in the PF. The UL symbols are determined according to tdd-UL-DL-ConfigurationCommon.

if firstPDCCH-MonitoringOccasionOfPO is received from gNB, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB. The firstPDCCH-MonitoringOccasionOfPO (if configured by gNB) is received in system information (e.g. SystemInformationBlock1) or dedicated RRC signaling.

[Method 2]

Figure 34:
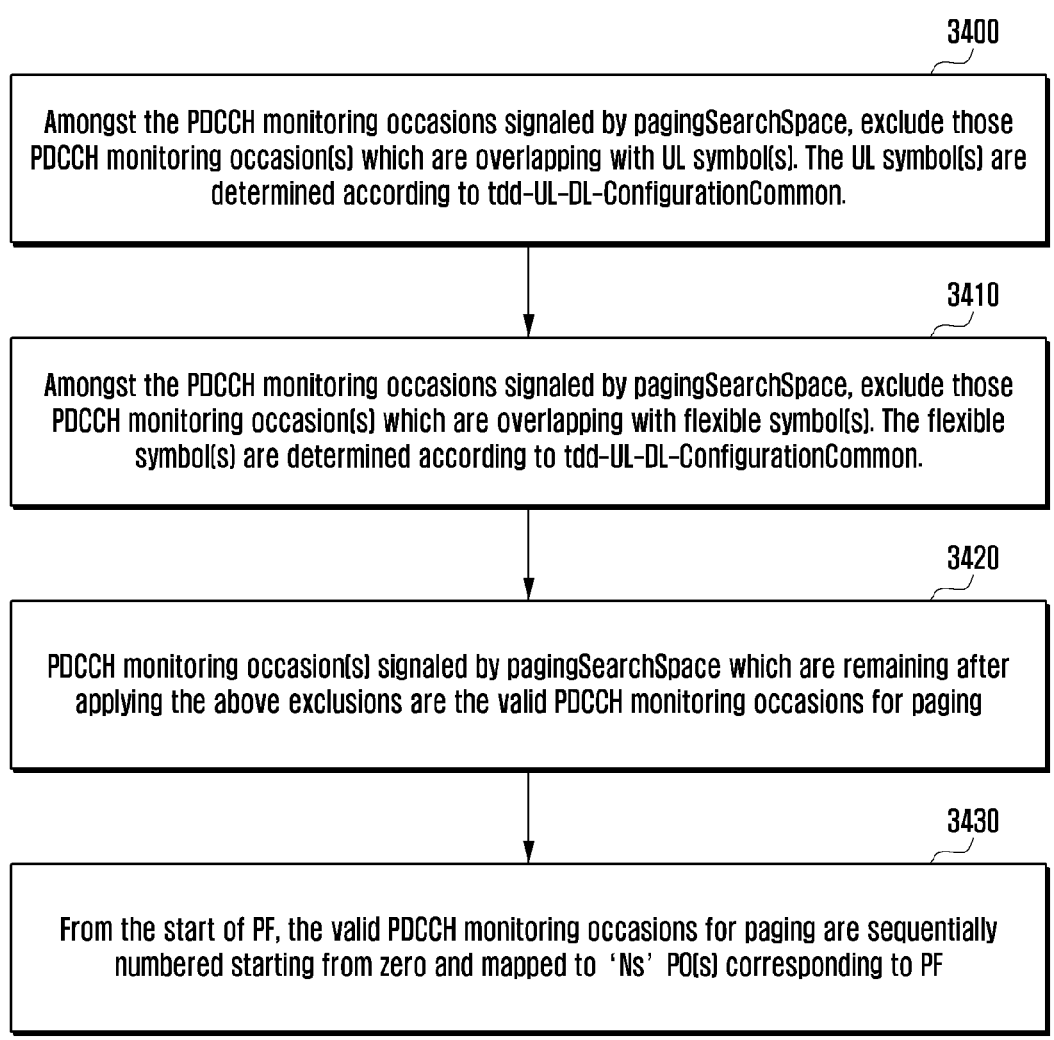
FIG. 34 illustrates a method of determining valid PDCCH monitoring occasions for paging according to an embodiment of method 1.

FIG. 34 illustrates a method of determining valid PDCCH monitoring occasions for paging according to an embodiment of method 2.

Amongst the PDCCH monitoring occasion(s) signaled by pagingSearchSpace, a UE exclude those PDCCH monitoring occasion(s) which are overlapping with UL symbol(s) determined according to tdd-UL-DL-ConfigurationCommon in step 3400.

Amongst the PDCCH monitoring occasion(s) signaled by pagingSearchSpace, the UE excludes those PDCCH monitoring occasion(s) which are overlapping with flexible symbols determined according to tdd-UL-DL-ConfigurationCommon in step 3410.

In step 3420, the UE then determines that PDCCH monitoring occasion(s) signaled by pagingSearchSpace which are remaining after applying the above exclusions are the valid PDCCH monitoring occasions for paging.

In step 3430, From the start of PF, the valid PDCCH monitoring occasions for paging are sequentially numbered starting from zero and mapped to 'Ns' PO(s) corresponding to PF.

if firstPDCCH-MonitoringOccasionOfPO is configured, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB.

The UE operation to determine PO is as follows:

First, a UE receives the tdd-UL-DL-ConfigurationCommon from gNB. tdd-UL-DL-ConfigurationCommon is received in system information (e.g. SystemInformationBlock1).

The UE then receives the paging channel configuration (i.e. Default DRX Cycle Duration, N, Ns, PF_offset) and paging search space configuration from a gNB wherein the paging search space id is not set to zero. The paging channel configuration is received in system information (e.g. SystemInformationBlock1) by the UE. The paging search space configuration is received in system information (e.g. SystemInformationBlock1) by an idle/inactive UE. The paging search space configuration is received in dedicated RRC signaling by an RRC connected UE. In dedicated RRC signaling paging search space configuration is signaled by the gNB in BWP configuration of each BWP in which paging can be received.

The UE determines the PF. The PF for a UE is the radio frame with system frame number 'SFN' which satisfies the equation (SFN+PF_offset) mod T=(T div N)*(UE_ID mod N).

The UE determines index (i_s), where i_s=floor (UE_ID/N) mod Ns.

The paging search space id is not set to zero, so the PDCCH monitoring occasions for paging are determined according to search space configuration indicated by paging-SearchSpace.

The PDCCH monitoring occasions for paging which are not overlapping with UL symbols or flexible symbols are sequentially numbered from zero starting from the Pt PDCCH monitoring occasion for paging in the PF. The UL symbols and flexible symbols are determined according to tdd-UL-DL-ConfigurationCommon.

if firstPDCCH-MonitoringOccasionOfPO is received from gNB, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB. The firstPDCCH-MonitoringOccasionOfPO (if configured by gNB) is received in system information (e.g. SystemInformationBlock1) by idle/inactive UE. firstPDCCH-MonitoringOccasionOfPO (if configured by gNB) is received in dedicated RRC signaling by RRC connected UE for monitoring paging in non-initial BWP. For monitoring paging in initial BWP, firstPDCCH-MonitoringOccasionOfPO (if configured by gNB) is received by RRC connected UE in system information (e.g. SystemInformationBlock1).

Figure 35A:
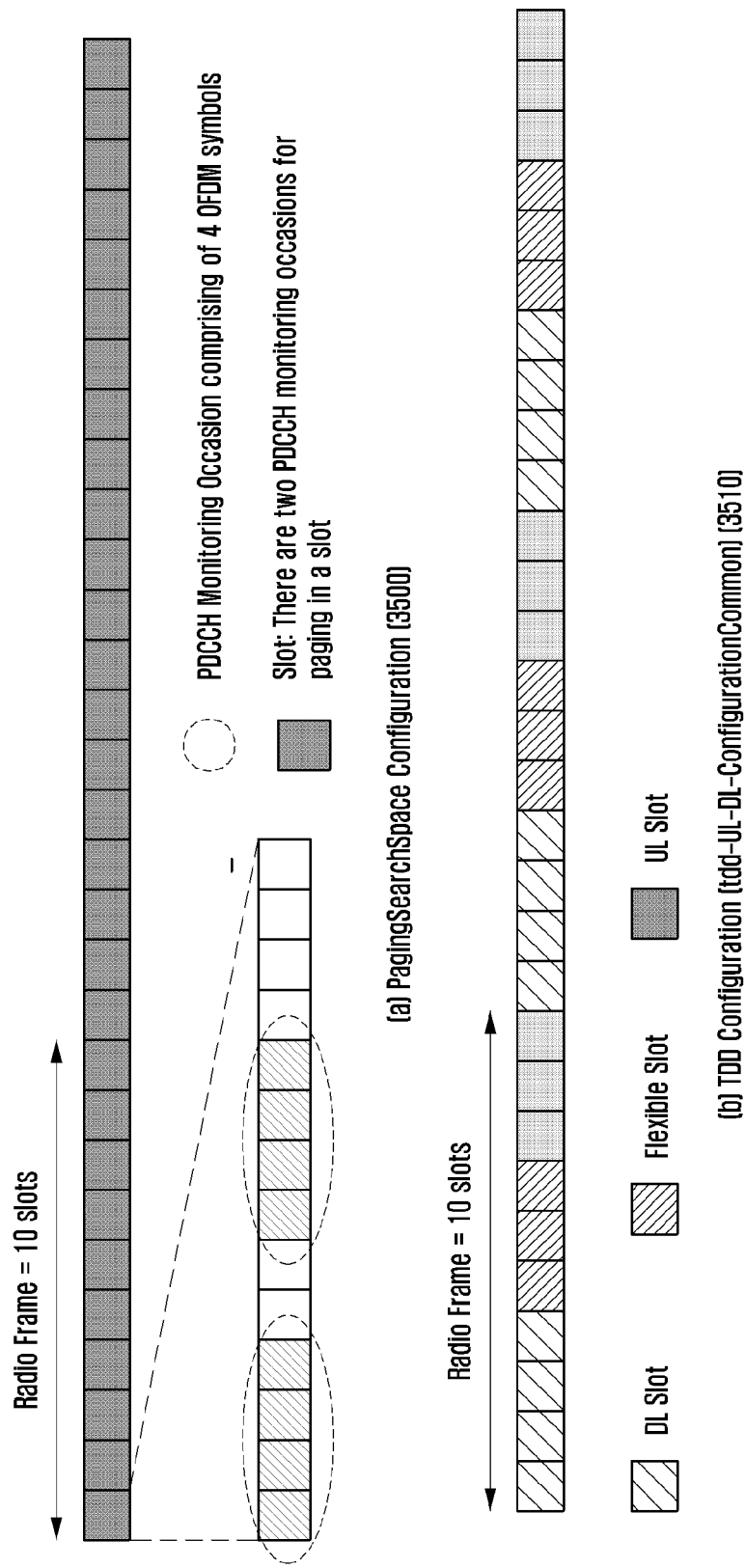
FIG. 35A illustrates an example of PDCCH monitoring occasions for paging and TDD configuration based on tdd-UL-DLConfigurationCommon.

FIG. 35A illustrates an example of PDCCH monitoring occasions for paging and TDD configuration based on tdd-UL-DLConfigurationCommon. Referring to FIG. 35A, Reference numeral 3500 is an illustration of PDCCH monitoring occasions for paging configured by paging-SearchSpace. In 3500, periodicity (p) is 10 slots; offset (o) is 0 slots; duration (d) is 10 slots; monitoringSymbolsWithinSlot is 10000010000000 and CORESET-time-duration is 4 OFDM symbols.

Reference numeral 3510 is an illustration of TDD configuration by tdd-UL-DL-ConfigurationCommon. In 3510, TDD pattern duration is 10 slots, $d_{slots}$ is 4 slots, $d_{symbols}$ is 0 OFDM symbols, $u_{slots}$ is 3 slots, $u_{symbols}$ is 0 OFDM symbols. $1^{st}$, $2^{nd}$, $3^{rd}$ and $4^{th}$ slots are DL slots, $5^{th}$, $6^{th}$ and $7^{th}$ slots are flexible slots and $8^{th}$, $9^{th}$ and $10^{th}$ slots are UL slots.

FIG. 35B illustrates an example of valid PDCCH monitoring occasions for paging according to method 1. Referring to FIG. 35B, reference numeral 3520 illustrates that PDCCH monitoring occasions for paging (configured by paging-SearchSpace) which are overlapping with UL symbols or flexible symbols configured by tdd-UL-DL-ConfigurationCommon are excluded (i.e. not considered valid for paging). The remaining PDCCH monitoring occasions for paging from the start of PF are sequentially numbered and mapped to PO(s). For example if Ns equals 2, number of transmitted SSBs (S) is 8 and firstPDCCH-MonitoringOccasionOfPO is not configured, PO1 is set of PDCCH monitoring occasion numbered from 0 to 7. PO2 is set of PDCCH monitoring occasion numbered from 8 to 15.

[Method 3]

Figure 36:
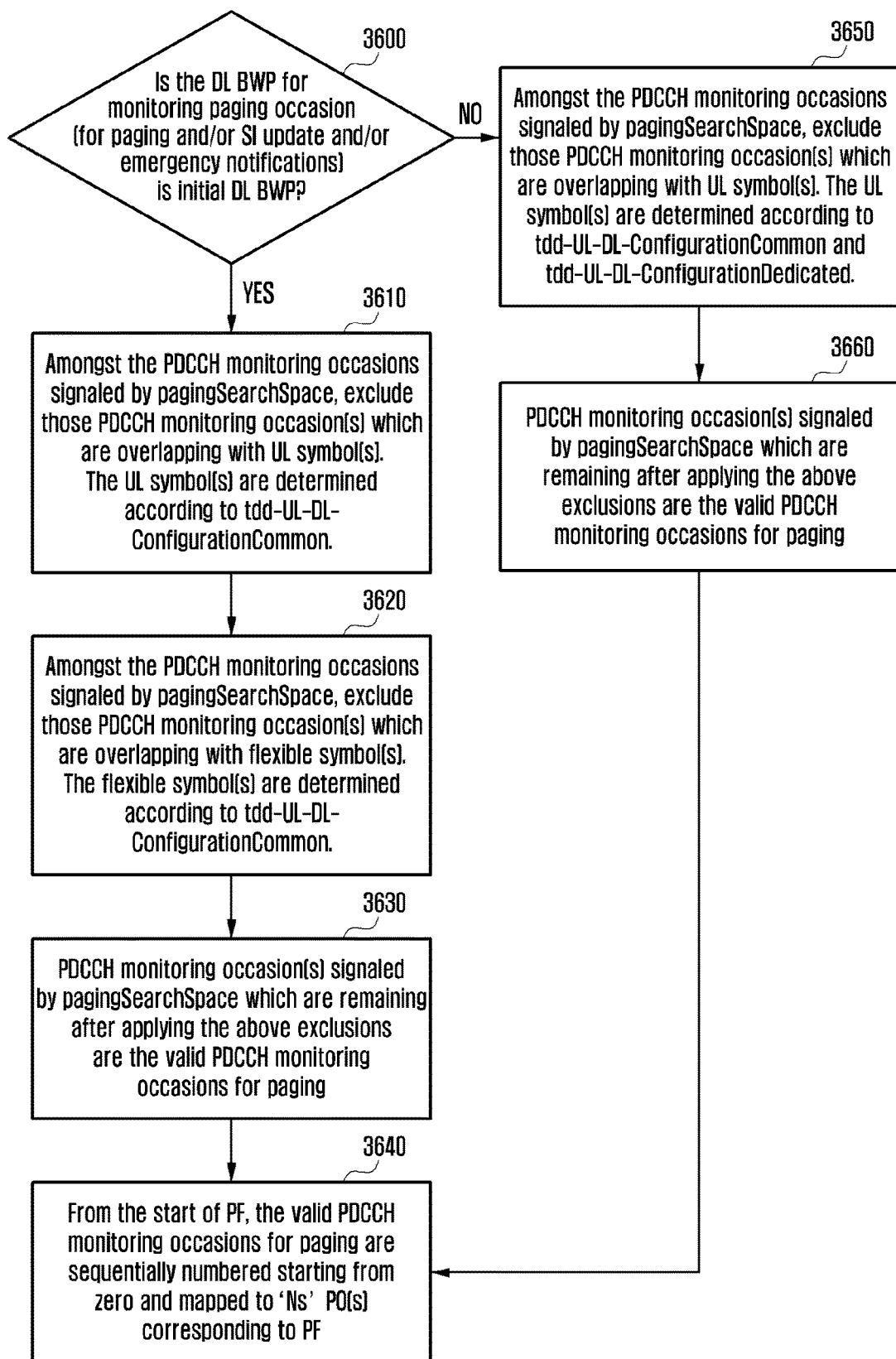
FIG. 36 illustrates a method of determining valid PDCCH monitoring occasions for paging according to an embodiment of method 2.

FIG. 36 illustrates a method of determining valid PDCCH monitoring occasions for paging according to an embodiment of method 3.

Referring to FIG. 36, in step 3600, a UE determines whether a DL BWP in which the UE monitors paging occasions is an initial BWP or not. If the DL BWP in which UE monitors paging occasions (for paging and/or SI update and/or emergency notifications) is initial DL BWP, the UE excludes those PDCCH monitoring occasion(s) which are overlapping with UL symbol(s) determined according to tdd-UL-DL-ConfigurationCommon amongst the PDCCH monitoring occasion(s) signaled by paging-SearchSpace in step 3610. Then the UE excludes those PDCCH monitoring occasion(s) which are overlapping with flexible symbols determined according to tdd-UL-DL-ConfigurationCommon amongst the PDCCH monitoring occasion(s) signaled by pagingSearchSpace in step 3620. In step 3630, the UE determines that PDCCH monitoring occasion(s) signaled by pagingSearchSpace which are remaining after applying the above exclusions are the valid PDCCH monitoring occasions for paging.

if the DL BWP in which the UE monitors paging occasion (for paging and/or SI update and/or emergency notifications) is not initial DL BWP, the UE exclude those PDCCH monitoring occasion(s) which are overlapping with UL symbol(s) determined according to tdd-UL-DL-ConfigurationCommon and tdd-UL-DL-ConfigurationDedicated amongst the PDCCH monitoring occasion(s) signaled by pagingSearchSpace in step 3650.

The UE determines that PDCCH monitoring occasion(s) signaled by pagingSearchSpace which are remaining after applying the above exclusions are the valid PDCCH monitoring occasions for paging in step 3660.

From the start of PF, the valid PDCCH monitoring occasions for paging are sequentially numbered starting from zero and mapped to 'Ns' PO(s) corresponding to PF in step 3640.

if firstPDCCH-MonitoringOccasionOfPO is configured, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB.

A UE in RRC idle/inactive state monitors paging occasions in initial DL BWP. A UE in RRC connected state monitors paging occasion in active DL BWP if paging search space is configured in active DL BWP. The active DL BWP may or may not be initial DL BWP. If paging search space is not configured in active DL BWP, UE in RRC connected state does not monitor paging occasion.

The UE operation to determine PO is as follows:

A UE receives the tdd-UL-DL-ConfigurationCommon from gNB. tdd-UL-DL-ConfigurationCommon is received in system information (e.g. SystemInformationBlock1).

The UE receives the paging channel configuration (i.e. Default DRX Cycle Duration, N, Ns, PF_offset) and paging search space configuration from a gNB wherein the paging search space id is not set to zero. The paging channel configuration is received in system information (e.g. SystemInformationBlock1) by the UE. The paging search space configuration is received in system information (e.g. SystemInformationBlock1) by an idle/inactive UE. The paging search space configuration is received in dedicated RRC signaling by an RRC connected UE. In dedicated RRC signaling paging search space configuration is signaled by gNB in BWP configuration of each BWP in which paging can be received.

The UE determines the PF. The PF for a UE is the radio frame with system frame number 'SFN' which satisfies the equation (SFN+PF_offset) mod T=(T div N)*(UE_ID mod N).

Then the UE determines index (i_s), where i_s=floor (UE_ID/N) mod Ns

The paging search space id is not set to zero, so the PDCCH monitoring occasions for paging are determined according to search space configuration indicated by paging-SearchSpace.

if the DL BWP in which the UE monitors paging occasions (for paging and/or SI update and/or emergency notifications) is initial DL BWP: The PDCCH monitoring occasions for paging which are not overlapping with UL symbols or flexible symbols are sequentially numbered from zero starting from the Pt PDCCH monitoring occasion for paging in the PF. The UL symbols and flexible symbols are determined according to tdd-UL-DL-ConfigurationCommon.

if the DL BWP in which the UE monitors paging occasion (for paging and/or SI update and/or emergency notifications) is not initial DL BWP: The PDCCH monitoring occasions for paging which are not overlapping with UL symbols are sequentially numbered from zero starting from the Pt PDCCH monitoring occasion for paging in the PF. The UL symbols are determined according to tdd-UL-DL-ConfigurationCommon and tdd-UL-DL-ConfigurationDedicated.

if firstPDCCH-MonitoringOccasionOfPO is received from gNB, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from the gNB. The firstPDCCH-MonitoringOccasionOfPO (if configured by gNB) is received in system information (e.g. SystemInformationBlock1) by the idle/inactive UE. firstPDCCH-MonitoringOccasionOfPO (if configured by gNB) is received in dedicated RRC signaling by the RRC connected UE for monitoring paging in non-initial BWP. For monitoring paging in initial BWP, firstPDCCH-MonitoringOccasionOfPO (if configured by gNB) is received by the RRC connected UE in system information (e.g. SystemInformationBlock1).

[Method 4]

Figure 37:
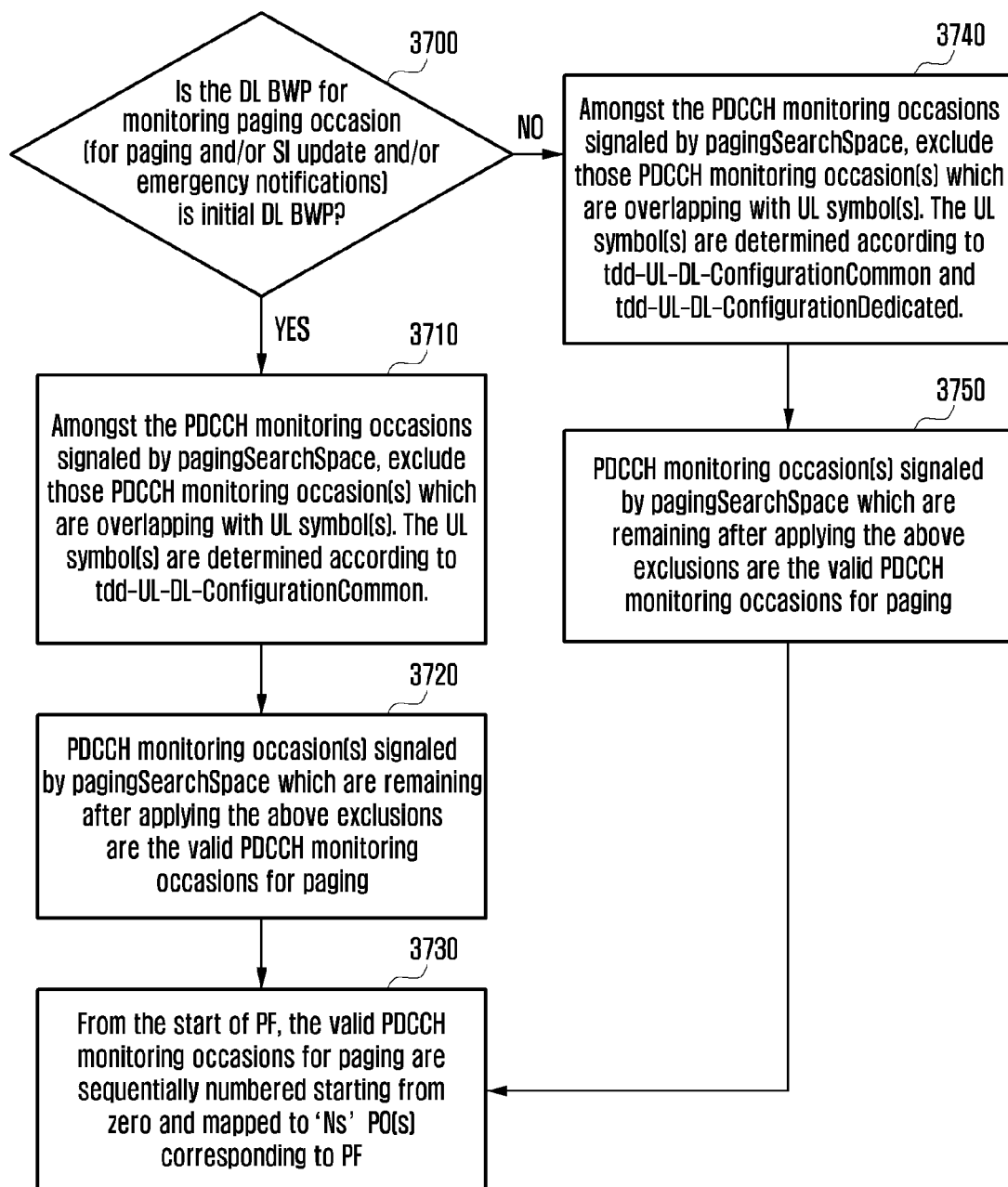
FIG. 37 illustrates a method of determining valid PDCCH monitoring occasions for paging according to an embodiment of method 3.

FIG. 37 illustrates a method of determining valid PDCCH monitoring occasions for paging according to an embodiment of method 4.

Referring to FIG. 37, in step 3700, a UE determines whether a DL BWP in which the UE monitors paging occasions is an initial BWP or not. if the DL BWP in which the UE monitors paging occasion (for paging and/or SI update and/or emergency notifications) is initial DL BWP, the UE excludes those PDCCH monitoring occasion(s) which are overlapping with UL symbol(s) determined according to tdd-UL-DL-ConfigurationCommon amongst the PDCCH monitoring occasion(s) signaled by paging-SearchSpace in step 3710.

Then the UE determines that PDCCH monitoring occasion(s) signaled by pagingSearchSpace which are remaining after applying the above exclusions are the valid PDCCH monitoring occasions for paging in step 3720.

if the DL BWP in which the UE monitors paging occasion (for paging and/or SI update and/or emergency notifications) is not initial DL BWP, the UE excludes those PDCCH monitoring occasion(s) which are overlapping with UL symbol(s) determined according to tdd-UL-DL-ConfigurationCommon and tdd-UL-DL-ConfigurationDedicated amongst the PDCCH monitoring occasion(s) signaled by pagingSearchSpace in step 3740.

The UE determines that PDCCH monitoring occasion(s) signaled by pagingSearchSpace which are remaining after applying the above exclusions are the valid PDCCH monitoring occasions for paging in step 3750.

In step 3730, from the start of PF, the valid PDCCH monitoring occasions for paging are sequentially numbered starting from zero and mapped to 'Ns' PO(s) corresponding to PF.

if firstPDCCH-MonitoringOccasionOfPO is configured, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from gNB.

A UE in RRC idle/inactive state monitors paging occasions in initial DL BWP. A UE in RRC connected state monitors paging occasions in active DL BWP if paging search space is configured in active DL BWP. The active DL BWP may or may not be initial DL BWP. If paging search space is not configured in active DL BWP, the UE in RRC connected state does not monitor paging occasion.

The UE operation to determine PO is as follows:

A UE receives the tdd-UL-DL-ConfigurationCommon from a gNB. tdd-UL-DL-ConfigurationCommon is received in system information (e.g. SystemInformationBlock1).

The UE receives the paging channel configuration (i.e. Default DRX Cycle Duration, N, Ns, PF_offset) and paging search space configuration from the gNB wherein the paging search space id is not set to zero. The paging channel configuration is received in system information (e.g. SystemInformationBlock1) by the UE. The paging search space configuration is received in system information (e.g. SystemInformationBlock1) by an idle/inactive UE. The paging search space configuration is received in dedicated RRC signaling by an RRC connected UE. In dedicated RRC signaling paging search space configuration is signaled by the gNB in BWP configuration of each BWP in which paging can be received.

The UE determines the PF. The PF for a UE is the radio frame with system frame number 'SFN' which satisfies the equation (SFN+PF_offset) mod T=(T div N)*(UE_ID mod N).

Then the UE determines index (i_s), where i_s=floor (UE_ID/N) mod Ns.

The paging search space id is not set to zero, so the PDCCH monitoring occasions for paging are determined according to search space configuration indicated by paging-SearchSpace.

if the DL BWP in which the UE monitors paging occasions (for paging and/or SI update and/or emergency notifications) is initial DL BWP: The PDCCH monitoring occasions for paging which are not overlapping with UL symbols are sequentially numbered from zero starting from the Pt PDCCH monitoring occasion for paging in the PF. The UL symbols are determined according to tdd-UL-DL-ConfigurationCommon.

if the DL BWP in which UE monitors paging occasion (for paging and/or SI update and/or emergency notifications) is not initial DL BWP: The PDCCH monitoring occasions for paging which are not overlapping with UL symbols are sequentially numbered from zero starting from the Pt PDCCH monitoring occasion for paging in the PF. The UL symbols are determined according to tdd-UL-DL-ConfigurationCommon and tdd-UL-DL-ConfigurationDedicated.

if firstPDCCH-MonitoringOccasionOfPO is received from gNB, the $(i\_s+1)^{th}$ PO is a set of 'S' consecutive PDCCH monitoring occasions for paging starting from the PDCCH monitoring occasion indicated by firstPDCCH-MonitoringOccasionOfPO (i.e. the $(i\_s+1)^{th}$ value of the firstPDCCH-MonitoringOccasionOfPO parameter).

Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from the gNB. The firstPDCCH-MonitoringOccasionOfPO (if configured by the gNB) is received in system information (e.g. SystemInformationBlock1) by idle/inactive UE. firstPDCCH-MonitoringOccasionOfPO (if configured by the gNB) is received in dedicated RRC signaling by the RRC connected UE for monitoring paging in non-initial BWP. For monitoring paging in initial BWP, firstPDCCH-MonitoringOccasionOfPO (if configured by gNB) is received by the RRC connected UE in system information (e.g. SystemInformationBlock1).

[Method 5]

In method 5 of the present disclosure, the valid PDCCH monitoring occasions for paging are determined as follows:

A UE excludes those PDCCH monitoring occasion(s) which are overlapping with UL symbol(s) determined according to tdd-UL-DL-ConfigurationCommon amongst the PDCCH monitoring occasion(s) signaled by paging-SearchSpace. The UE determines that PDCCH monitoring occasion(s) signaled by pagingSearchSpace which are remaining after applying the above exclusions are the valid PDCCH monitoring occasions for paging. From the start of PF, the valid PDCCH monitoring occasions for paging are sequentially numbered starting from zero and mapped to 'Ns' PO(s) corresponding to PF.

If firstPDCCH-MonitoringOccasionOfPO is configured, the $(i\_s+1)^{th}$ PO is a set of 'S' consecutive PDCCH monitoring occasions for paging starting from the PDCCH monitoring occasion number indicated by firstPDCCH-MonitoringOccasionOfPO (i.e. the $(i\_s+1)^{th}$ value of the firstPDCCH-MonitoringOccasionOfPO parameter). Otherwise, the $(i\_s+1)^{th}$ PO is a set of 'S' consecutive PDCCH monitoring occasions for paging starting from the (i_s*PDCCH monitoring occasion for paging. 'S' is the number of actual transmitted SSBs determined according to parameter ssb-PositionsInBurst signalled in SystemInformationBlock1 received from a gNB.

Figure 38:
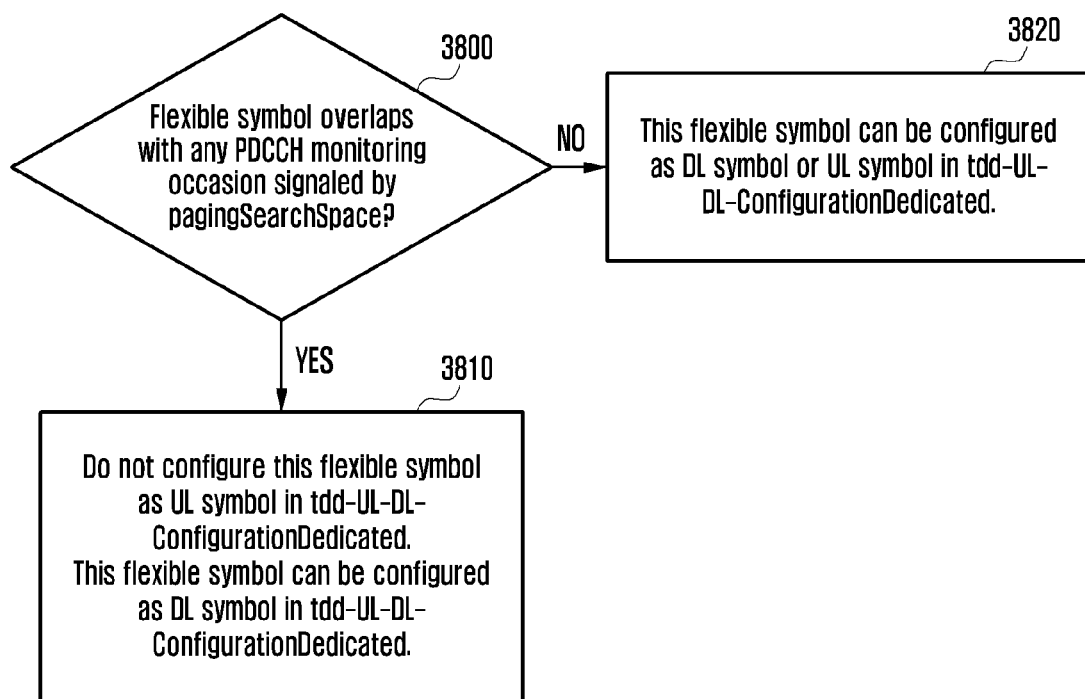
FIG. 38 illustrates a method of configuring TDD configuration by a gNB according to embodiment of method 4.

In this method we also propose a method as shown in FIG. 38. FIG. 38 illustrates a method of configuring TDD configuration by a gNB according to embodiment of method 4. Referring to FIG. 38, a gNB determines whether a flexible symbol determined according to tdd-UL-DL-ConfigurationCommon overlaps with any PDCCH monitoring occasion signaled by pagingSearchSpace or not in step 3800. If the flexible symbol determined according to tdd-UL-DL-ConfigurationCommon overlaps with any PDCCH monitoring occasion signaled by pagingSearchSpace, then gNB does not configure this flexible symbol as UL symbol via dedicated signaling (e.g. via tdd-UL-DL-ConfigurationDedicated or SFI) to UE(s) in step 3810. This flexible symbol can be configured as DL symbol via dedicated signaling (e.g. via tdd-UL-DL-ConfigurationDedicated or SFI) to UE(s). If flexible symbol determined according to tdd-UL-DL-ConfigurationCommon does not overlap with any PDCCH monitoring occasion signaled by pagingSearchSpace, this flexible symbol can be configured as DL symbol or UL symbol dedicated signaling (e.g. via tdd-UL-DL-ConfigurationDedicated or SFI) to UE(s) in step 3820.

Embodiment 3-2: Valid PDCCH Monitoring Occasions for SI Message

For SI message reception, PDCCH monitoring occasions are signaled by osi-SearchSpace. In NR, the following parameters in osi-SearchSpace configures the PDCCH monitoring occasions for SI message reception: periodicity (p); offset (o); duration (d): Number of consecutive slots having PDCCH monitoring occasions every period given by periodicity; monitoringSymbolsWithinSlot (1 bitmap of size 14, one bit corresponding to an OFDM symbol); CORESET-time-duration (c): number of consecutive OFDM symbols in a PDCCH monitoring occasion.

In TDD cell, one or more PDCCH monitoring occasions signaled by osi-SearchSpace may overlap with UL symbols.

In the current design, PDCCH monitoring occasions signaled by osi-SearchSpace which are not overlapping with UL symbols are considered as valid for SI message reception. SI message is received in SI window. In the SI window, PDCCH monitoring occasions signaled by osi-SearchSpace which are not overlapping with UL symbols are numbered starting from one. An idle/Inactive UE determines UL symbols based on tdd-UL-DL-ConfigurationCommon signalled in SystemInformationBlock1. An RRC connected UE determines UL symbols based on tdd-UL-DL-ConfigurationCommon, tdd-UL-DL-ConfigurationDedicated and dynamic slot format indicator. As a result, there will be mismatch between PDCCH monitoring occasions determined by idle/inactive UEs and connected UEs for SI message reception in SI window.

[Method 1]

Figure 39:
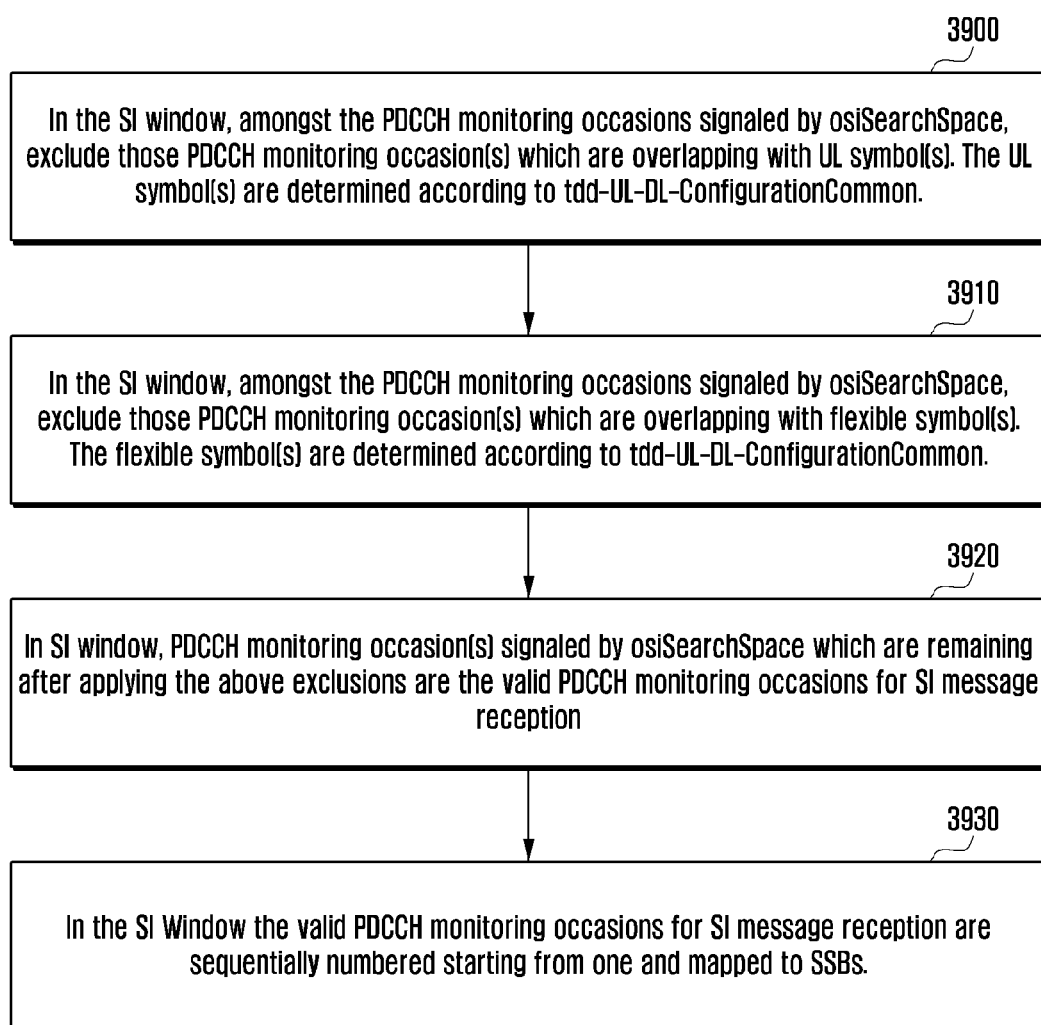
FIG. 39 illustrates a method of determining valid PDCCH monitoring occasions for SI message according to an embodiment of method 1.

FIG. 39 illustrates a method of determining valid PDCCH monitoring occasions for SI message according to an embodiment of method 1.

Referring to FIG. 39, in the SI window, a UE excludes those PDCCH monitoring occasion(s) which are overlapping with UL symbol(s) determined according to tdd-UL-DL-ConfigurationCommon amongst the PDCCH monitoring occasion(s) signaled by osiSearchSpace in step 3900.

In step 3910, in the SI window, the UE excludes those PDCCH monitoring occasion(s) which are overlapping with flexible symbols determined according to tdd-UL-DL-ConfigurationCommon amongst the PDCCH monitoring occasion(s) signaled by osiSearchSpace.

Then the UE determines that PDCCH monitoring occasion(s) signaled by osiSearchSpace which are remaining after applying the above exclusions are the valid PDCCH monitoring occasions for SI message reception in the SI window in step 3920.

In step 3930, in the SI window, the valid PDCCH monitoring occasions for SI message reception are sequentially numbered starting from one and mapped to SSBs. The UE monitors one or more of these valid PDCCH monitoring occasions for SI message reception in SI window.

[Method 2]

Figure 40:
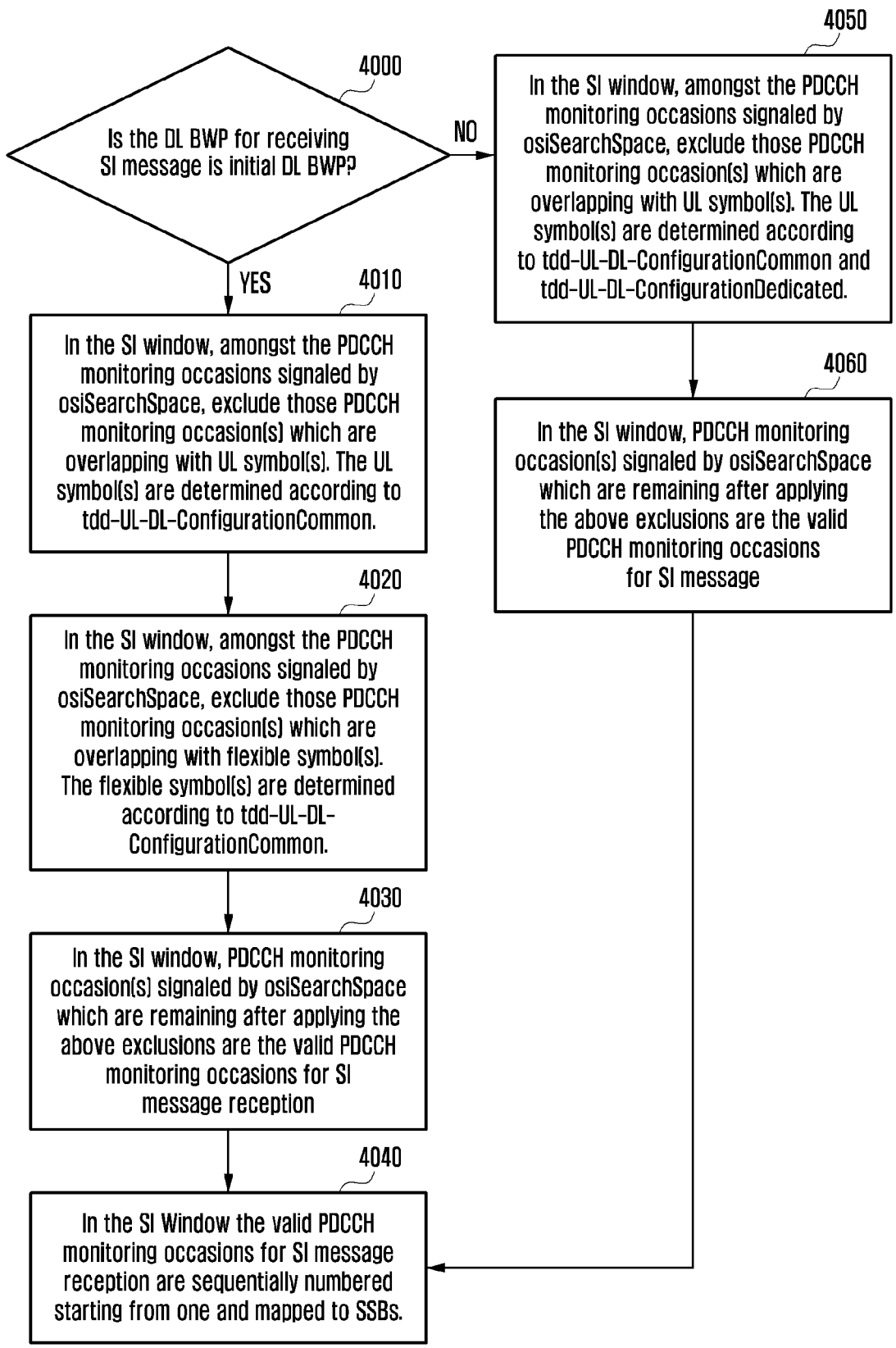
FIG. 40 illustrates a method of determining valid PDCCH monitoring occasions for SI message according to an embodiment of method 2.

FIG. 40 illustrates a method of determining valid PDCCH monitoring occasions for SI message according to an embodiment of method 2.

Referring to FIG. 40, a UE determines whether a DL BWP for receiving a SI message is an initial BWP or not in step 4000. If the DL BWP in which the UE monitors SI message is initial DL BWP, the UE excludes those PDCCH monitoring occasion(s) which are overlapping with UL symbol(s) determined according to tdd-UL-DL-ConfigurationCommon amongst the PDCCH monitoring occasion(s) signaled by osiSearchSpace in the SI window in step 4010. In the SI window, amongst the PDCCH monitoring occasion(s) signaled by osiSearchSpace, the UE excludes those PDCCH monitoring occasion(s) which are overlapping with flexible symbols determined according to tdd-UL-DL-ConfigurationCommon in step 4020. Then the UE determines that PDCCH monitoring occasion(s) signaled by osiSearchSpace which are remaining after applying the above exclusions are the valid PDCCH monitoring occasions for SI message reception in SI window in step 4030.

If the DL BWP in which the UE monitors SI message is not initial DL BWP, the UE excludes those PDCCH monitoring occasion(s) which are overlapping with UL symbol(s) determined according to tdd-UL-DL-ConfigurationCommon and tdd-UL-DL-ConfigurationDedicated amongst the PDCCH monitoring occasion(s) signaled by osiSearchSpace in the SI window in step 4050. Then the UE determines PDCCH monitoring occasion(s) signaled by osiSearchSpace which are remaining after applying the above exclusions are the valid PDCCH monitoring occasions for SI message reception in the SI window in step 4060.

In step 4040, in the SI window, the valid PDCCH monitoring occasions for SI message reception are sequentially numbered starting from one and mapped to SSBs. UE monitors one or more of these valid PDCCH monitoring occasions for SI message reception in SI window.

A UE in RRC idle/inactive state receives a SI message in an initial DL BWP. A UE in RRC connected state receives a SI message in an active DL BWP if OSI search space is configured in the active DL BWP. The active DL BWP may or may not be initial DL BWP. If OSI search space is not configured in the active DL BWP, the UE in RRC connected state does not receive SI message.

[Method 3]

Figure 41:
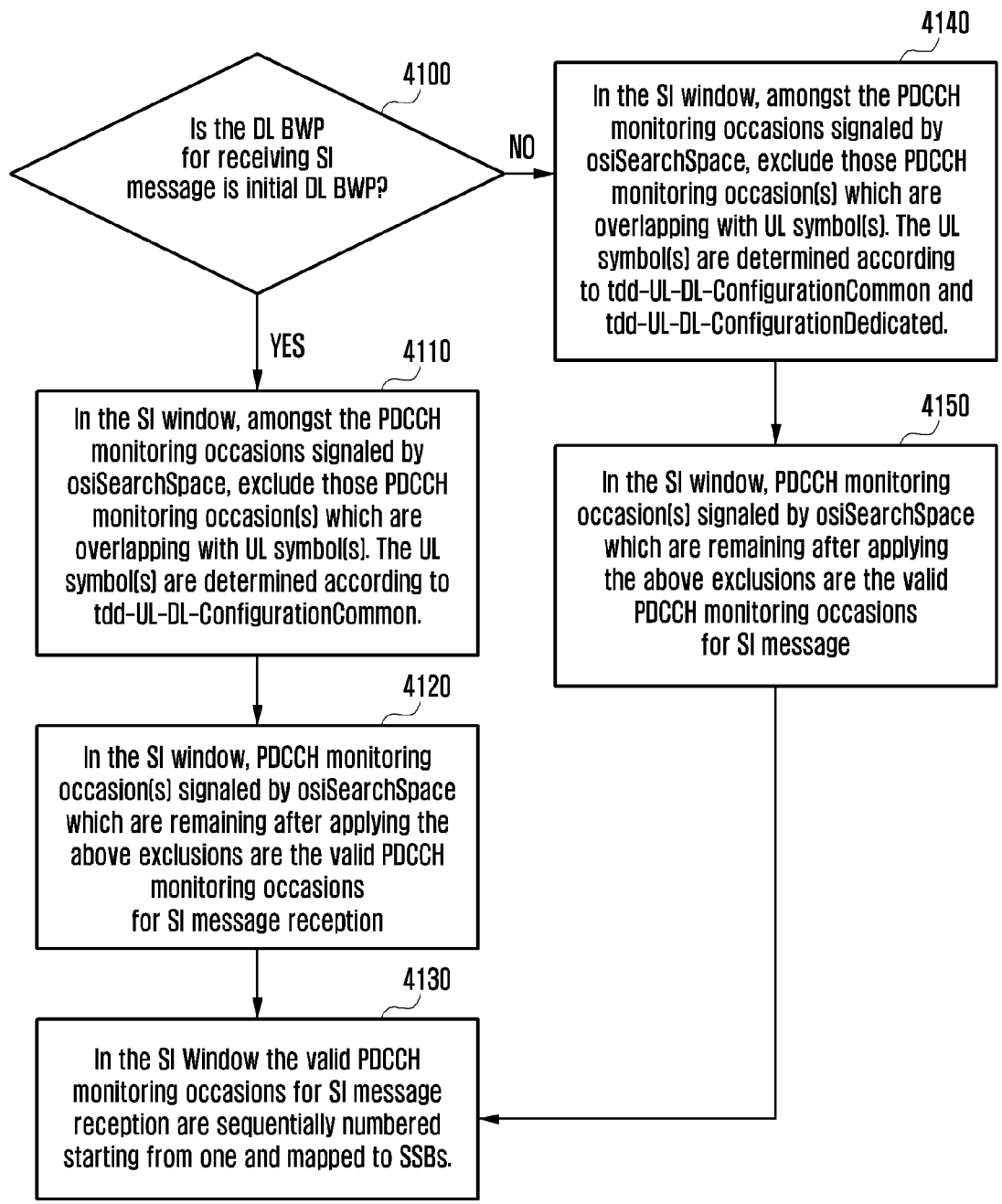
FIG. 41 illustrates a method of determining valid PDCCH monitoring occasions for SI message according to an embodiment of method 3.

FIG. 41 illustrates a method of determining valid PDCCH monitoring occasions for SI message according to an embodiment of method 3.

Referring to FIG. 41, a UE determines whether a DL BWP for receiving a SI message is an initial BWP or not in step 4100. If the DL BWP in which the UE monitors SI message is initial DL BWP, the UE excludes those PDCCH monitoring occasion(s) which are overlapping with UL symbol(s) determined according to tdd-UL-DL-ConfigurationCommon amongst the PDCCH monitoring occasion(s) signaled by osiSearchSpace in SI window in step 4110. Then the UE determines that PDCCH monitoring occasion(s) signaled by osiSearchSpace which are remaining after applying the above exclusions are the valid PDCCH monitoring occasions for SI message reception in SI window in step 4120.

If the DL BWP in which the UE monitors SI message is not initial DL BWP, the UE excludes those PDCCH monitoring occasion(s) which are overlapping with UL symbol(s) determined according to tdd-UL-DL-ConfigurationCommon and tdd-UL-DL-ConfigurationDedicated amongst the PDCCH monitoring occasion(s) signaled by osiSearchSpace in SI window in step 4140. Then the UE determines that PDCCH monitoring occasion(s) signaled by osiSearchSpace which are remaining after applying the above exclusions are the valid PDCCH monitoring occasions for SI message reception in the SI window in step 4150.

In step 4130, in the SI window, the valid PDCCH monitoring occasions for SI message reception are sequentially numbered starting from one and mapped to SSBs. UE monitors one or more of these valid PDCCH monitoring occasions for SI message reception in SI window.

A UE in RRC idle/inactive state receives SI message in an initial DL BWP. A UE in RRC connected state receives SI message in an active DL BWP if OSI search space is configured in the active DL BWP. The active DL BWP may or may not be the initial DL BWP. If OSI search space is not configured in the active DL BWP, the UE in RRC connected state does not receive SI message.

[Method 4]

In method 4 of the present disclosure, the valid PDCCH monitoring occasions for SI message are determined as follows:

A UE excludes those PDCCH monitoring occasion(s) which are overlapping with UL symbol(s) determined according to tdd-UL-DL-ConfigurationCommon amongst the PDCCH monitoring occasion(s) signaled by paging-SearchSpace in SI window.

In SI Window, the UE determines PDCCH monitoring occasion(s) signaled by osiSearchSpace which are remaining after applying the above exclusions are the valid PDCCH monitoring occasions for SI message reception.

In the SI window, the valid PDCCH monitoring occasions for SI message reception are sequentially numbered starting from one and mapped to SSBs. UE monitors one or more of these valid PDCCH monitoring occasions for SI message reception in SI window.

Figure 42:
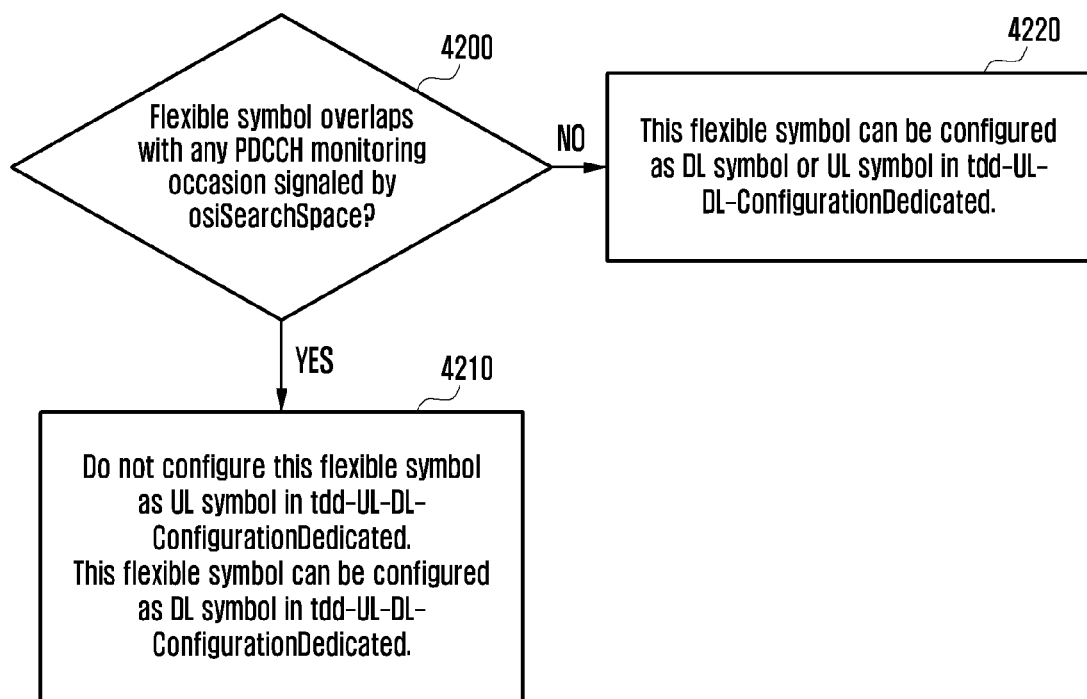
FIG. 42 illustrates a method of configuring TDD configuration by a gNB according to embodiment of method 4.

In this method we also propose a method as shown in FIG. 42. FIG. 42 illustrates a method of configuring TDD configuration by a gNB according to embodiment of method 4.

Referring to FIG. 42, a gNB determines whether a flexible symbol determined according to tdd-UL-DL-Configuration-Common overlaps with any PDCCH monitoring occasion signaled by osiSearchSpace or not in step 4200. If flexible symbol determined according to tdd-UL-DL-Configuration-Common overlaps with any PDCCH monitoring occasion signaled by osiSearchSpace, then gNB does not configure this flexible symbol as UL symbol via dedicated signaling (e.g. via tdd-UL-DL-ConfigurationDedicated or SFI) to UE(s) in step 4210. This flexible symbol can be configured as DL symbol via dedicated signaling (e.g. via tdd-UL-DL-ConfigurationDedicated or SFI) to UE(s).

If flexible symbol determined according to tdd-UL-DL-ConfigurationCommon does not overlap with any PDCCH monitoring occasion signaled by osiSearchSpace, this flexible symbol can be configured as DL symbol or UL symbol dedicated signaling (e.g. via tdd-UL-DL-Configuration-Dedicated or SFI) to UE(s) in step 4220.

In alternate embodiment, if flexible symbol determined according to tdd-UL-DL-ConfigurationCommon does not overlap with any PDCCH monitoring occasion signaled by osiSearchSpace and pagingSearchSpace, this flexible symbol can be configured as DL symbol or UL symbol dedicated signaling (e.g. via tdd-UL-DL-ConfigurationDedicated or SFI) to UE(s).

Figure 43:
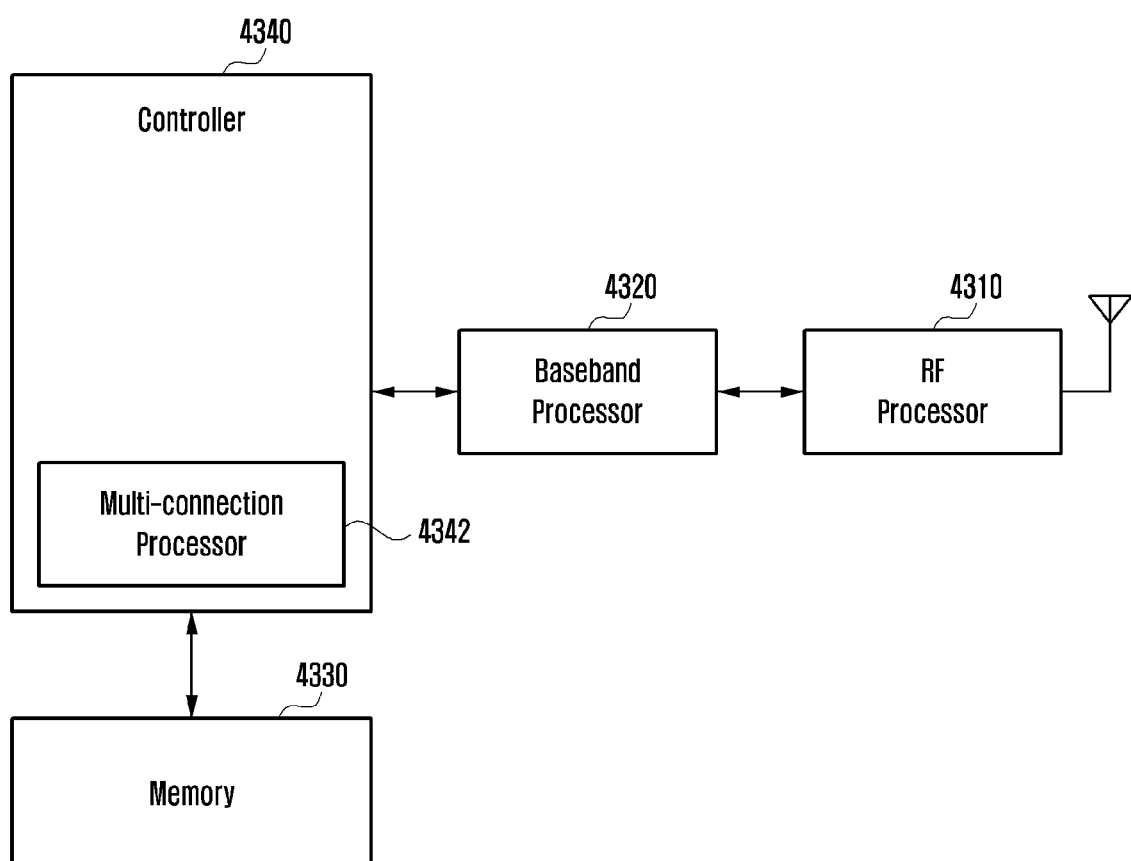
FIG. 43 illustrates the configuration of a UE according to embodiments 2 and 3.

FIG. 43 illustrates the configuration of a UE according to embodiments 2 and 3.

Referring to FIG. 43, the UE includes a radio frequency (RF) processor 4310, a baseband processor 4320, a memory 4330, and a controller 4340. The controller 4340 may include a multi-connection processor 4342.

The RF processor 4310 transmits or receives a signal through a wireless channel, such as band conversion and amplification of a signal. That is, the RF processor 4310 upconverts a baseband signal, provided from the baseband processor 4320, into an RF band signal to transmit the RF band signal through an antenna and downconverts an RF band signal, received through the antenna, into a baseband signal. The RF processor 4310 may include a transmission filter, a reception filter, an amplifier, a mixer, an oscillator, a digital-to-analog converter (DAC), and an analog-to-digital converter (ADC). Although FIG. 43 shows only one antenna, the UE may include a plurality of antennas. In addition, the RF processor 4310 may include a plurality of RF chains.

The RF processor 4310 may perform beamforming by adjusting the phase and strength of each of signals transmitted and received through a plurality of antennas or antenna elements. The RF processor may perform MIMO and may receive a plurality of layers when performing MIMO, may perform reception beam sweeping by appropriately setting the plurality of antennas or antenna elements under the control of the controller 4340, or may adjust the orientation and width of a reception beam such that the reception beam is coordinated with a transmission beam.

The baseband processor 4320 converts a baseband signal and a bit stream according to the physical-layer specification of a system. For example, in data transmission, the baseband processor 4320 encodes and modulates a transmission bit stream, thereby generating complex symbols. In data reception, the baseband processor 4320 demodulates and decodes a baseband signal, provided from the RF processor 4310, thereby reconstructing a reception bit stream. For example, according to OFDM, in data transmission, the baseband processor 4320 generates complex symbols by encoding and modulating a transmission bit stream, maps the complex symbols to subcarriers, and constructs OFDM symbols through inverse fast Fourier transform (IFFT) and cyclic prefix (CP) insertion. In data reception, the baseband processor 4320 divides a baseband signal, provided from the RF processor 4310, into OFDM symbols, reconstructs signals mapped to subcarriers through fast Fourier transform (FFT), and reconstructs a reception bit stream through demodulation and decoding.

As described above, the baseband processor 4320 and the RF processor 4310 transmit and receive signals, and thus, may be referred to as a transmitter, a receiver, a transceiver, or a communication unit. At least one of the baseband processor 4320 and the RF processor 4310 may include a plurality of communication modules to support a plurality of different radio access technologies such as LTE and NR networks, and may include different communication modules for processing signals in different frequency bands. The different frequency bands may include a super high frequency (SHF) band (for example, 2.2 GHz and 2 GHz) and a millimeter wave band (for example, 60 GHz).

The memory 4330 stores data, such as a default program, an application, and configuration information for operating the UE, and provides stored data upon request from the controller 4340.

The controller 4340 controls overall operations of the UE. For example, the controller 4340 transmits and receives signals through the baseband processor 4320 and the RF processor 4310, and records and reads data in the memory 4330. To this end, the controller 4340 may include at least one processor, such as a communication processor to perform control for communication and an application processor (AP) to control an upper layer, such as an application.

Figure 44:
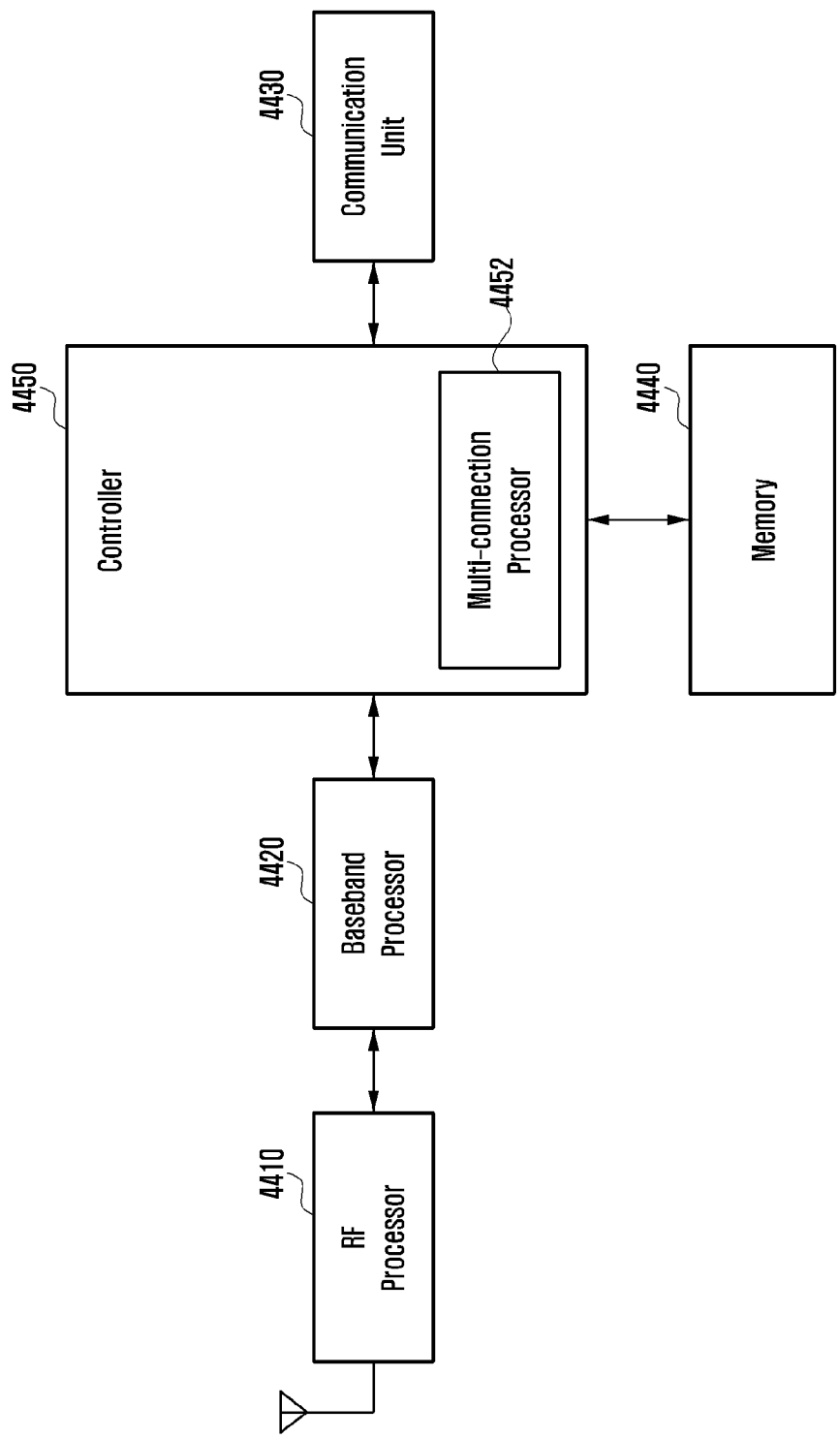
FIG. 44 illustrates the configuration of a base station according to embodiments 2 and 3.

FIG. 44 illustrates the configuration of a base station according to embodiments 2 and 3.

Referring to FIG. 44, the base station includes an RF processor 4410, a baseband processor 4420, a communication unit 4430, a memory 4440, and a controller 4450. The controller 4450 may include a multi-connection processor 4452.

The RF processor 4410 transmits or receives a signal through a wireless channel, such as band conversion and amplification of a signal. That is, the RF processor 4410 upconverts a baseband signal, provided from the baseband processor 4420, into an RF band signal to transmit the RF band signal through an antenna and downconverts an RF band signal, received through the antenna, into a baseband signal. The RF processor 4410 may include a transmission filter, a reception filter, an amplifier, a mixer, an oscillator, a DAC, and an ADC. Although FIG. 44 shows only one antenna, the base station may include a plurality of antennas. In addition, the RF processor 4410 may include a plurality of RF chains, and may perform beamforming by adjusting the phase and strength of each of signals transmitted and received through a plurality of antennas or antenna elements. The RF processor may transmit one or more layers, thereby performing downlink MIMO.

The baseband processor 4420 converts a baseband signal and a bit stream according to the physical-layer specification of a first radio access technology. For example, in data transmission, the baseband processor 4420 encodes and modulates a transmission bit stream, thereby generating complex symbols. In data reception, the baseband processor 4420 demodulates and decodes a baseband signal, provided from the RF processor 4410, thereby reconstructing a reception bit stream. For example, according to OFDM, in data transmission, the baseband processor 4420 generates complex symbols by encoding and modulating a transmission bit stream, maps the complex symbols to subcarriers, and constructs OFDM symbols through IFFT and CP insertion. In data reception, the baseband processor 4420 divides a baseband signal, provided from the RF processor 4410, into OFDM symbols, reconstructs signals mapped to subcarriers through FFT, and reconstructs a reception bit stream through demodulation and decoding. The baseband processor 4420 and the RF processor 4410 transmit and receive signals, and thus, may be referred to as a transmitter, a receiver, a transceiver, a communication unit, or a wireless communication unit.

The communication unit 4430 provides an interface for performing communication with other nodes in a network.

The memory 4440 stores data, such as a default program, an application, and configuration information for operating the base station. In particular, the memory 4440 may store information on a bearer allocated to a connected UE, a measurement result reported from a connected UE, and the like. In addition, the memory 4440 may store information as a criterion for determining whether to provide or stop a multi-connection to a UE. The memory 4440 provides stored data upon request from the controller 4450.

The controller 4450 controls overall operations of the base station. For example, the controller 4450 transmits and receives signals through the baseband processor 4420 and the RF processor 4410 or through the communication unit 4430, and records and reads data in the memory 4440. To this end, the controller 4450 may include at least one processor In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

While the disclosure has been shown and described with reference to certain embodiments thereof, it will be understood by those skilled in the art that various changes in form and details may be made therein without departing from the scope of the disclosure. Therefore, the scope of the disclosure should not be defined as being limited to the embodiments, but should be defined by the appended claims and equivalents thereof. That is, it is obvious to those skilled in the art to which the disclosure belongs that different modifications can be achieved based on the technical spirit of the disclosure. Further, if necessary, the above respective embodiments may be employed in combination. For example, the methods proposed in the disclosure may be partially combined to operate a base station and a terminal. Further, although the above embodiments have been described on the basis of 5g and NR systems, it may be possible to implement other variant embodiments on the basis of the technical idea of the embodiments in other systems such as LTE, LTE-A, and LTE-A-Pro systems. It is to be noted that enhancement proposed in this present disclosure are applicable for both licensed and unlicensed carriers.

The invention claimed is:

1. A method performed by a terminal in a wireless communication system, the method comprising:
receiving, from a base station, first information associated with a position of at least one synchronization signal block (SSB) and second information associated with a number of physical downlink control channel (PDCCH) monitoring occasions;
identifying at least one PDCCH monitoring occasion associated with a paging occasion based on the first information and the second information; and
monitoring a PDCCH addressed to a paging radio network temporary identifier (P-RNTI) in the at least one PDCCH monitoring occasion associated with the paging occasion,
wherein the number of the PDCCH monitoring occasions is identified based on an equation S*X, where S is a number of transmitted SSBs identified based on the first information and X is a value identified based on the second information.

2. The method of claim 1, wherein the at least one PDCCH monitoring occasion associated with the paging occasion do not overlap with one or more uplink symbols based on time division duplex (TDD) configuration information in system information.

3. The method of claim 1, wherein, in case of skipping the receiving of the second information, the number of the PDCCH monitoring occasions of the paging occasion is equal to the number of transmitted SSBs.

4. The method of claim 2, wherein PDCCH monitoring occasion indices of PDCCH monitoring occasions, which do not overlap with the one or more uplink symbols, are sequentially numbered from zero starting from a first PDCCH monitoring occasion in a paging frame.

5. The method of claim 1, wherein, in case that the paging occasion is a paging occasion of a paging occasion index (i_s+1), a starting PDCCH monitoring occasion in the paging occasion of the paging occasion index (i_s+1) is a PDCCH monitoring occasion of a PDCCH monitoring occasion index (i_s*S*X).

6. The method of claim 1, wherein, in case that third information associated with starting PDCCH monitoring occasions of paging occasions is signaled from the base station, a starting PDCCH monitoring occasion in a paging occasion of a paging occasion index (i_s+1) is indicated by a value of (i_s) among values of the-third information.

7. A method performed by a base station in a communication system, the method comprising:
transmitting, to a terminal, first information associated with a position of at least one synchronization signal block (SSB) and second information associated with a number of physical downlink control channel (PDCCH) monitoring occasions;
identifying at least one PDCCH monitoring occasion associated with a paging occasion based on the first information and the second information; and
transmitting a PDCCH addressed to a paging radio network temporary identifier (P-RNTI) in the at least one PDCCH monitoring occasion associated with the paging occasion,
wherein the number of the PDCCH monitoring occasions is based on an equation S*X, where S is a number of transmitted SSBs associated with the first information and X is a value associated with the second information.

8. The method of claim 7, wherein the at least one PDCCH monitoring occasion associated with the paging occasion do not overlap with one or more uplink symbols based on time division duplex (TDD) configuration information in system information.

9. The method of claim 7, wherein, in case that the second information is not transmitted, the number of the PDCCH monitoring occasions of the paging occasion is equal to the number of transmitted SSBs.

10. The method of claim 8, wherein PDCCH monitoring occasion indices of PDCCH monitoring occasions, which do not overlap with the one or more uplink symbols, are sequentially numbered from zero starting from a first PDCCH monitoring occasion in a paging frame.

11. The method of claim 7, wherein, in case that the paging occasion is a paging occasion of a paging occasion index (i_s+1), a starting PDCCH monitoring occasion in the paging occasion of the paging occasion index (i_s+1) is a PDCCH monitoring occasion of a PDCCH monitoring occasion index (i_s*S*X).

12. The method of claim 7, wherein, in case that third information associated with starting PDCCH monitoring occasions of paging occasions is transmitted to the terminal, a starting PDCCH monitoring occasion in a paging occasion of a paging occasion index (i_s+1) is indicated by a value of (i_s) among values of the third information.

13. A terminal in a wireless communication system, the terminal comprising:
a transceiver;
a controller coupled with the transceiver; and
a memory storing at least one program comprising instructions which, when executed by the controller, cause the controller to:
receive, from a base station, first information associated with a position of at least one synchronization signal block (SSB) and second information associated with a number of physical downlink control channel (PDCCH) monitoring occasions,
identify at least one PDCCH monitoring occasion associated with a paging occasion based on the first information and the second information, and
monitor a PDCCH addressed to a paging radio network temporary identifier (P-RNTI) in the at least one PDCCH monitoring occasion associated with the paging occasion,
wherein the number of the PDCCH monitoring occasions is identified based on an equation S*X, where S is a number of transmitted SSBs identified based on the first information and X is a value identified based on the second information.

14. The terminal of claim 13, wherein the at least one PDCCH monitoring occasion associated with the paging occasion do not overlap with one or more uplink symbols based on time division duplex (TDD) configuration information in system information.

15. The terminal of claim 13, wherein, in case of skipping the receiving of the second information, the number of the PDCCH monitoring occasions of the paging occasion is equal to the number of transmitted SSBs.

16. The terminal of claim 14, wherein PDCCH monitoring occasion indices of PDCCH monitoring occasions, which do not overlap with the one or more uplink symbols, are sequentially numbered from zero starting from a first PDCCH monitoring occasion in a paging frame.

17. The terminal of claim 13, wherein, in case that the paging occasion is a paging occasion of a paging occasion index (i_s+1), a starting PDCCH monitoring occasion in the paging occasion of the paging occasion index (i_s+1) is a PDCCH monitoring occasion of a PDCCH monitoring occasion index (i_s*S*X).

18. The terminal of claim 13, wherein, in case that third information associated with starting PDCCH monitoring occasions of paging occasions is signaled from the base station, a starting PDCCH monitoring occasion in a paging occasion of a paging occasion index (i_s+1) is indicated by a value of (i_s) among values of the-third information.

19. A base station in a communication system, the base station comprising:
a transceiver;
a controller coupled with the transceiver; and
a memory storing at least one program comprising instructions which, when executed by the controller, cause the controller to:
transmit, to a terminal, first information associated with a position of at least one synchronization signal block (SSB) and second information associated with a number of physical downlink control channel (PDCCH) monitoring occasions,
identify at least one PDCCH monitoring occasion associated with a paging occasion based on the first information and the second information, and
transmit a PDCCH addressed to a paging radio network temporary identifier (P-RNTI) in the at least one PDCCH monitoring occasion associated with the paging occasion,
wherein the number of the PDCCH monitoring occasions is based on an equation S*X, where S is a number of transmitted SSBs associated with the first information and X is a value associated with the second information.

20. The base station of claim 19, wherein the at least one PDCCH monitoring occasion associated with the paging occasion do not overlap with one or more uplink symbols based on time division duplex (TDD) configuration information in system information.

21. The base station of claim 19, wherein, in case that the second information is not transmitted, the number of the PDCCH monitoring occasions of the paging occasion is equal to the number of transmitted SSBs.

22. The base station of claim 20, wherein PDCCH monitoring occasion indices of PDCCH monitoring occasions, which do not overlap with the one or more uplink symbols, are sequentially numbered from zero starting from a first PDCCH monitoring occasion in a paging frame.

23. The base station of claim 19, wherein, in case that the paging occasion is a paging occasion of a paging occasion index (i_s+1), a starting PDCCH monitoring occasion in the paging occasion of the paging occasion index (i_s+1) is a PDCCH monitoring occasion of a PDCCH monitoring occasion index (i_s*S*X).

24. The base station of claim 19, wherein, in case that third information associated with starting PDCCH monitoring occasions of paging occasions is transmitted to the terminal, a starting PDCCH monitoring occasion in a paging occasion of a paging occasion index (i_s+1) is indicated by a value of (i_s) among values of the third information.

* * * * *